(12) United States Patent
Kakutani

(10) Patent No.: US 7,414,756 B2
(45) Date of Patent: Aug. 19, 2008

(54) IMAGE PROCESSING APPARATUS FOR CONVERTING IMAGE DATA BY UNIT OF MULTIPLE PIXELS AND PRINTING APPARATUS

(75) Inventor: Toshiaki Kakutani, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 847 days.

(21) Appl. No.: 10/913,298

(22) Filed: Aug. 6, 2004

(65) Prior Publication Data

US 2005/0141036 A1 Jun. 30, 2005

(30) Foreign Application Priority Data

| Aug. 8, 2003 | (JP) | ............................. 2003-206898 |
| Aug. 8, 2003 | (JP) | ............................. 2003-206899 |
| Sep. 10, 2003 | (JP) | ............................. 2003-318426 |

(51) Int. Cl.
*G06K 15/00* (2006.01)
*H04N 1/405* (2006.01)
*H04N 1/40* (2006.01)

(52) U.S. Cl. ..................... 358/3.06; 358/3.05; 358/3.02

(58) Field of Classification Search .................. 358/1.1, 358/1.9, 2.1, 3, 3.01, 3.02, 3.03, 3.04, 3.05, 358/3.06, 3.1
See application file for complete search history.

(56) References Cited

U.S. PATENT DOCUMENTS 6,870,641 B2 * 3/2005 Kakutani ................... 358/3.03

FOREIGN PATENT DOCUMENTS

| JP | 2000-050066 | 2/2000 |
| JP | 2002-185789 | 6/2002 |
| JP | 2005-081770 | 3/2005 |

OTHER PUBLICATIONS

Abstract of Japanese Patent Publication No. 2002-185789, Pub. Date: Jun. 28, 2002, Patent Abstracts of Japan.
Abstract of Japanese Patent Publication No. 2000-050066, Pub. Date: Feb. 18, 2000, Patent Abstracts of Japan.
Abstract of Japanese Patent Publication No. 2005-081770 Pub. Date: Mar. 31, 2005, Patent Abstracts of Japan.

* cited by examiner

*Primary Examiner*—Douglas Q Tran
(74) *Attorney, Agent, or Firm*—Martine Penilla & Gencarella, LLP

(57) ABSTRACT

The image processing apparatus or the printing device of the present invention forms units by grouping adjacent multiple-pixels and converts the image data to the dot data representing dot on/off state for each of pixels.

The apparatus stores the dot data in a condition enabling identification of the dot on/off state for at least one of pixels within the previously converted units. When the apparatus converts the image data to the dot data by a unit, The apparatus serially specifies a interested pixel, within a unit to be converted to the dot data, for determination of dot on/off state. Then the apparatus determines the dot on/off state for the interested pixel, according to a characteristic that controls the proportion of a number of dots formed at the predetermined location of the unit against a number of all dots into a predetermined range. It prevents cyclical patterns from becoming visible and degrading image quality.

24 Claims, 36 Drawing Sheets

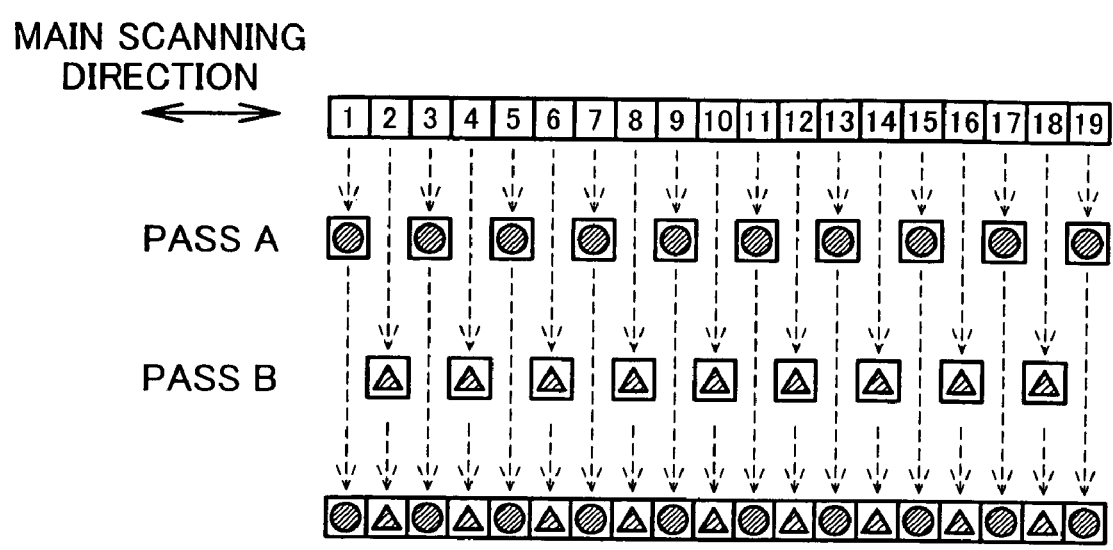

PRINTING PASS   A      B      A      B      A      B

PRINTING PASS   A      A   A      A   A      A

PRINTING PASS    A       A       A       A       A

PRINTING PASS    A       B    A       B    A

IMAGE PROCESSING APPARATUS FOR CONVERTING IMAGE DATA BY UNIT OF MULTIPLE PIXELS AND PRINTING APPARATUS

BACKGROUND OF THE INVENTION

1. Field of the Invention

This invention relates to technology for converting tone image data into dot data represented by dot on/off state, and in particular relates to technology for processing a predetermined number of neighboring pixels as a single unit in order to speed up conversion of image data, while avoiding worsening of image quality.

2. Description of the Related Art

Image display devices that represent images by forming dots on a display medium, namely a printing medium or liquid crystal screen, are widely used as output devices of various kinds of image machines. While these image display devices can locally only represent a state of either forming a dot or not, by unit of appropriately controlling dot formation density depending on tone values of an image, it becomes possible to represent an image with continuously varying tone.

In order that dots are formed with appropriate density depending on tone values of an image in these image display devices, as the method for determining the dot on/off state for each pixel, a method termed the error diffusion method is widely used. In the error diffusion method, error in tone representation created by forming a dot or not forming a dot on a pixel of interest is diffused into undetermined pixels neighboring the pixel of note and stored in memory, and when determining dot on/off state for undetermined pixels, determining the dot on/off state so as to cancel out error diffused from neighboring pixels. By using the error diffusion method, dot on/off state can be determined in such a way as to cancel out error of tone representation created by neighboring pixels, so that it is possible to determine dot on/off state such that density is appropriate depending on tone values of the image.

By using the error diffusion method, while it is possible to display an image of high quality by unit of forming dots at appropriate density depending on the image, on the other hand, tone error must be diffused into neighboring pixels each time that dot on/off state is determined, and if the number of pixels making up an image is large, the process is time consuming and it becomes difficult to represent the image rapidly. To solve such problems, the inventors of the present application have developed technology for treating a predetermined number of neighboring pixels as a unit, and determining dot on/off state while diffusing error on a per-unit basis (Japanese Patent Application 2001-185789A).

However, where determination of dot on/off state is carried out on a per-unit basis, there were instances in which image quality was not necessarily good. For example, where determination of dot on/off state is carried out on a per-unit basis, a similar process is repeated for each unit, and over several units, dots are formed on pixels at the same locations in the unit, this being visible as a cyclical pattern, which poses a risk of degrading image quality. Also, where determination of dot on/off state is carried out on a per-unit basis, the problem of a concern that a cyclical pattern will occur is not limited to the error diffusion method, but can occur similarly in cases where other known methods are used.

Alternatively, where dots are not formed evenly on pixels in a unit, but formed with bias to specific pixel locations, while it may not go as far as occurrence of a cyclical pattern, by the fact of, for example, the printing pass that forms the dots being biased to a particular pass so that color irregularity occurs, image quality may become degraded in some instances. Further, where dot on/off state is determined on a per-unit basis, the problem of a concern that image quality will be degraded is not limited to the error diffusion method, but can occur similarly in cases where other known methods are used.

SUMMARY OF THE INVENTION

This invention was made to solve the the issues in the prior art, and has as an object to provide technology making possible rapid determination of dot on/off state by unit of determining it on a per-unit basis, while suppressing the occurrence of cyclical patterns and other causes of lower image quality, to be able to display high quality images.

The first image processing apparatus converts image data represented by tone values for pixels constituting an image into dot data representing dot on/off state for each of pixels.

The image processing apparatus comprises:

a dot data converting module that, forming units by grouping adjacent pixels in a predetermined number, converts the image data included in each of units into the dot data; and a dot data storage module that stores the dot data in a condition enabling identification of the dot on/off state for at least one of pixels within the converted units, wherein the dot data converting module comprises:

a converted unit selecting module that calculates a sum of tone values for pixels grouped into the unit, and according to a correspondence relationship with the sum of tone values, selects a predetermined number of units from among the converted units;

a pixel specifying module that, within a unit to be converted to the dot data, serially specifies a interested pixel for determination of dot on/off state;

a dot data input module that inputs dot data of a pixel that is located in the predetermined number of units selected by the converted units selecting module and exists in a location having a predetermined relationship with the location of the interested pixel in the unit; and a dot formation determining module that, on the basis of tone value of image data for the interested pixel and the inputted dot data, determines the dot on/off state for the interested pixel, according to a characteristic that more readily determines a dot-on state the greater the tone value of the interested pixel; and wherein the converted unit selecting module executes the selection according to the correspondence relationship that, with respect to the sum of tone values smaller than a first predetermined value, a unit further away from the unit including the interested pixel is included in the predetermined number of units, than for the sum of tone values greater than the first predetermined value and smaller than a second predetermined value.

An invention of an image processing method corresponding to the the image processing apparatus, and an invention of a program product for realizing the method, naturally exist as well.

According to the image processing technology, a predetermined number of pixels are grouped into a unit, and image data converted to dot data on a per-unit basis. At this time, dot formation status in a previously converted unit is detected, and dot on/off state is determined with consideration to detection results. Dot formation status in a converted unit is detected as follows. First, for at least some of the pixels making up a converted unit, dot on/off state is stored in a condition enabling identification of pixel position in the unit. Then, the sum of tone values for pixels making up the unit being converted to dot data is calculated, and according to a correspondence relationship with the sum value, a predetermined number of units are selected from among previously converted units. Here, as the correspondence relationship with the sum value, there is established a relationship associating a unit further away from the interested pixel, with respect to a sum value smaller than a first predetermined value, than for a sum value greater than the first predetermined value and smaller than a second predetermined value. The number of units selected according to the correspondence relationship with the sum value may be one or several. Further, the pixel location of detecting dot on/off state in a selected unit can be the same pixel location as the interested pixel in the unit. Alternatively, depending on the pixel location of the interested pixel a different pixel location is possible. Next, within the unit being converted, a pixel of interest for determination of dot on/off state is serially established, and dot on/off state of a pixel at a predetermined location with respect to the pixel location of the interested pixel is detected for the selected predetermined number of units.

In this way, by detecting dot formation status within a previously converted unit, and determining dot on/off state in consideration of the detection result, even in cases where image data has been converted on a per-unit basis to dot data, the phenomenon whereby locations at which dots are formed within units assume a regular pattern over several units can be avoided. Accordingly, it is possible to reliably prevent cyclical patterns from becoming visible and degrading image quality. At this time, in the case that dots are formed sparsely, it is conceivable that the cycle of a regular pattern occurring over several units could be long. Accordingly, where in the event that the sum of tone value is a small value, units more distant from the interested pixel is selected, dot formation status is detected for these selected units, and this is taken into consideration when determining dot on/off state for the interested pixel, it becomes possible to effectively suppress formation of a cyclical regular pattern by dots.

Here, for a sum value smaller than a first predetermined value, it is acceptable to associate only units distant from the interested pixel; it is acceptable also to associate units relatively close to the interested pixel, so as to associate also with respect to a sum value greater than the first predetermined value but smaller than a second predetermined value. This is preferable because by so doing, it is possible to effectively avoid not only formation of a pattern having a long cycle, but also formation of a pattern having a relatively short cycle.

In the image processing apparatus, it is acceptable also to associate units more distant from a pixel of interest, not only with respect to a sum value smaller than the first predetermined value, but also with respect to a sum value greater than the second predetermined value, and with respect to a sum value greater than the first predetermined value but smaller than a second predetermined value. At this time, it is acceptable to associate and store a more distant unit with respect to a sum value smaller than the first predetermined value, than with respect to a sum value greater than the second predetermined value.

Similarly to a case where dots are formed sparsely, in a case where dots are formed at high density with pixels having no dot formed thereon occurring sparsely, it is it is conceivable that the cycle of a regular pattern occurring over several units could be long. Accordingly, by selecting also units more distant from a pixel of interest in the event that the sum of tone values is a large value, in the same way as in the event that it is a small value, detecting dot formation status for these selected units, and taking this into consideration when determining dot on/off state for the interested pixel, it becomes possible to effectively suppress formation of a cyclical regular pattern by dots. Naturally, differences such as the following are conceivable between cases where dots are formed sparsely and cases where formed at high density.

Where dots are formed at high density, due to interaction among neighboring dots, dots may be formed larger in some instances. Also, where ink drops are ejected onto a printing medium to form dots, since dots may be formed larger due to the effects of ink bleed, there are instances in which forming dots at high density results in partial overlap of neighboring dots. In such instances, even in the rare event that pixels not having a dot formed thereon should occur in a regular pattern, since the surrounding dots are formed larger, a cyclical pattern will not readily stand out. For this reason, in areas of large tone value in which dots are formed at high density, it is conceivable that image quality will not be degraded to the same extent as in areas of low tone value with sparsely formed dots, even where dot on/off state of distant dots is not taken into consideration. Accordingly, by selecting distant units in instances where the sum value of tone values is a large value, in the same way as where the sum value of tone values is small, selecting a more distant unit with respect to a small sum value than with respect to a large sum value, it is possible to effectively suppress degradation of image quality.

In this image processing apparatus, in the case that the sum value of tone values is small, in the event that a dot is detected on a pixel in a predetermined location with respect to a pixel of interest, it may be made difficult for a dot to be formed on the interested pixel. Here, the case in which a dot is detected on a pixel in a predetermined location could be a case in which a dot is detected on any of a plurality of pixels at predetermined locations, or a case in which dots are detected on all of a plurality of pixels.

In an area with a small sum value of tone values, dots are formed sparsely. Accordingly, in this way by making it difficult for a dot to be formed on the interested pixel in the event that a dot is formed on a pixel of predetermined location, formation by dots of a cyclical pattern over several units can be suppressed. As a result, even where image data is converted on a per-unit basis to dot data, it is possible to avoid cyclical patterns becoming visible and resulting in degraded image quality.

In particular, it is conceivable that in an area in which dots are formed sparsely it is rare for dots to be formed on all pixels of a plurality of pixels. Accordingly, by suppressing formation of a dot on a pixel of interest in the event that a dot has been formed on any predetermined pixel, it becomes possible to effectively suppress the occurrence of a cyclical pattern. Also, it is conceivable that in an area in which dots are formed with a certain level of density, it is highly possible that a dot will have been formed on any of a plurality of pixels. Accordingly, by suppressing formation of a dot on a pixel of interest in the event that dots have been formed all predetermined pixels, it is possible to reliably avoid a cyclical pattern being formed by dots, and is therefore preferred.

In this kind of image processing apparatus, in an area whose sum value of tone values is small, it is acceptable to not form a dot on a pixel of interest in the event that a dot has been formed on a pixel of predetermined location.

This is favorable because by so doing, it is possible to easily avoid a cyclical pattern from being formed by dots, even in the event that image data is converted on a per-unit basis to dot data.

Also, in this kind of image processing apparatus, where the sum value of tone values is large, in the case that a dot is not detected on a pixel of predetermined location with respect to a pixel of interest, it is made likelier for a dot to be formed for the interested pixel. Here, the case in which a dot is not detected on a predetermined location could be a case in which a dot is not detected on any of a plurality of pixels at predetermined locations, or a case in which no dots are detected on all of a plurality of pixels.

In an area with a small sum value of tone values, pixels without a dot formed thereon occur sparsely. That is, where image data has been converted on a per-unit basis to dot data, there are instances in which pixels without a dot formed thereon occur in a regular pattern and degrade image quality. Accordingly, by making it likelier for a dot to be formed on a pixel of interest in the event that no dot has been formed on a pixel of predetermined location, the occurrence of a cyclical pattern over several units by pixels without a dot formed thereon can be suppressed.

In particular, it is conceivable that in an area in which substantially no pixels without a dot formed thereon occur, is rare that dots are not formed on all pixels at predetermined locations. Accordingly, by making it likelier for a dot to be formed on a pixel of interest in the event that no dot has been formed on a pixel of predetermined location, it is possible to effectively suppress the occurrence of a cyclical pattern. Also, it is conceivable that in an area in which pixels without a dot formed thereon occur with a certain level of density, it is highly likely that any of a plurality of pixels will not have a dot formed thereon. Accordingly, by making it likelier for a dot to be formed on a pixel of interest in the event that dots have not been formed on all pixels at predetermined locations, it is possible to reliably avoid the occurrence of a cyclical pattern.

Further, in this kind of image processing apparatus, in an area whose sum value of tone values is large, a dot may be formed on a pixel of interest in the event that a dot is not formed on a pixel of predetermined location.

This is favorable because by so doing, even where image data is converted on a per-unit basis to dot data, it is possible to readily avoid the occurrence of a regular pattern by pixels without a dot formed thereon.

In the image processing apparatus hereinabove, determining dot on/off state for each pixel making up a unit using a so-called error diffusion method, the error diffusion method threshold value referred to when making the decision can be modified depending on dot on/off state within a converted unit.

By modifying the value of the error diffusion method threshold value, the result of detection of dot on/off state at a predetermined pixel location within a converted unit can be reflected readily in the decision of the dot on/off state at a pixel of interest. The error diffusion method has the function of diffusing tone error occurring in a pixel of interest into undetermined pixels and reflecting it in decisions of dot on/off state in these surrounding pixels in order to quickly eliminate the tone error. Because of this, where dot on/off state for a pixel of interest is determined using the error diffusion method, even in the event that appreciable tone error has been created in the interested pixel due to reflecting the result of detecting dot on/off state in a converted unit, this can be eliminated quickly, making it possible to represent an image of higher image quality.

In this kind of image processing apparatus in which dot on/off state is determined using the error diffusion method, in the event that there is detected formation of a dot on a pixel at the the predetermined location with respect to the the pixel of interest, it may be determined to not form a dot on the pixel of interest.

Where it is determined to not form a dot on a pixel of interest in the event that formation of a dot on a pixel at a predetermined location is detected, it becomes possible to easily avoid dots from forming in a regular pattern, even where image data is converted on a per-unit basis to dot data, and is favorable for this reason. Also, since decisions of dot on/off state are made using the error diffusion method, by determining that a dot has not been formed, even if appreciable tone error has been created in the interested pixel, it is possible to quickly eliminate the error so that there is no risk of degrading image quality.

Also, the image processing apparatus hereinabove can be favorably implemented in a printing device that forms dots on a printing medium to print an image. That is, the image processing apparatus of the present invention, by unit of converting on a per-unit basis, can rapidly convert image data into dot data. Moreover, by detecting dot formation status at predetermined location in converted units, formation of a regular pattern by dots can be avoided. Accordingly, by implementing this kind of image processing apparatus in a printing device, by rapidly converting image data into dot data, it becomes possible, while reducing the time required for printing, to avoid degradation of image quality.

The second image processing apparatus converts image data represented by tone values for pixels constituting an image into dot data representing dot on/off state for each of the pixel.

The image processing apparatus comprises:
a dot data converting module that, forming units by grouping adjacent pixels in a predetermined number, converts the image data included in each of the units into the dot data; and
a dot data storage module that stores the dot data in a condition enabling identification of the dot on/off state for at least one of pixels within the converted units,
wherein the dot data converting module comprises:
a pixel specifying module that, within a unit to be converted to the dot data, serially specifies a interested pixel for determination of dot on/off state;
a dot data input module that inputs the stored dot data of a pixel that exists within the converted unit in a location having a predetermined relationship with the location of the interested pixel in the unit; and
a dot formation determining module that, on the basis of tone value of image data for the interested pixel and the inputted dot data, determines the dot on/off state for the interested pixel, according to a characteristic that controls the proportion of a number of dots formed at the predetermined location of the unit against a number of all dots into a predetermined range.

An invention of an image processing method corresponding to the the image processing apparatus, and an invention of a program product for realizing the method, naturally exist as well.

According to the image processing technology, taking pixels in predetermined number as units, when converting image data to dot data on a per-unit basis, dot formation status in a previously converted unit is detected, and dot on/off state is determined while giving consideration to detection results. Dot formation status within a converted unit is detected as follows. First, for at least some of the pixels making up the converted unit, dot on/off state is stored in a condition enabling identification of pixel position in the unit. Next, a pixel of interest for determination of dot on/off state within the unit is established, and from among the pixels whose dot on/off states were stored, dot on/off state is detected for a pixel in a predetermined location with respect to the pixel location of the pixel of interest. It is sufficient for the pixel whose dot on/off state is being detected to be at a predetermined location with respect to the interested pixel. Accordingly, detection may be carried out for a plurality of pixels, and it is possible for detected pixel location to be a different pixel location depending on the pixel location of the interested pixel.

In this way, when determining dot on/off state for a pixel of interest, by detecting dot formation status within a previously converted unit and taking the detection results into consideration, dot on/off state is determined in such a way as to suppress the proportion, relative to all dots, of dots formed on pixels at predetermined locations with respect to a pixel of interest within a unit.

By so doing, even where image data is converted on a per-unit basis to dot data, it is possible to reliably prevent dots from forming a regular pattern over several units resulting in visible cyclical patterns and degradation in image quality. Also, it is possible to reliably avoid bias of the printing pass forming dots to a particular pass, and degradation in image quality, as a result of bias in pixel location at which a dot is formed in a unit.

In this kind of image processing apparatus, while detecting dot on/off state for pixels at the same pixel location as a pixel of interest in a unit, in the event that a predetermined number or more of dots are formed on these pixels, formation of a dot on the interested pixel may be suppressed.

By so doing, biased formation of a dot at the same pixel location as a pixel of interest in a unit can be avoided. As a result, it is possible to avoid degradation of image quality caused by dots forming a regular pattern over several units, or biased formation of dots at specific pixel locations within a unit.

Alternatively, while detecting dot on/off state for pixels at predetermined pixel locations different from a pixel of interest in a unit, in the event that a predetermined number or more of dots are formed on these pixels, formation of a dot on the interested pixel may be promoted.

In the event that a predetermined number or more of dots are formed at predetermined pixel locations different from a pixel of interest, where a dot is formed on pixel of interest, the reflex action thereof is to make it difficult for dots to be formed at predetermined pixel locations. Accordingly, in this way as well, it is possible to avoid degradation of image quality caused by dots forming a regular pattern over several units, or biased formation of dots at specific pixel locations within a unit.

In this kind of image processing apparatus, determining dot on/off state for each pixel making up a unit using a so-called error diffusion method, the error diffusion method threshold value referred to when making the decision can be modified depending on dot on/off state detection results for the the pixel locations.

By modifying the threshold value of the error diffusion method, the ease of dot formation can be controlled with reference thereto, so it is possible to easily control dot formation rate on the basis of dot on/off state detection results for the the predetermined pixel locations. Also, where dot on/off state is determined using the error diffusion method, even in the event that dot on/off state for a pixel of interest has been controlled with reference to detection results at predetermined pixel locations, error produced thereby can be eliminated quickly.

In this kind of image processing apparatus, grouping each set of four mutually adjacent pixels into a unit, determination of dot on/off state for a pixel of interest may be made in a state in which the proportion of dots formed on the same pixel location as the pixel of interest in a unit falls within the range of 10%-40%.

Where a unit is composed of four pixels, if dots are formed at an equal rate regardless of pixel location, the proportion of dots formed at each pixel location is about 25%. Experience has shown that it is possible to avoid degradation of image quality where this proportion is held to within the range of 10%-40% (more preferably in the range of 15%-35%).

Also, the image processing apparatus hereinabove can be favorably implemented in a printing device that forms dots on a printing medium to print an image. That is, the image processing apparatus of the present invention, by unit of converting on a per-unit basis, can rapidly convert image data into dot data. Moreover, by detecting dot formation status at predetermined location in converted units, formation of a regular pattern, or biased formation at specific pixel locations within a unit by dots can be avoided. Accordingly, by implementing this kind of image processing apparatus in a printing device, by rapidly converting image data into dot data, it becomes possible, while reducing the time required for printing, to avoid degradation of image quality.

The printing device comprises a raster forming element for forming rasters composed of rows of dots, by forming dots on a printing medium while repeating reciprocating motion a predetermined number of times, to print an image by forming a plurality of rasters while moving the raster forming element relatively in a direction intersecting the rasters.

The printing device comprises:
a module that prepares the units, at least in the raster direction, as sets of consecutive pixels in a number equivalent to an integral multiple of the number of times of reciprocating motion for the raster forming element to form an the raster;
an image data receiving module that receives image data representing tone values of pixels, for a plurality of pixels that constituting an image being printed;
a dot data converting module that forms units by grouping adjacent pixels in predetermined number and converts the image data included in each of the units into the dot data;
a dot data storage module that stores the dot data in a condition enabling identification of the dot on/off state for at least one of pixels within the converted units; and
a raster forming element drive module that drives the raster forming element according to the dot data,
wherein the dot data converting module comprises:
a pixel specifying module that, within a unit to be converted to the dot data, serially specifies a interested pixel for determination of dot on/off state;
a dot data input module that inputs the stored dot data of a pixel that exists within the converted unit in a location having a predetermined relationship with the location of the interested pixel in the unit; and
a dot formation determining module that, on the basis of tone value of image data for the interested pixel and the inputted dot data, determines the dot on/off state for the interested pixel.

An invention of a printing control device, an invention of a printing method, and invention of a printing control method corresponding to the the printing device, as well as an invention of a program product for realizing these methods, naturally exist as well.

In this printing technology, a predetermined number of pixels are grouped into a unit, and when converting image data to dot data on a per-unit basis, dot formation status in a previously converted unit is detected, and dot on/off state is determined with consideration to detection results. Dot formation status in a converted unit is detected as follows. First, for at least some of the pixels making up a converted unit, dot on/off state is stored in a condition enabling identification of pixel position in the unit. Next, a pixel of interest for determination of dot on/off state within the unit is established, and from among the pixels whose dot on/off states were stored, dot on/off state is detected for a pixel in a predetermined location with respect to the pixel location of the pixel of interest. It is sufficient for the pixel whose dot on/off state is being detected to be at a predetermined location with respect to the interested pixel. Accordingly, detection may be carried out for a plurality of pixels, and it is possible for detected pixel location to be a different pixel location depending on the pixel location of the interested pixel.

Where images are printed while forming rasters on the basis of dot data derived in this manner, formation of a regular pattern over several units by dots can be avoided. Thus, it becomes possible to reliably prevent cyclic patterns from becoming visible and degrading image quality.

In the present invention, a plurality of pixels are grouped into a unit in the following way. Specifically, at least in the raster direction, consecutive pixels are grouped in numbers equivalent to an integral multiple of a predetermined number of times of reciprocating motion for a raster forming element to form an the raster. By so doing, it is possible, while simultaneously avoiding dots from forming a regular pattern over several units, to also avoid a phenomenon whereby color irregularities occur, though not to extent that a cyclical pattern occurs, degrading image quality. The reasons for this are explained below.

Typically, where an image is printed while reciprocating a raster forming element to form rasters on a printing medium, a raster is not formed in a single reciprocation; instead, it is commonly formed over multiple reciprocations. Such a printing method is employed in order to avoid degradation of image quality due to phenomena such as the following occurring where a raster is formed in a single reciprocation, namely, a phenomenon termed "banding" whereby the printing medium ground color is visible in streaks, or a phenomenon whereby color irregularities occur though not to the extent that banding appears. With such a printing method, where the number of reciprocations of the raster forming element to form a single raster is designated as N, it is normal for dots to be formed at intervals of N pixels in a single reciprocation. Accordingly, in the case of printing an area such that dots happen to be formed at intervals of N pixels, printing for that area will be carried out in a single reciprocation, even if the image is printed while reciprocating the raster forming element N times. Thus, banding or color irregularities can occur in such an area, so that a decline in image quality can occur.

Incidentally, in the present invention, as mentioned previously, grouping a plurality of adjacent pixels into a unit, image data is converted to dot data on a per-unit basis. At this time, dot formation status in a previously converted unit is detected, and detection results are taken into consideration while determining dot on/off state. Thus, occurrence of a regular pattern, such as formation of a dot on a pixel at the same position in a unit, can be avoided. However, by avoiding cyclical formation of dots on a per-unit basis, it may now happen that an area in which dots are formed at intervals of N pixels occurs. Here, N pixels refers to N pixels when pixels are formed at intervals in individual reciprocations, in the case that a single raster is formed by N reciprocations.

For example, consider the case of taking a 3×3-pixel unit containing a total of 9 pixels. Even if an area such that dots can be formed at exactly 3-pixel intervals is present in an image, since formation of dots at the same pixel location in each unit is avoided, dot formation location will be shifted, so that dots are not formed cyclically every three pixels. However, as a result of dot formation location having been shifted, there could occur, for example, an area in which dots are formed at 4-pixel intervals. In the event that by chance a single raster was formed by four reciprocations, in this area the raster is formed by a single reciprocation, so that occurrence of color irregularities other degradation of image quality can occur.

In contrast to this, in the present invention, in the event that one raster is formed by N reciprocations, consecutive pixels in a number equivalent to an integral multiple of N as units are grouped into a unit, at least in the raster direction. Thus, if cyclical formation of dots over several units is avoided, immediately, occurrence of areas of dot formation in a single reciprocation is avoided. That is, it is possible while simultaneously avoiding cyclical formation of dots in regular patterns over several units, to also avoid the phenomenon of color irregularity occurring, even if not to the extent that a cyclical pattern occurs.

BRIEF DESCRIPTION OF THE DRAWINGS

FIG. 30 is a schematic illustration showing the condition of forming a row of consecutive dots in the main scanning direction over two main scan passes.

DESCRIPTION OF THE PREFERRED EMBODIMENTS

In order to describe the action and working effects of the present invention more clearly, the embodiments of the invention are described hereinbelow in the following order.
A1. Embodiment 1:
A2. Embodiment 2:
B. Device Arrangements Shared by the Embodiments:
C. Overview of Image Data Conversion Process:
D. Embodiment 1:
  D-1. Tone Number Conversion Process Performed on a Unit-by-unit Basis:
  D-2. Intra-unit Multivalue Quantization Process:
  D-3. Intra-unit Multivalue Quantization Process of Embodiment 1:
  D-4: Variations:
E. Embodiment 2
  E-1. Intra-unit Multivalue Quantization Process of Embodiment 2:
  E-2: Variation of Embodiment 2:
F. Embodiment 3:
  (1)-(3) Variations of Embodiment 3:
G. Embodiment 4:

A1. Embodiment 1

Figure 1:
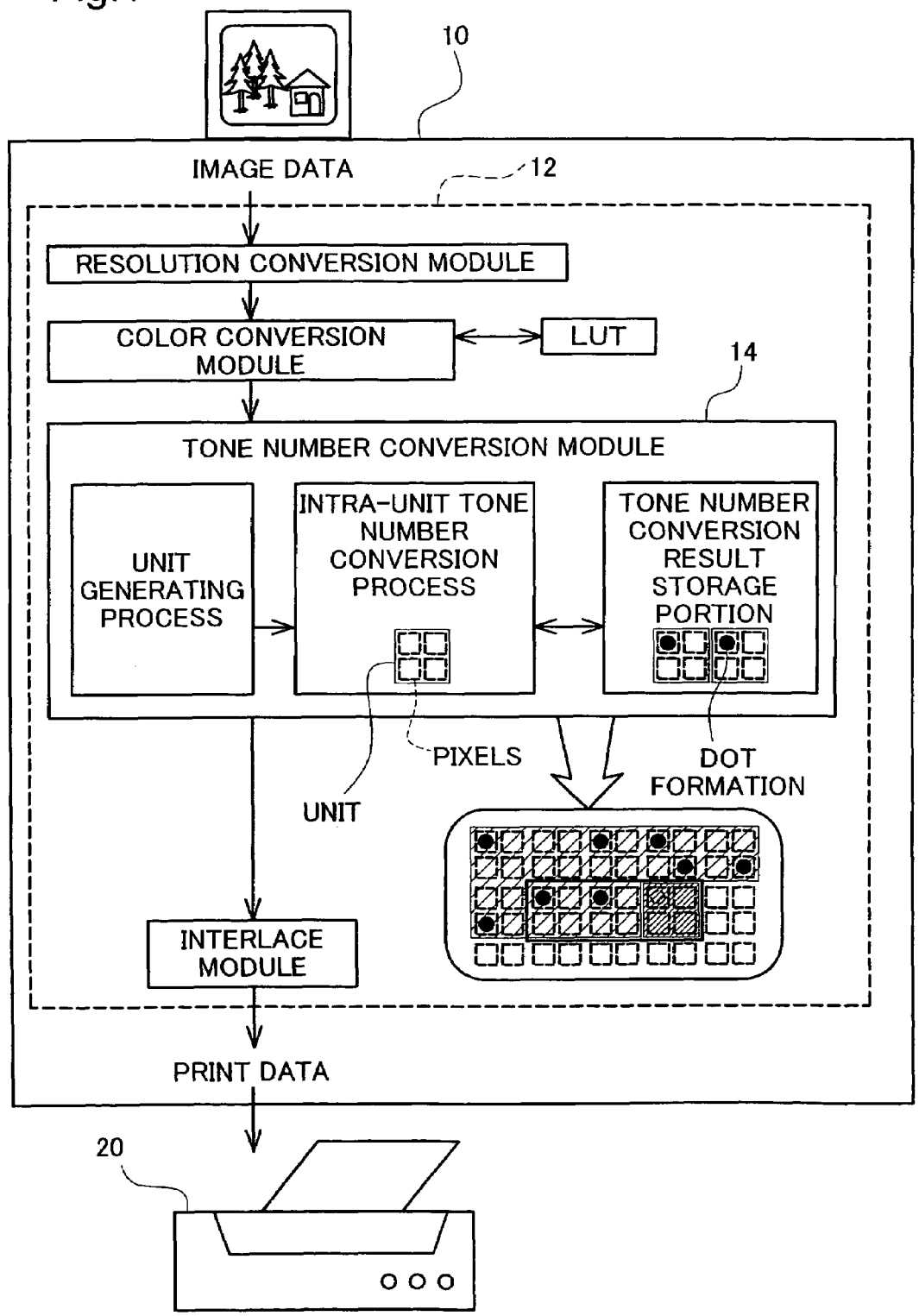
FIG. 1 is a simplified arrangement illustration of a printing system exemplifying general scheme of the invention.

Before proceeding to described embodiments in detail, with the aim of furthering understanding, Embodiment 1 of the image processing apparatus and image processing method of the invention will be described briefly. FIG. 1 is a schematic illustration showing an embodiment of the image processing apparatus and image processing method, taking the example of a printing system. The printing system shown in FIG. 1 comprises a computer 10 as the image processing apparatus, and a color printer 20. Computer 10, upon receiving from a digital camera, color scanner or other image machine color image data representing RGB colors by unit of tone values, converts the image data into print data represented by dot on/off state for each color printable by color printer 20. This image data conversion is carried out using a dedicated program called a printer driver 12. Color image data composed of the RGB colors can also be carted on computer 120 using application programs of various kinds.

Printer driver 12 comprises several modules, namely, a resolution conversion module, a color conversion module, a tone number conversion module 14, and an interlace module. The processes performed by these modules will be described later. Of these, in the tone number conversion module 14 there is carried out a process for converting image data into a specific expression format based on the dot on-off state. In the tone number conversion module of the embodiment, in order to speed up the process, processing is carried out on a per-unit basis such as the following. Specifically, several adjacent pixels are grouped into a unit, and determination of dot on/off state for each pixel is carried out while grouped into unit units. The method for carrying out determination of dot on/off state on a per-unit basis will be described later.

In FIG. 1, the conceptual illustration indicated by the arrow below the border representing the tone number conversion module 14 shows the condition of image data converted into dot data in the tone number conversion module 14. The small squares indicated by broken lines in the conceptual illustration represent pixels in model form. One unit is composed of four of these pixels. The unit shown finely hatched in the drawing represents the unit being processed, i.e. the unit being converted from image data to dot data. The area shown coarsely hatched in the drawing indicates the area in which dot on/off state has been determined and converted to dot data. Where determination of dot on/off state is carried out on a per-unit basis, a similar process is carried out for each unit. Thus, particularly in instances such as when an area of minimal change in tone values of image data was processed, there is a risk that dots will be formed in a regular pattern over several units. Where an area of dots formed in a regular pattern occurs, there is a concern that this will be visible and cause degradation of image quality.

In the conceptual illustration in FIG. 1, as one example of dots formed in a regular pattern, there is shown a case in which dots are formed at the same location within consecutive units. As shown in the drawing, to the left of the unit being processed (the unit indicated by fine hatching), there are two consecutive units each having a dot formed on the upper left corner pixel. Assuming that a dot is formed on the upper left corner pixel in the unit being processed as well, dots would be formed on pixels at the same location in three consecutive units, and this would be visible as a pattern with a risk of degrading image quality. Of course, examples of dots forming in a regular pattern are not limited to instances in which dots are formed at the same location in consecutive units, but can occur in instances in which dots are formed in a regular pattern over a cycle of several units.

In order to avoid the occurrence of such problems, with the tone number conversion module 14 in the printing system shown in FIG. 1, pixels determined to have dots formed thereon for previously processed units are stored in a tone number conversion result storage portion. When determining dot on/off state on a per-unit basis, determination results are read out from the tone number conversion result storage portion, making determinations while avoiding formation of a regular pattern by the dots. For example, in the example illustrated in the conceptual illustration in FIG. 1, since dots are formed at the same pixel location in consecutive units, determinations of dot on/off state for processing units are made while avoiding consecutive formation of dots on pixels at the same location. In this way, dot on/off state can be determined while avoiding formation of dots in a readily visible pattern. By so doing, it is possible, while carrying out rapid processing by unit of determining dot on/off state on a per-unit basis, to print out images of high image quality without degrading image quality.

Additionally, in areas where dots are formed sparsely, such as where formed at a rate of one for several units for example, it may be expected that a cycle in which dots are formed in a regular pattern will be longer. Similarly, in areas where dots are formed on substantially all pixels, it is conceivable that pixels without a dot formed thereon will occur in a regular pattern over several units. Accordingly, in such areas, where dot formation status takes into account more distant units as well, it is possible to even more effectively suppress degradation of image quality.

A2. Embodiment 2

Next, a second embodiment for the printing device and printing method of the invention will be described briefly using the the FIG. 1. The arrangement of computer 10, color printer 20 etc. which make up the printing system have been described previously.

Color printer 20 is equipped with a head for each color, for forming dots on a printing medium. In accordance with print data generated by printer driver 12, dots are formed while reciprocating the heads over the printing medium to print an image. Rows of dots formed on the printing medium while reciprocating the heads at this time are termed "rasters"; particularly in terms of image quality requirements, a single raster is not formed during a single reciprocation, but rather over a plurality of reciprocations. The number of reciprocations carried out to form a single raster in this way is sometimes termed "number of passes."

Printer driver 12 comprises several modules, namely, a resolution conversion module, a color conversion module, a tone number conversion module 14, and an interlace module. The processes performed by these modules will be described later. Of these, in the tone number conversion module 14, there is carried out a process for converting image data into a specific expression format based on the dot on-off state. In the tone number conversion module of the embodiment, in order to speed up the process, processing is carried out on a per-unit basis such as the following. Specifically, several adjacent pixels are grouped into a unit, and determination of dot on/off state for each pixel is carried out while grouped into unit units. The method for carrying out determination of dot on/off state on a per-unit basis will be described later. Also, as noted previously, color printer 20 is assumed to reciprocate the heads a predetermined plurality of times in order to form a single raster, and when grouping multiple pixels into units, at least in the raster direction, consecutive pixels are grouped in a number corresponding to an integral multiple of the number of passes.

In FIG. 1, the conceptual illustration indicated by the arrow below the border representing the tone number conversion module 14 shows the condition of image data converted into dot data in the tone number conversion module 14. The small squares indicated by broken lines in the conceptual illustration represent pixels in model form.

One unit is composed of four pixels in two vertical and two horizontal rows. The number of pixels grouped as a unit is selected as follows, on the basis of the number of passes of color printer 20 (2 in the example shown in FIG. 1) Specifically, the number of pixels to be grouped as a unit is selected such that at least in the raster direction, the number of consecutive pixels is an integral multiple of the number of passes. The unit shown finely hatched in the drawing represents the unit being processed, i.e. the unit being converted from image data to dot data. The area shown coarsely hatched in the drawing indicates the area in which dot on/off state has been determined and converted to dot data. Where determination of dot on/off state is carried out on a per-unit basis, a similar process is carried out for each unit. Thus, particularly in instances such as when an area of minimal change in tone values of image data was processed, there is a risk that dots will be formed in a regular pattern over several units. Where an area of dots formed in a regular pattern occurs, there is a concern that this will be visible and cause degradation of image quality.

In the conceptual illustration in FIG. 1, as one example of dots formed in a regular pattern, there is shown a case in which dots are formed at the same location within consecutive units. As shown in the drawing, to the left of the unit being processed (the unit indicated by fine hatching), there are two consecutive units each having a dot formed on the upper left corner pixel. Assuming that a dot is formed on the upper left corner pixel in the unit being processed as well, dots would be formed on pixels at the same location in three consecutive units, and this would be visible as a pattern with a risk of degrading image quality. Of course, examples of dots forming in a regular pattern are not limited to instances in which dots are formed at the same location in consecutive units, but can occur in instances in which dots are formed in a regular pattern over a cycle of several units.

In order to avoid the occurrence of such problems, with the tone number conversion module 14 in the printing system shown in FIG. 1, pixels determined to have dots formed thereon for previously processed units are stored in a tone number conversion result storage portion. When determining dot on/off state on a per-unit basis, determination results are read out from the tone number conversion result storage portion, making determinations while avoiding formation of a regular pattern by the dots. For example, in the example illustrated in the conceptual illustration in FIG. 1, since dots are formed at the same pixel location in consecutive units, determinations of dot on/off state for processing units are made while avoiding consecutive formation of dots on pixels at the same location. In this way, dot on/off state can be determined while avoiding formation of dots in a readily visible pattern. By so doing, it is possible, while carrying out rapid processing by unit of determining dot on/off state on a per-unit basis, to print out images of high image quality without degrading image quality. Also, at least in the raster direction, there are selected as a unit a plurality of consecutive pixels in a number equivalent to an integral multiple of the number of passes of color printer 20. While a more detailed description will be made later, by grouping such a plurality of pixels into a unit it is possible, while simultaneously avoiding dots from forming a regular pattern over several units, to avoid the phenomenon of degradation in image quality due to occurrence of color irregularity, though not to the extent that a cyclical pattern occurs.

Following is a detailed description of a large number of more specific embodiments of this image processing technology and printing technology.

Figure 2:
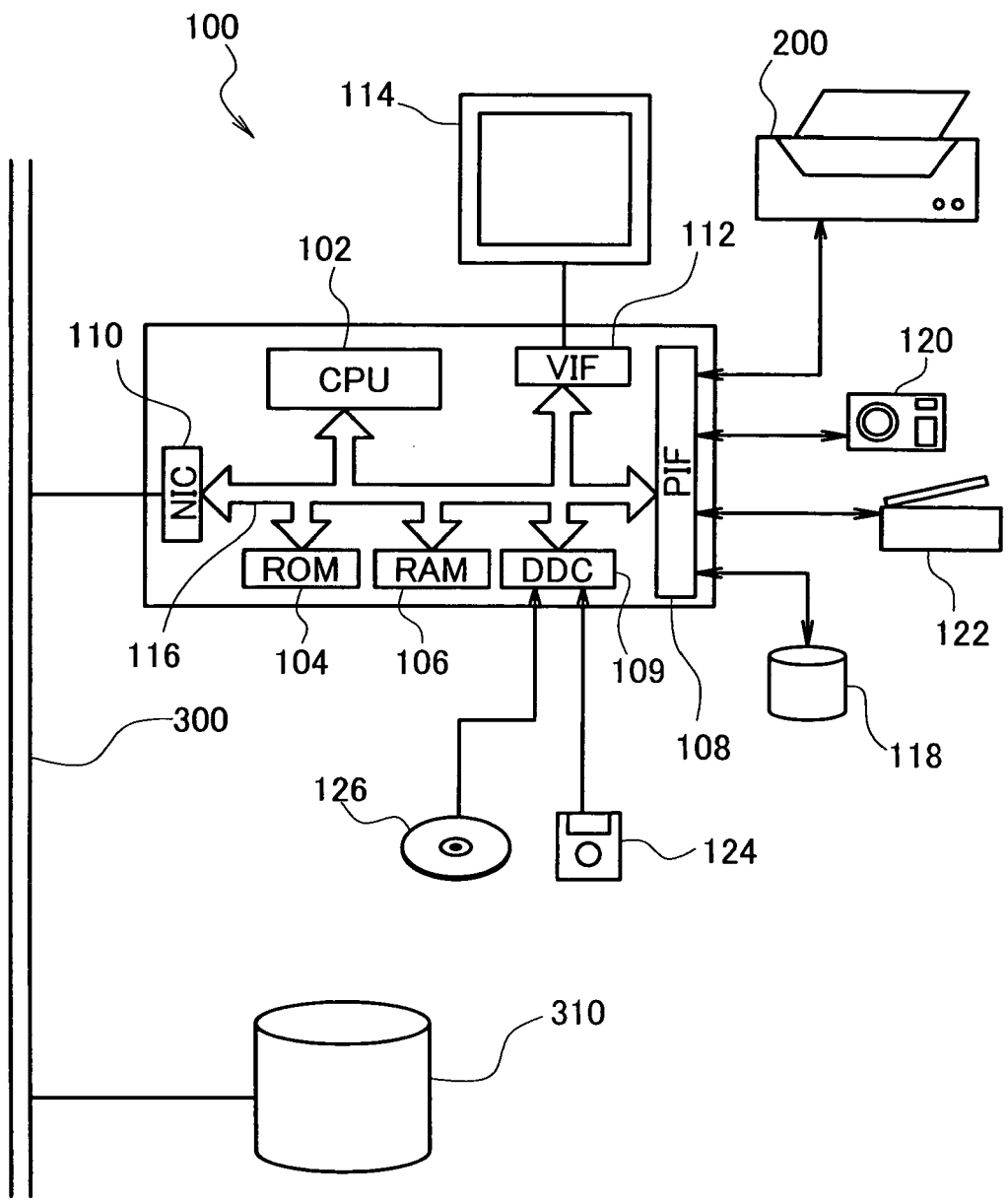
FIG. 2 is a schematic illustration showing the arrangement of a computer as the image processing apparatus in the embodiment.

B. Device Arrangements Shared by the Embodiments:

First, device arrangements shared in the embodiments will be described. FIG. 2 is a schematic illustration showing the arrangement of a computer as the image processing apparatus in the embodiment. Computer 100 is a known art computer centered on a CPU 102 and having ROM 104, RAM 106 and so on interconnected via a bus 116.

To computer 100 are connected a disk controller DCC 109 for reading data from a flexible disk 124 or compact disk 126; a peripheral interface PIF 108 for exchanging data with peripheral devices; a video interface VIF 112 for driving a CRT 114, etc. To PIF 108 are connected a color printer 200 described later, a hard disk 118, etc. Where a digital camera 120, color scanner 122 or the like is connected to PIF 108, it is possible to acquire and print an image with the digital camera 120 or color scanner 122. By installing a network interface card NIC 110, computer 100 could be connected to a communications network 300 to enable acquisition of data stored on a storage device 310 connected on the communications network.

Figure 3:
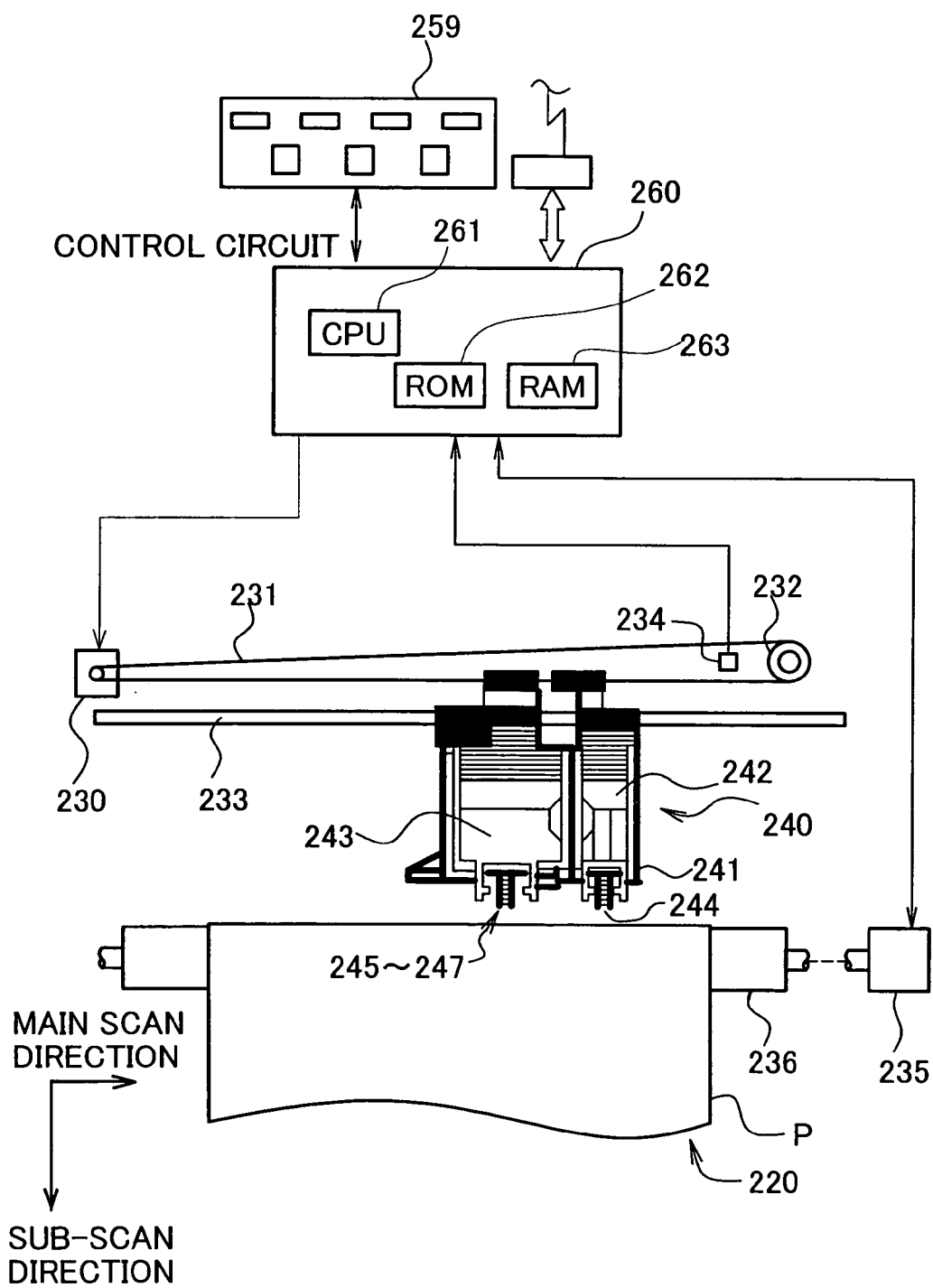
FIG. 3 is a simplified arrangement illustration of a printer as the image processing apparatus in the embodiment.

FIG. 3 is a simplified arrangement illustration of color printer 200 of Embodiment 1. Color printer 200 is an ink-jet printer capable of forming dots of inks of the four colors cyan, magenta, yellow, and black. Of course, it would also be possible to use an ink-jet printer capable of forming ink dots of a total of six colors including, in addition to inks of these four colors, low dye density cyan (light cyan) ink and low dye density magenta (light magenta) ink. Hereinbelow, depending on circumstances, cyan ink, magenta ink, yellow ink, black ink, light cyan ink, and light magenta ink may be denoted as C ink, M ink, Y ink, K ink, LC ink, and LM ink respectively.

As shown in the drawing, color printer 200 is composed of a mechanism for driving a print head 241 riding on a carriage 240 and carrying out ink ejection and dot formation; a mechanism for reciprocating this carriage 240 in the axial direction of a platen 236 by unit of a carriage motor 230; a mechanism for feeding printing paper P by unit of a paper feed motor 235; and a control circuit 260 for controlling dot formation, movement of carriage 240, and the printing paper feed.

On carriage 240 are installed an ink cartridge 242 containing K ink, and an ink cartridge 243 containing the various inks of C ink, M ink, and Y ink. When ink cartridges 242, 243 are installed on carriage 240, inks inside the cartridges are supplied through inlet lines to ink ejecting heads 244 to 247 for each color, disposed on the lower face of print head 241. On the ink ejection heads 244 to 247 for each color are disposed 48 nozzles Nz in sets of one nozzle row each, arranged at a given nozzle pitch k.

Control circuit 260 is composed of a CPU 261, ROM 262, RAM 263 etc. Control circuit 260, by unit of appropriately driving the carriage motor 230 and paper feed motor 235, controls main scanning and sub-scanning of the carriage 240, as well as ejecting ink drops at appropriate timing from the nozzles on the basis of print data supplied from computer 100. In this way, by forming ink dots of each color at appropriate locations on the printing medium under the control of the control circuit 260, the color printer 200 can print a color image.

Various methods can be used as the method for ejecting ink drops from the ink ejecting heads of each color. Specifically, a system in which inks are ejected using piezo elements, or a method in which a bubble is generated in the ink passage by unit of a heater disposed in the ink passage in order to eject the ink could be used. Also, use of a printer having a system in which, instead of ejecting ink, ink dots are formed on printing paper utilizing a phenomenon such as thermal transfer, or a system in which electrostatic charge is utilized to deposit toner of each color onto a printing medium, would also be possible.

Further, it would also be possible to use a so-called variable dot printer in which the size of ink dots formed on printing paper is controllable by unit of controlling size of ejected ink drops, or ejecting a plurality of ink drops all at once while controlling the number of ejected ink drops.

The color printer 200 having a hardware arrangement such as the above, by unit of driving the carriage motor 230, moves the ink ejection heads 244 to 247 for each color in the main scanning direction with respect to printing paper P, and by unit of driving the paper feed motor 235 moves the printing paper P in the sub-scanning direction. The control circuit 260, in accordance with the print data, drives the nozzles at appropriate timing to eject ink drops while repeating main scanning and sub-scanning of the carriage 240, in order for the color printer 200 to print a color image on the printing paper.

Figure 4:
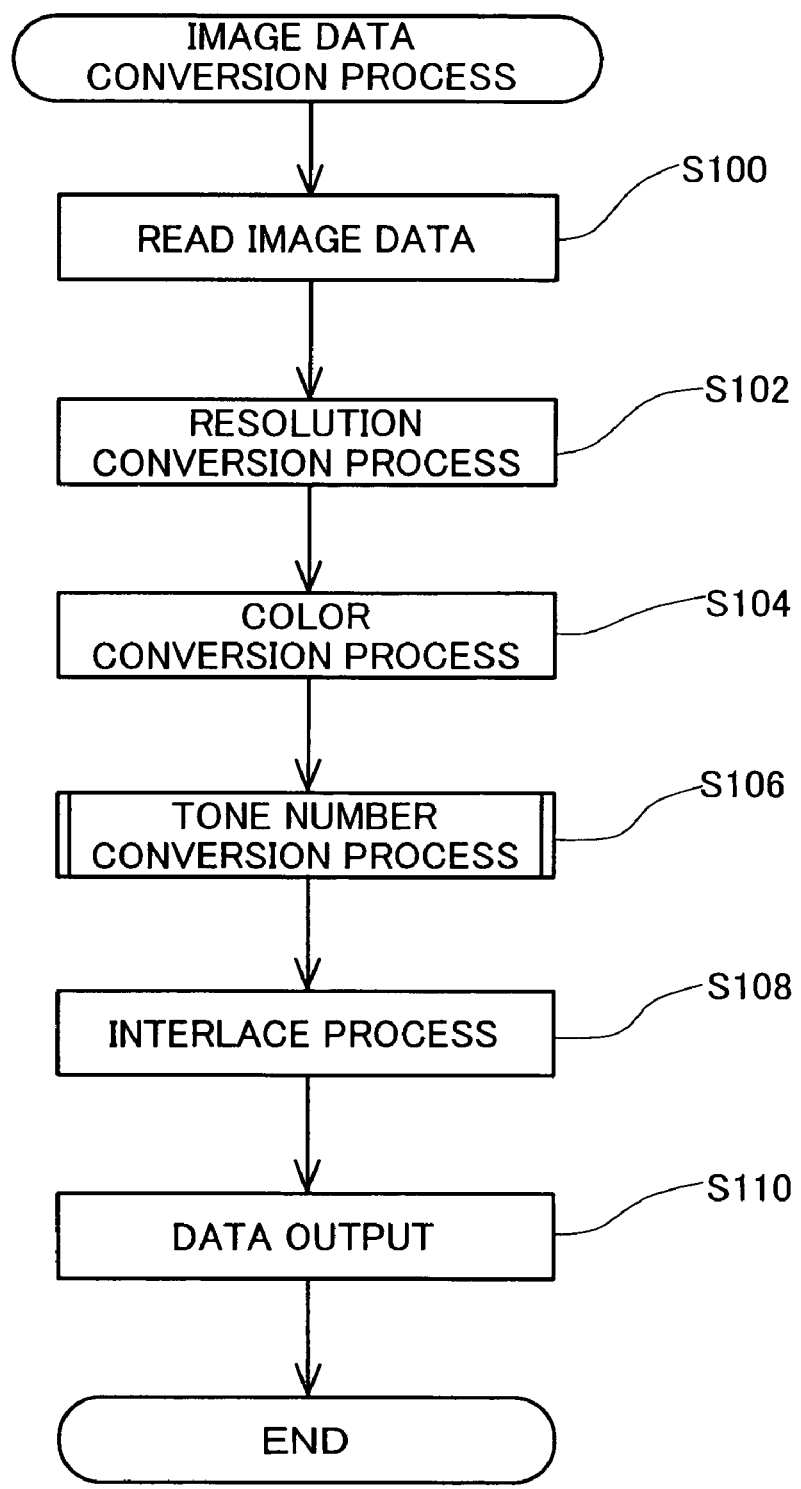
FIG. 4 is a flowchart showing the flow of the image data conversion process performed by the image processing apparatus in the embodiment.

C. Overview of Image Data Conversion Process:

FIG. 4 is a flowchart showing the flow of a process for converting image data to print data by unit of applying a predetermined image process to received image data, by computer 100 which is the image processing apparatus of this embodiment. The process is initiated by the operating system of computer 100 running the printer driver 12. Following is a brief description of the image data conversion process of the embodiment, made in accordance with FIG. 4.

When printer driver 12 starts the image data conversion process, first, reading of RGB color data to be converted commences (Step S100). Next, resolution of the acquired data is converted to resolution for printing by color printer 200 (Step S102). In the event that the resolution of color image data is lower than the print resolution, new data is generated between adjacent image data by carrying out linear interpolation, or conversely where it is higher than the print resolution, data will be thinned out in regular proportions, to convert the image data to print resolution.

When resolution is converted in this way, a color conversion process of the color image data is carried out (Step S104). The color conversion process is a process for converting color image data represented by a combination of R, G, B tone values into image data represented by a combination of tone values of the colors used by the color printer 200, such as C, M, Y, K etc. The color conversion process can be carried out rapidly by unit of making reference to a three dimensional numerical table termed a color conversion table.

The printer driver 12 now starts the tone number conversion process which follows the color conversion process (Step S106). The tone number conversion process is a process such as the following. By unit of the color conversion process, RGB image data is converted to tone data of the colors C, M, Y and K. The tone data of these colors is data having 256 tones, from a tone value of 0 to 255. In contrast to this, the color printer 200 of the embodiment can only assume a state of either "form a dot" or "do not form a dot." Accordingly, it is necessary to convert tone data of each color having 256 tones into image data represented by two tones representable by the color printer 200. The process for converting tone number in this way is the tone number conversion process. As will be described later, the printer driver 12 of the embodiment groups pixels in predetermined numbers into units, and carries out the tone number conversion process on a unit-by-unit basis, making a faster process possible. For processed units, pixels determined to have dots formed thereon are stored in memory, and tone number conversion is carried out while reflecting this data. By so doing, it is possible to reliably avoid the occurrence of a phenomenon whereby dots are formed in regular patterns, which is a concern where the tone number conversion process is carried out on a unit-by-unit basis. The details of the tone number conversion process will be described later.

Once the tone number conversion process has been completed in this manner, the printer driver starts the interlace process (Step S108). The interlace process is a process for sorting image data that has been converted to a format based on the on-off state (dot data) in the order in which it will be sent to the color printer 200 while taking into consideration the order of dot formation. Printer driver 12 outputs the image data ultimately derived by carrying out the interlace process, as print data to the color printer 200 (Step S110). The color printer 200 forms ink dots of each color on the printing medium, in accordance with the print data. As a result, a color image corresponding to the image data is printed on the printing medium.

D. Embodiment 1

The tone number conversion process of Embodiment 1 carried out during the image data conversion process shown in FIG. 4 is described below. As noted, in the tone number conversion process of this embodiment, a plurality of pixels are grouped into a unit, and the tone number conversion process is carried out on a unit-by-unit basis. Accordingly, by way of preparation for describing the tone number conversion process of Embodiment 1, first, the method for carrying out the tone number conversion process on a unit-by-unit basis is described, followed by a description of reflecting determination results for processed units in the dot on/off state determination in the tone number conversion process of Embodiment 1.

Figure 5:
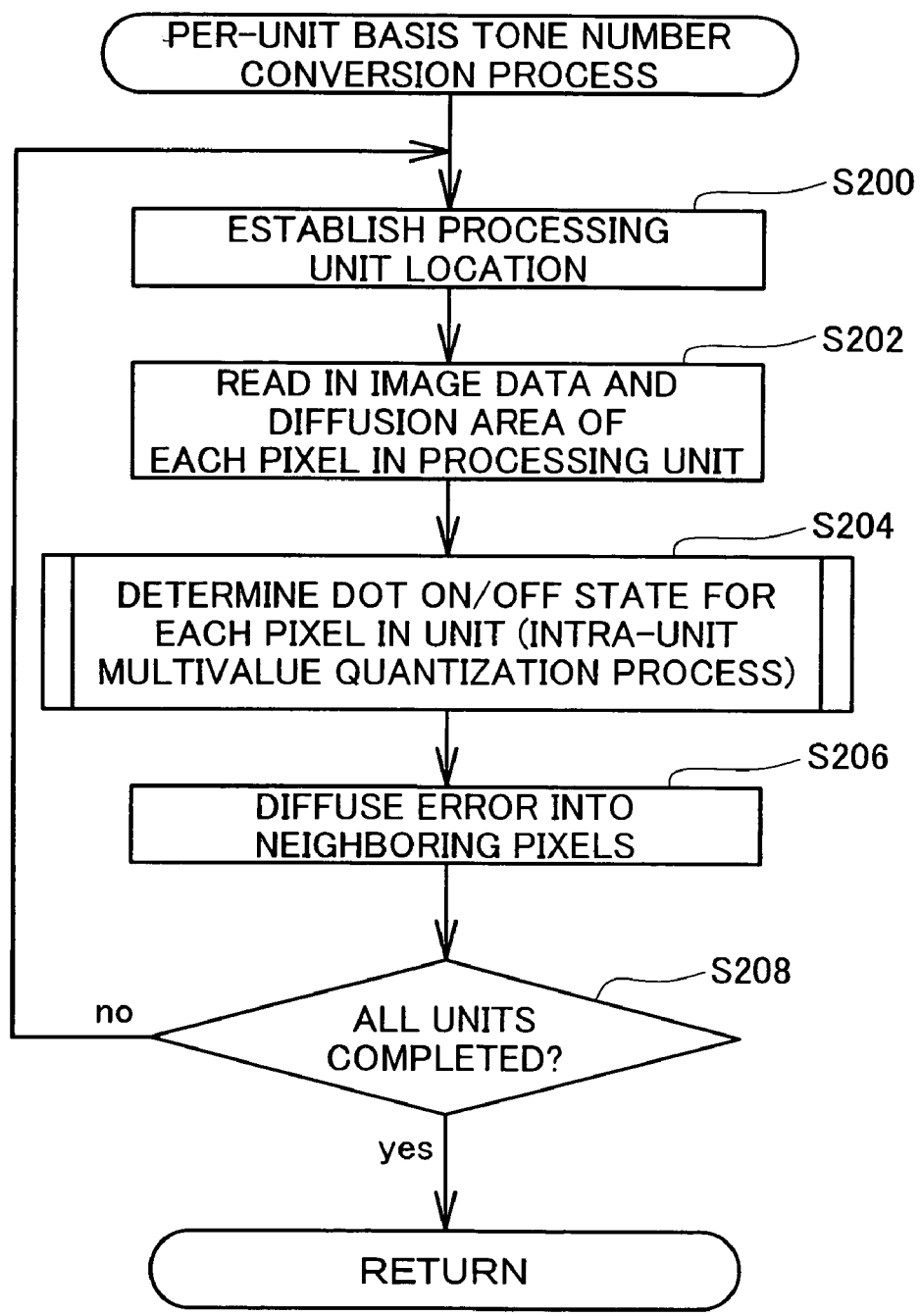
FIG. 5 is a flowchart showing the flow of the tone number conversion process carried out on a unit-by-unit basis.

D-1. Tone Number Conversion Process Performed on a Unit-by-unit Basis:

FIG. 5 is a flowchart showing the flow of the tone number conversion process carried out on a unit-by-unit basis. This process is performed by CPU 102 of computer 100. As noted, the color printer 200 of the embodiment is a printer capable of forming ink dots of the four colors C, M, Y, K; the process shown in FIG. 5 is also carried out on a color-by-color basis. However, in order to avoid a complicated description hereinbelow, description shall be made without reference to specific color, and in the absence of a particular statement otherwise, in the event that the description makes no reference to specific color, this will mean that a similar process is carried out for each color.

When a tone number conversion process on a per-unit basis commences, first, the location of a unit to be processed is established (Step S200). In a tone number conversion process carried out on a per-unit basis, a predetermined plural number of adjacent pixels are grouped as a unit, and the determination as to whether to form a dot on each pixel is carried out on a per-unit basis. Thus, when the tone number conversion process on a per-unit basis commences, first, there is carried out a process to establish the location of a unit for which dot on/off state in the image will be determined (processing unit).

FIG. 6 shows conceptually the condition of grouping a predetermined plural number of adjacent pixels and establishing the location of a processing unit. In FIG. 6, the multiple illustrated small squares are model depictions of pixels. As shown, an image is composed of a plurality of pixels arranged in a grid. In the example shown in FIG. 6A, there is established a processing unit which is a group of four adjacent pixels in two vertical and horizontal rows. In FIG. 6A, thick broken lines enclosing sets of four pixels model establishment of these pixels as processing units. For convenience in illustration, of the four pixels making up a unit, the upper left pixel is denoted "Pa", the upper right pixel as "Pb", the lower left pixel as denoted "Pc", and the lower right pixel as "Pd" to distinguish them. The description hereinbelow pertains to an arrangement in which a unit is composed of four pixels in two vertical and horizontal rows, but is of course not limited to units of this arrangement. For example, a process unit could be made up by grouping four adjacent pixels as shown in FIG. 6B. The number of pixels grouped into a unit is not limited to four; for example, processing units composed of two pixels as shown in FIG. 6C or FIG. 6D would also be acceptable.

Once a processing unit has been established, image data and diffusion error for each pixel in the unit are read (Step S202 of FIG. 5). The image data read here is tone data for the colors C, M, Y, K derived by color conversion by unit of the color conversion process described earlier (Step S104 of FIG. 4). Diffusion error is error occurring when tone error created by conversion of tone number is diffused into pixels of a processing unit from a neighboring unit. Since the image data is tone data of the colors C, M, Y, K, tone error occurs in each of the colors, and accordingly tone error is also tone data of each of these colors. Generation of tone errors in association with conversion of tone number, and diffusion of errors so generated into neighboring pixels will be described later.

Figure 6A:
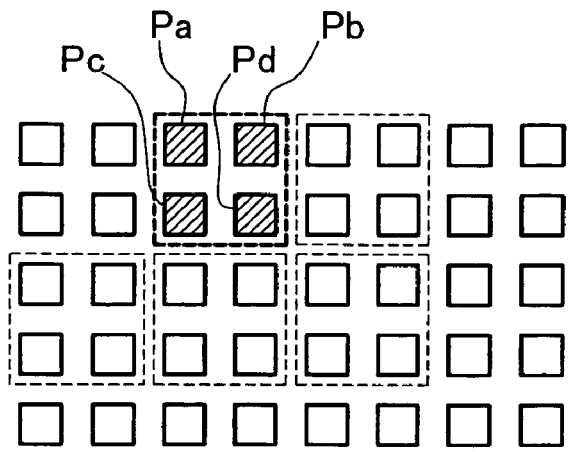
FIGS. 6A to 6D are schematic illustrations showing the condition of grouping a plurality of pixels to establish a processing unit.

Here, as shown in FIG. 6A, a processing unit is composed of four pixels, namely, pixel Pa, pixel Pb, pixel Pc, and pixel Pd, so in the process of Step S202 of FIG. 5, image data DTa, DTb, DTc and DTd and diffusion errors EDa, EDb, EDc, and EDd are read out. This data read out for the processing unit is stored in RAM 106 of computer 100.

Once image data and diffusion error for each pixel has been read out, a process to determine dot on/off state for each pixel making up the processing unit commences (Step S204). Here, as shown in FIG. 6A, since a processing unit is composed of four pixels, in the process of Step S204 dot on/off state is determined for these four pixels in a predetermined order.

In this Specification, the process of determining dot on/off state for each pixel in a unit in this way is sometimes termed a "multivalue quantization process within a unit." The specifics of multivalue quantization processes within units will be described in detail later.

Once a determination of dot on/off state has been completed for each pixel making up a processing unit, a process to diffuse into neighboring units tone error created in the processing unit in association with the determinations is carried out (Step S206). Tone error created within a unit is error representing deviation between tone values of image data to be represented by the processing unit as a whole, and tone values actually represented by unit of forming dots on pixels within the unit. The method for calculating tone error produced in a processing unit will be described in the description of the multivalue quantization process within a unit. In Step S206, a process to diffuse, as tone error produced in the processing unit, tone values representing this deviation into neighboring unprocessed units is carried out.

Figure 7:
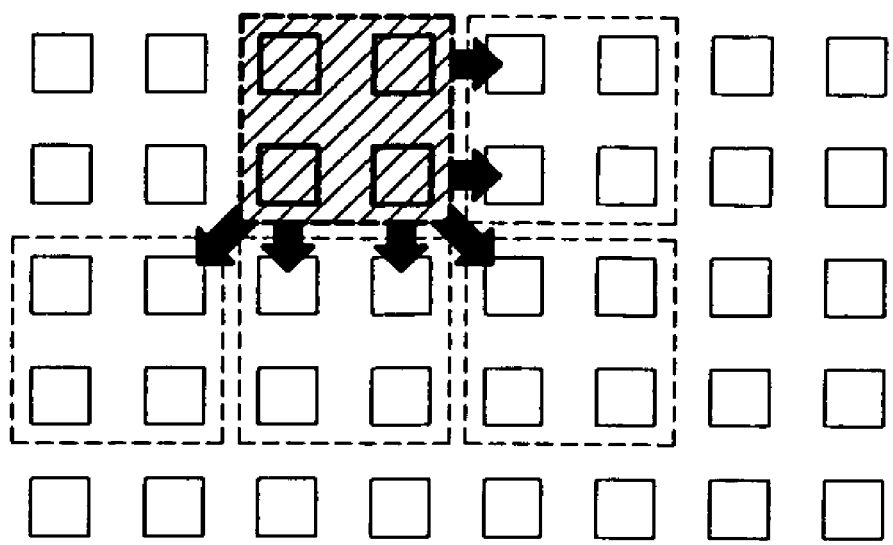
FIG. 7 is a schematic illustration showing the condition of diffusing tone error occurring in a processing unit into neighboring undetermined pixels.

FIG. 7 is a schematic illustration showing the condition of diffusing tone error produced in a processing unit into neighboring undetermined pixels. The multiple illustrated small squares shown in FIG. 7 are model depictions of pixels. The large square enclosed by heavy broken lines indicates the processing unit, and the large squares enclosed by thin broken lines indicate unprocessed units adjacent to the processing unit. Tone error produced in each processing unit is diffused at predetermined rates into the pixels making up neighboring unprocessed units. In FIG. 7 the black arrow symbols extending from the processing unit into six neighboring pixels depict in model terms the diffusion of tone error produced in a processing unit, into these six pixels at predetermined rates.

FIG. 8 shows an exemplary condition of establishing proportions for diffusing tone error occurring in a processing unit, into undetermined pixels neighboring the processing unit. In FIG. 8, the large square indicated by heavy solid lines represents the processing unit, and the large squares adjacent to the processing unit and indicated by thin broken lines represent unprocessed units. The plurality of small squares indicated by thin solid lines in these unprocessed units represent pixels into which error is diffused from the processing unit.

Figure 8A:
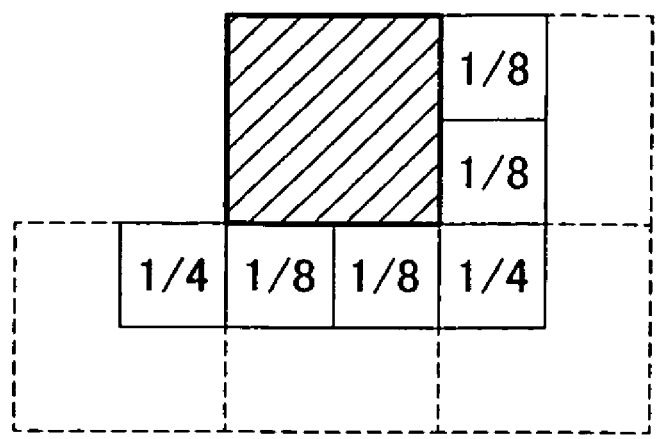
FIGS. 8A and 8B are schematic illustrations showing the rate of diffusion of tone error occurring in a processing unit into neighboring undetermined pixels.
Figure 8B:
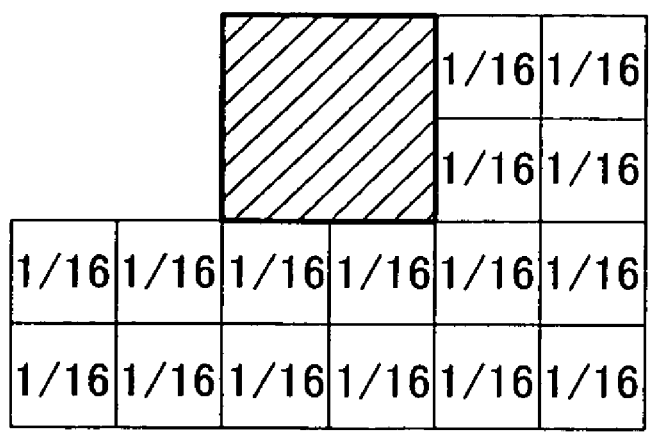

In the example shown in FIG. 8A, tone error produced in the processing unit is diffused in a proportion of ⅛ into the two pixels to the right of the processing unit; similarly, tone error is also diffused in a proportion of ⅛ into each of the two pixels below the processing unit. Tone error is diffused in a proportion of ¼ into the pixels at lower left and lower right of processing unit. By diffusing tone error in such proportions, each unit neighboring the processing unit will have equally diffused therein tone error in a proportion of ¼. In the example shown in FIG. 8B, tone error produced in the processing unit is diffused in the same proportion into all pixels making up neighboring units of the processing unit. Of course, error diffused into a given unit can also be diffused entirely into one pixel of the unit.

In Step S206 of FIG. 5, tone error produced in the processing unit is diffused into neighboring units in the preceding manner. As regards the processing unit, after all of the above-described processes have been completed, a determination is made as to whether the processes have been completed for all units making up the image (Step S208), and if any unprocessed units remain, the routine goes back to Step S200 and repeats the subsequent series of processes. In this way, once processes have been completed for all units, the tone number conversion process on a unit-by-unit basis concludes.

By carrying out the tone number conversion process on a unit-by-unit basis described above, advantages such as the following can be derived, as compared to the case where processing is on a pixel-by-pixel basis. Specifically, where the tone number conversion process is carried out on a pixel-by-pixel basis, each time that dot on/off state is determined for one pixel, diffusion error stored in memory in association with that pixel must be read out, and tone error produced by unit of the determination of dot on/off state must be diffused into neighboring undetermined pixels. Thus, where the tone number conversion process is carried out on a pixel-by-pixel basis, processing time has a tendency to become prolonged. In contrast, where the tone number conversion process is carried out on a unit-by-unit basis, image data can be read out on a unit-by-unit basis, and after tone error has been diffused, diffusion error can be written to memory on a unit-by-unit basis. By carrying out date read and write operations on a unit-by-unit basis, it is possible to reduce the time required for processing.

Figure 9:
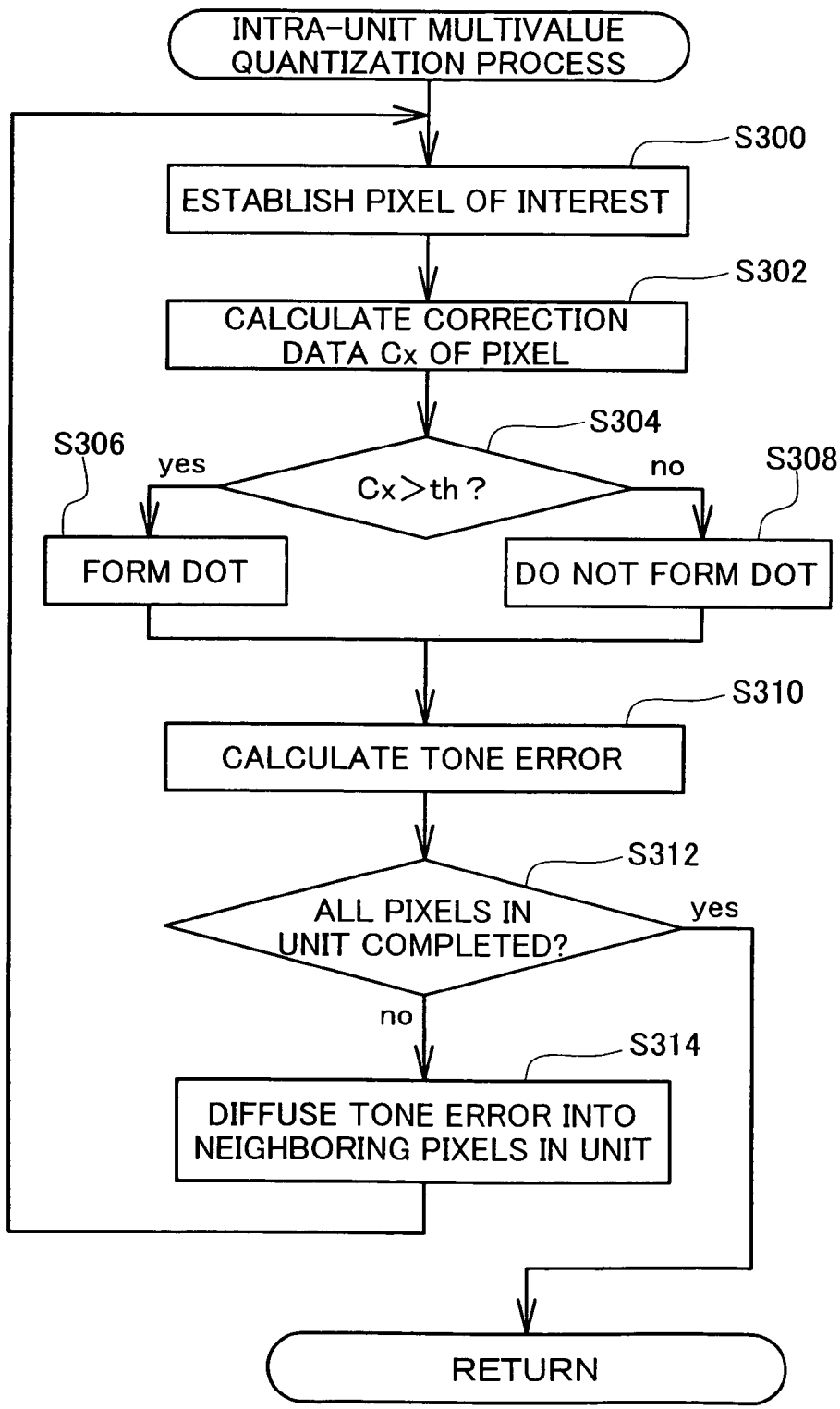
FIG. 9 is a flowchart showing the flow of the process for multivalue quantization in a unit by unit of determining dot on/off state for pixels making up the unit.

D-2. Intra-unit Multivalue Quantization Process:

The multivalue quantization process (Step S204 in FIG. 5) carried out in the tone number conversion process on a unit-by-unit basis described above will now be described. FIG. 9 is a flowchart showing the flow of the process for multivalue quantization in a unit. The following description is in accordance with the flowchart.

When the multivalue quantization process is initiated, first, from among the pixels that make up a processing unit, one pixel for determination of dot on/off state (pixel of interest) is established (Step S300). As noted, a unit is composed of a plurality of pixels, and thus with dot on/off state determined one pixel at a time in predetermined order for this plurality of pixels, one pixel of interest is selected. Here, with dot on/off state being determined for the four pixels making up the unit shown in FIG. 6A in the order pixel Pa, pixel Pb, pixel Pc, pixel Pd from the pixel at upper left towards the pixel at lower right, in Step S300, initially, pixel Pa in the upper left corner is established as the interested pixel.

Next, correction data Cx is calculated for the established pixel of interest (here, pixel Pa) (Step S302).

Correction data Cx can be calculated by adding together the image data of the interested pixel with the stored diffusion error diffused into the interested pixel. Image data and diffusion error for each pixel making up a processing unit have previously been read in Step S202 in the tone number conversion process shown in FIG. 5, and thus in Step S302 of the intra-unit multivalue quantization process, image data and diffusion error for the interested pixel taken from this data are added to calculate correction data Cx.

Once correction data Cx has been calculated for the interested pixel Pa, relative magnitude of the resultant correction data Cx and a predetermined threshold value th is compared (Step S304). If the correction data Cx is larger, it is determined to form a dot (Step S3306) on the interested pixel (here, pixel Pa), and if not, it is determined not to form a dot (Step S308). The result of this determination is stored in a variable indicating determination result for each pixel.

Once dot on/off state for the interested pixel has been determined in this way, the tone error produced in the interested pixel in association with the determination is calculated (Step S310). Tone error can be calculated by subtracting the tone value represented on the interested pixel by forming a dot, or not forming a dot (hereinafter this tone value is termed the result value) from the correction data Cx of the interested pixel.

Once diffusion error produced in a pixel of interest has been calculated, a determination is made to whether the process has been completed for all pixels within the processing unit (Step S312), and in the event that any unprocessed pixels remain (Step S312: no), a process to diffuse error into pixels surrounding a pixel of interest from among these unprocessed pixels is carried out (Step S314). This process will be described while referring to FIG. 10.

FIG. 10 is an illustration showing in model form the condition of selecting pixels on at a time from among pixels in a processing unit and determining dot on/off state, in order to determine dot on/off state on a per-unit basis. The four squares in the drawing represent pixel Pa, pixel Pb, pixel Pc and pixel Pd which make up the processing unit. DTa and EDa shown in the square representing pixel Pa show conceptually the fact that image data DTa and diffusion error EDa have been read into RAM 106 in association with pixel Pa. Similarly, image data DTb and diffusion error EDb associated with pixel Pb, image data DTc and diffusion error EDc associated with pixel Pc, and image data DTd and diffusion error EDd associated with pixel Pd are stored in RAM 106.

Figure 10A:
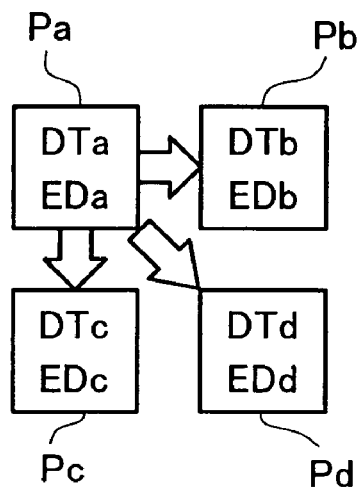
FIGS. 10A to 10D are schematic illustrations showing conceptually a method for determination of dot on/off state for each pixel, while diffusing error into each pixel in a unit.

As mentioned above, the interested pixel is initially established at pixel Pa among these four pixels. Image data and diffusion error for pixel Pa are read out, correction data Cx is calculated, and by comparison with threshold value th determination of dot on/off state is made for pixel Pa. At the point in time that determination of dot on/off state is made for pixel Pa, as shown in FIG. 10A, the three pixels of pixel Pb, pixel Pc, and pixel Pd remain as undetermined pixels in the same unit. Accordingly, a process to equally distribute ⅓ of the diffusion error produced in pixel Pa to each of these three pixels, and to add these errors to the diffusion error stored in memory for each pixel is carried out. For example, as shown in FIG. 10A, diffusion error EDb has already been stored in memory in association with pixel Pb. For tone error produced in pixel Pa, a tone value equal to ⅓ thereof is distributed to pixel Pb, and added to diffusion error EDb. As a result, the diffusion error EDb stored in memory in association with pixel Pb is updated to a new value of diffusion error EDb to which error from pixel Pa has been added.

A similar process is carried out for the other pixel Pc and pixel Pd. To describe briefly, when error is diffused from pixel Pa to pixel Pc, the error from pixel Pa is added to the diffusion error EDc stored at pixel Pc, and this is stored in association with pixel Pc as the new value of diffusion error EDc. Similarly, for pixel Pd as well, error from pixel Pa is added to the diffusion error EDd stored at pixel Pd, and this is stored in association with pixel Pd as the new value of diffusion error EDd. In FIG. 10A the white arrows shown pointing from pixel Pa to the other three pixels indicates in model terms diffusion of error produced in pixel Pa into these three pixels. Tone error need not necessarily be distributed equally to neighboring undetermined pixels, it being possible to be distributed to pixels in predetermined proportions.

Once tone error has been diffused into neighboring pixels in the unit by pixel Pa in this way, the routine returns to Step S300 of FIG. 9, and a process to establish a new pixel of interest is carried out. For pixel Pa in the processing unit, since determination of dot on/off state has been made already, in Step S300 pixel Pb to the right of pixel Pa is now established as the interested pixel. For the new pixel of interest established in this way, a process substantially the same as the process described above is carried out. The following brief description is centered on differences with the process in pixel Pa.

In the case where the process is carried out for pixel Pb, like the case in pixel Pa, first, correction data Cx is calculated (Step S302). Here, tone error previously produced in pixel Pa has been diffused into diffusion error EDb stored in association with pixel Pb and updated as new diffusion error EDb. By adding image data DTb for pixel Pb to the new diffusion error EDb reflecting tone error diffused from pixel Pa, correction data Cx is calculated for pixel Pb. Relative magnitude of the resultant correction data Cx calculated in this way and a predetermined threshold value th is compared (Step S304), and if the correction data Cx is larger, it is determined to form a dot (Step S306) on the interested pixel (here, pixel Pa), and if not, it is determined not to form a dot (Step S308). Next, tone error produced for pixel Pb is calculated (Step S310). As in the case of pixel Pa, tone error can be calculated by subtracting the result value from the correction data Cx of pixel Pb.

Once tone error produced in pixel Pb has been calculated, a determination is made to whether the process has been completed for all pixels within the processing unit (Step S312), and in the event that any unprocessed pixels remain, a process to diffuse calculated tone error into these unprocessed pixels is carried out (Step S314). As mentioned earlier, since determination for pixel Pa in the unit has been completed, those remaining as undetermined pixels are the two pixels of pixel Pc and pixel Pd. Accordingly, tone error produced in pixel Pb will be diffused into these two pixels. Again, referring to FIG. 10, the process of diffusing error from pixel Pb will be described.

Figure 10B:
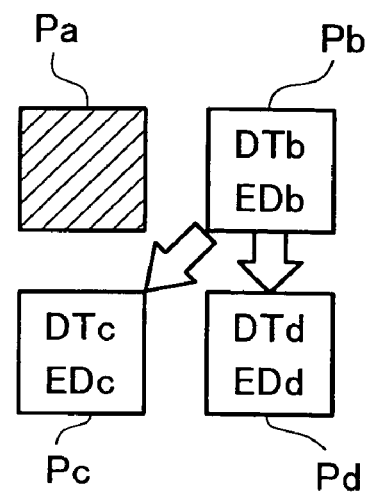

FIG. 10B is an illustration showing conceptually the condition of tone error produced in pixel Pb being diffused. In the drawing, the diagonal lines made on pixel Pa represent in model form that determination for pixel Pa has been completed. At the point in time that determination of dot on/off state is made for pixel Pb, the two pixels of pixel Pc and pixel Pd remain as undetermined pixels in the processing unit. Accordingly, as shown in FIG. 10B, ½ of the diffusion error produced in pixel Pb is diffused to each of these pixel Pc and pixel Pd. In the drawing, the white arrows pointing from pixel Pb to pixel Pc and pixel Pd represent in model form that tone error produced in pixel Pb is diffused into pixel Pc and pixel Pd. As a result of error being diffused in this manner, diffusion error of each pixel is updated to a new diffusion error to which diffused error has been added. Here, although tone error is diffused equally into undetermined pixels in the processing unit, it is of course acceptable to diffuse error in predetermined proportions rather than diffusing it equally.

Figure 10C:
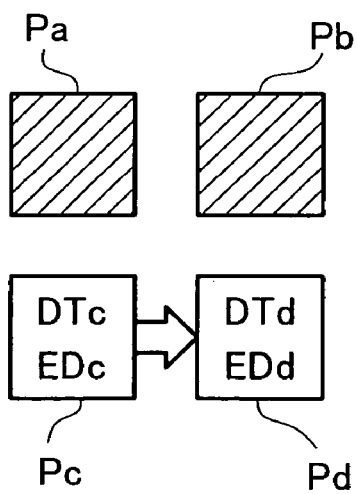

Once tone error produced in pixel Pb has been diffused into neighboring pixels in this way, the routine returns to Step S300 of FIG. 9, and after now moving the interested pixel to pixel Pc, a similar process is carried out for pixel of interest Pc. The following description of the process makes reference to FIG. 10C. When the process for pixel Pc is initiated, first, the image data DTc and diffusion error EDc of pixel Pc are added to calculate correction data Cx. Here, at the point in time that dot on/off state is initiated for pixel Pc, diffusion error EDc of pixel Pc has had added thereto, in addition to the diffusion error stored originally, error from pixel Pa and error from pixel Pb, and has been updated to a new diffusion error EDc. Thus, when calculating correction data Cx of pixel Pc, new diffusion error EDc will be calculated for the image data DTc of pixel Pc. By comparing the correction data Cx derived in this way with a predetermined threshold value th, a determination of dot on/off state is made for pixel Pc. At the point in time that dot on/off state is determined for pixel PC in this way, as shown in FIG. 10C pixel Pd is the sole underdetermined pixel remaining in the processing unit. Accordingly, all tone error produced in pixel Pc is diffused into pixel Pd, added to the diffusion error originally stored at pixel Pd, and updated as new diffusion error EDd.

Once tone error produced in pixel Pc has been diffused, the routine returns to Step S300 of FIG. 9, and after moving the interested pixel to pixel Pd, determination of dot on/off state for pixel Pd is initiated. Specifically, the new diffusion error EDd associated with pixel Pd and the image data DTd of pixel Pd are added and correction data Cx is calculated (Step S300, Step S302). Next, correction data Cx and a threshold value th are compared (Step S304), and in the event that correction data Cx is larger, it is determined to form a dot on pixel Pd (Step S306), or if not it is determined to not form a dot on pixel Pd (Step S308).

Figure 10D:
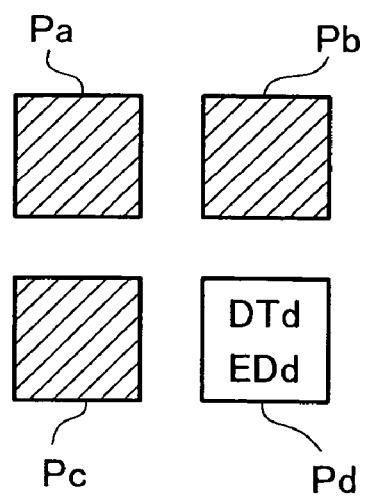

Once dot on/off state has been determined for pixel Pd in this way, after calculating tone error produced in pixel Pd (Step S310), a determination is made as to whether processing has been completed for all pixels in the processing unit (Step S312). As shown in FIG. 10D, at the point in time that the process is initiated for pixel Pd, no undetermined pixels remain in the processing unit, and in Step S312 after determination for pixel Pd is finished, it is determined that processing has been completed for all pixels in the processing unit. Accordingly, the intra-unit multivalue quantization process shown in FIG. 9 concludes, and the routine returns to the tone number conversion process carried out on a unit-by-unit basis described previously using FIG. 5. As shown in FIG. 5, in the tone number conversion process on a unit-by-unit basis, once the routine has returned from the intra-unit multivalue quantization process, a process to diffuse tone error produced in the processing unit into neighboring units is carried out (Step S206 of FIG. 5).

Here, as the value of tone error produced in the processing unit, there can be used the value of tone error calculated for pixel Pd in Step S310 of the intra-unit multivalue quantization process. This is because since determination of dot on/off state has been carried out while diffusing tone error produced in a pixel of interest into undetermined pixels in the unit, tone error produced in the unit is cumulated as diffusion error EDd in the pixel Pd which is determined last.

The following detailed description makes reference to FIG. 10.

Tone error produced in pixel Pa is diffused into three pixels, pixel Pb, pixel Pc, and pixel Pd, in the processing unit. When determining dot on/off state of pixel Pb, taking into consideration of error from pixel Pa, the determination of dot on/off state is made so as to eliminate insofar as possible error that has been diffused into pixel Pb.

Let it be supposed that by unit of determining dot on/off state for pixel Pb, error diffused into pixel Pb has been successfully eliminated. In this case, new tone will not be produced by pixel Pb, nor will error for diffusion from pixel Pb into pixel Pc and pixel Pd be produced. Assuming that in similar fashion for the other two pixel Pc and pixel Pd as well, by determining dot on/off state, error diffused into each pixel has been successfully eliminated, tone error will not be produced by these pixels either. Ultimately, in this instance, tone error produced by pixel Pa will be eliminated by neighboring undetermined pixel Pb, pixel Pc, and pixel Pd, so that production of tone error by the processing unit as a whole can be avoided.

Here, it has been assumed that error in pixel Pb is eliminated by unit of determining dot on/off state of pixel Pb, but in the event that new tone error is produced by pixel Pb, this error will be diffused into neighboring undetermined pixel Pc and pixel Pd, as a result of which tone error produced by pixel Pa and tone error produced by pixel Pb will be diffused into these pixels. However, where by determining dot on/off state for these pixel Pc and pixel Pd to error diffused into these pixels can be eliminated, still no tone error will be produced in the unit taken as a whole.

Even where not possible, by unit of determining dot on/off state of pixel Pc, to eliminate diffusion error diffused into pixel Pc, where it is possible to eliminate error in pixel Pd in exactly the same manner, no tone error will be produced in the unit as a whole. In other words, remaining error not eliminated in pixel Pd will be the error produced for the unit as a whole. In this way, where dot on/off state determinations are made while diffusing tone error produced by a pixel of interest into undetermined pixels in a unit, tone error that cannot be eliminated by pixels becomes aggregated in subsequent pixels, so it is possible to use tone error occurring in pixel Pd which is the last to be determined in the unit, as tone error produced in the processing unit as a whole.

While in the preceding description, the value of tone error occurring in pixel Pd, which is the last one whose pixel dot on/off state is determined in the processing unit, is used as tone error produced in the processing unit as a whole, it would of course be acceptable also to output tone error for each pixel making up a processing unit, designating the sum of the these tone errors as the tone error of the processing unit.

In the example shown in FIG. 10, when determining dot on/off state of pixels making up a unit of interest, determinations are made in the order pixel Pa, pixel Pb, pixel Pc, pixel Pd; however, determinations need not necessarily be made in this order, it being acceptable, for example, to determine dot on/off state in the order pixel Pa, pixel Pc, pixel Pb, pixel Pd. The order in which pixels of interest are established within processing units may be selected as an order giving good image quality.

D-3. Intra-Unit Multivalue Quantization Process of Embodiment 1:

As described hereinabove, where the tone number conversion process is carried out on a unit-by-unit basis, the same process is repeated for each unit. Due to this fact, for a pixel on which a dot is formed in a certain unit, there is a tendency to more readily determine to form a dot at the same location in subsequent units as well. Also, there are instances in which whereas for individual units, units in which a dot is formed and units in which it is not are produced, dots form in a regular pattern over a multi-unit cycle. For example, in the case that there is are successive areas of the same given image data, or other such multi-unit cycle, substantially the same process will be repeated, and it could occur that dots are formed cyclically on pixels at the same location within units. Of course, while the size of a dot per se is small enough as to be difficult to see, when dots are formed in a cyclical pattern over several units, the presence of this kind of area becomes visible and there is a risk of degraded image quality.

In order to avoid the occurrence of such problems, in Embodiment 1, an intra-unit multivalue quantization process is carried out, and when converting image data to dot data on a unit-by-unit basis, pixel locations at which dots were formed in previously processed units are detected, and dot on/off state is determined while reflecting the detection results. In this way, by determining dot on/off state while taking into consideration the history of pixel locations at which dots are formed in previously processed units, degradation of image quality that can occur by unit of converting image data on a unit-by-unit basis can be avoided. Following is a description of the intra-unit multivalue quantization process of Embodiment 1.

Figure 11:
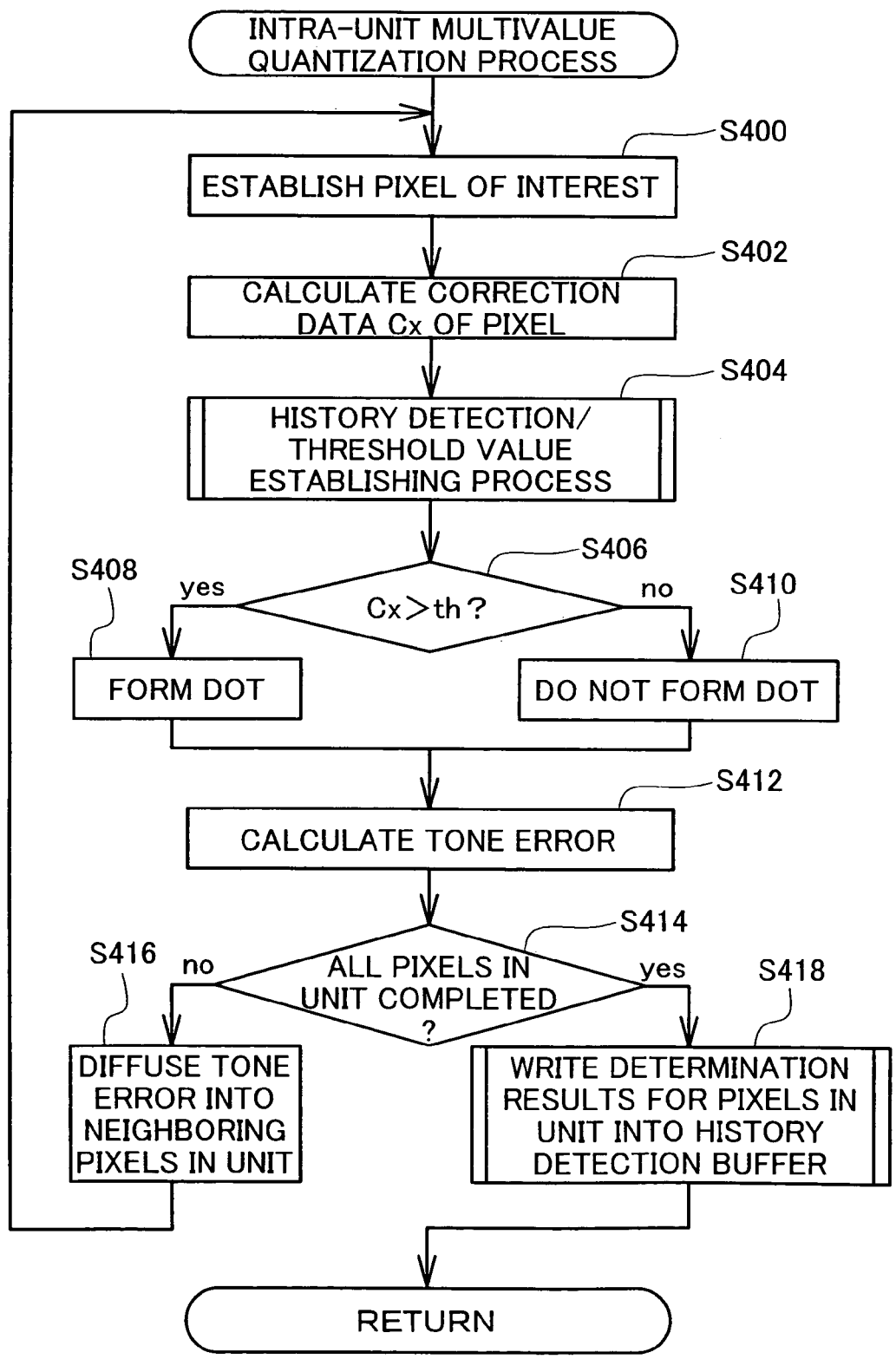
FIG. 11 is a flowchart showing the flow of the process in Embodiment 1 for multivalue quantization in a unit by unit of determining dot on/off state for pixels making up a unit.

FIG. 11 is a flowchart showing the flow of the intra-unit multivalue quantization process of Embodiment 1. In contrast to the intra-unit multivalue quantization process described using FIG. 9, this process differs appreciably in that the tone number conversion process is carried out while detecting pixel locations at which dots were formed in processed units, and reflecting the detection results. Following is a description of the intra-unit multivalue quantization process of Embodiment 1, centering of the differences with the intra-unit multivalue quantization process described previously.

In the intra-unit multivalue quantization process of Embodiment 1 as well, when the process starts, one pixel of interest is established from within the processing unit (Step S400), and correction data Cx is calculated for the established pixel of interest (Step S402). Correction data Cx can be calculated by adding together the image data of the interested pixel with the stored diffusion error diffused into the interested pixel. Image data and diffusion error for each pixel making up a processing unit have previously been read in Step S202 in the tone number conversion process shown in FIG. 5, and correction data Cx is calculated using data for the interested pixel taken from this data.

Next, in the intra-unit multivalue quantization process of Embodiment 1, a process of detecting the history of pixel locations of dots formed in processed units, and establishing an appropriate value for a threshold value th on the basis of detection results is carried out (Step S404). This process (history detection/threshold value establishing process) is described with reference to FIG. 12.

Figure 12:
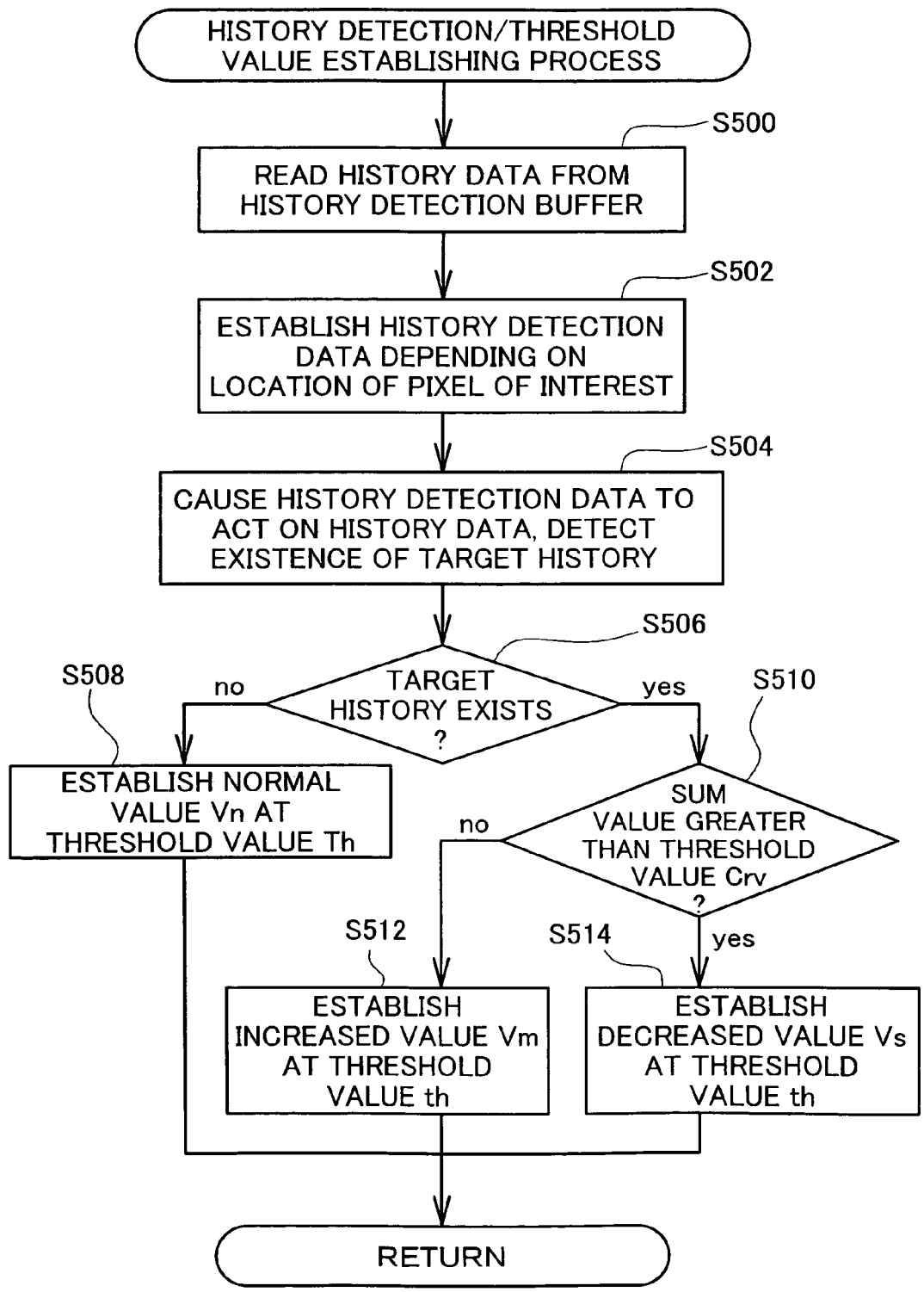
FIG. 12 is a flowchart showing the flow of the process in Embodiment 1 for detecting dot formation status and establishing the value of the threshold value.

FIG. 12 is a flowchart showing the flow of the history detection/threshold value establishing process. When the history detection/threshold value establishing process is initiated, first, a process to read out history data is carried out (Step S500). History data is data for previously processed units, recording pixel positions at which it was determined to form dots; it is stored in a dedicated buffer (history detection buffer) secured in a specific area in RAM 106.

Figure 13A:
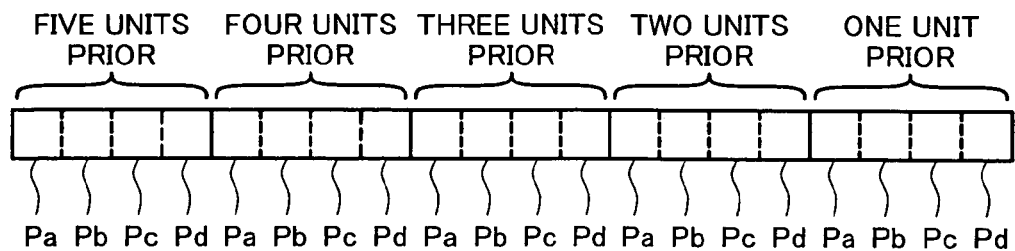
FIGS. 13A to 13C are schematic illustrations showing conceptually the structure of history data read out in the history detection/threshold value establishing process of Embodiment 1.

FIG. 13A is an illustration showing conceptually the structure of history data. The history data shown in FIG. 13A has 20-bit length, each bit corresponding to a pixel location. As mentioned previously, here, since one unit is composed of four pixels, 20-bit history data will store pixels for five units. Here, while there is described history data in which five units of data are stored, the number of units of stored data is not limited to five, it being possible to store a greater number of units of data, or to store a smaller number of units of data. Following is a specific description making reference to FIG. 13A.

As shown in the drawing, history data can be interpreted as being divided into five blocks, with four consecutive bits constituting one block. These five blocks, in order from the low order end (the right side in the drawing), are associated respectively with five units, namely, the unit processed just prior to the unit currently being processed (unit one unit prior), the unit processed just prior to that (unit two units prior), and the unit processed just prior to that (unit three units prior). The four bits making up each block, in order from the low order end, are associated respectively with the pixel in the lower right corner (pixel Pd) of the corresponding unit, the pixel in the lower left corner (pixel Pc), the pixel in the upper right corner (pixel Pb), and the pixel in the upper left corner (pixel Pa). A "1" recorded in a bit in history data unit that a dot is formed on the pixel corresponding to that bit; conversely, where a "0" is stored in a bit, this unit that no dot is formed on the pixel corresponding to that bit.

In FIG. 13, the interpretation of 4 bits as one block is because here, it corresponds to the fact that one unit is composed of four pixels (see FIG. 6A). Accordingly, where one unit is composed of a number N of pixels, history data will be interpreted with N bits as one block. Here, history data is described as being 20-bit data, but where one unit is composed of N pixels, and reference is made to dot formation status up to the unit processed M units prior to the processing unit, it would be acceptable for history data to have data length of N×M bits.

Figure 13B:
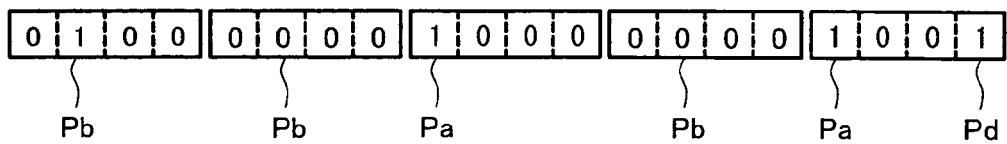
Figure 13C:
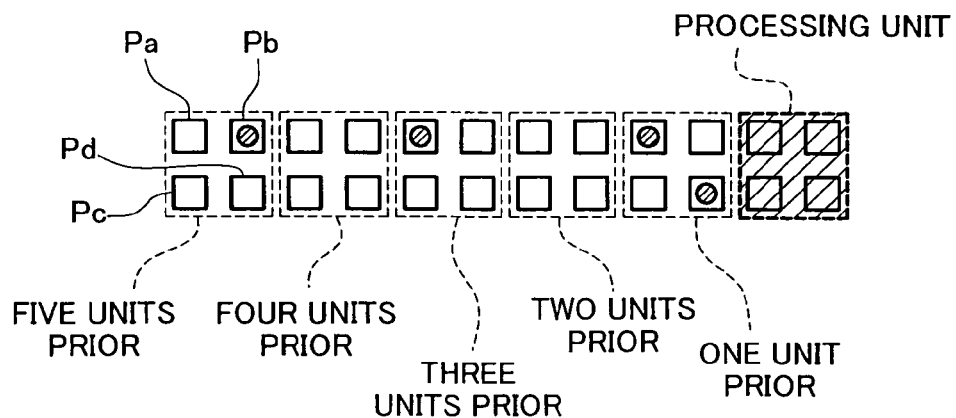

As one example, assume history data like that shown in FIG. 13B. Focusing on a group consisting of four bits at the lower order end (the right side in the drawing) of the history data, a value of "1" is established in the highest order (left end) bit and lowest order (right end) bit in this group, with a value of "0" established for the other bits. This unit that in the unit processed just prior to the unit being processed (unit one unit prior), dots have been formed on two pixels, namely, pixel Pa and pixel Pd, with no dots formed at other pixel locations. Similarly, in the group to the immediate left in the drawing, since a value of "0" is stored in each bit, this unit that in the unit processed two units prior to the unit being processed, no dot is formed on any pixel. For the group further to the immediate left thereof in the drawing, since a value of "1" is stored in the highest order bit in the group, this unit that in the unit processed three units prior to the unit being processed a dot has been formed at the pixel location of pixel Pa. By interpreting history data in this way, the dot formation status shown in FIG. 13C can be ascertained from the hypothetical history data in FIG. 13B.

In Step S500 of FIG. 12, a process to read out history data from a history detection buffer secured in a specific area in RAM 106 is carried out. In this way, once history data is read, next, a process to establish history detection data is initiated (Step S502). This process will be described with reference to FIG. 14 to FIG. 16.

When establishing history detection data, a number of units for which history will be detected is established. This is due to reasons such as the following. As mentioned above, in the intra-unit multivalue quantization process, because dot on/off state for pixels is determined on a unit-by-unit basis, there are instances in which dots tend to be formed at identical pixel locations. For example, let it be assumed that an area being processed in an image is an area of relatively low-tone image data (bright image area) such that dots are formed at a rate of 1 pixel per 36 pixels. In such an area, in square areas composed of a total of 36 pixels in a 6×6 pixel array, dots are formed at rates of substantially one each. Where dot on/off state is determined for such an image data area, on a unit-by-unit basis designating four pixels (2×2 pixels) as one unit, it may occur that an identical process is repeated over a cycle of substantially three units (6 pixel equivalent), with dots being formed at identical pixel location in every third unit.

In areas where dots are formed even more sparsely, for example, in an area in which dots are formed at a rate of 1 pixel per 100 pixels, in square areas composed of a 10×10 pixels, dots will be formed at rates of substantially one each. Accordingly, where dot on/off state is determined on a unit-by-unit basis designating four pixels as one unit, as a result of an identical process being repeated over a cycle of five units (10 pixel equivalent), dots are formed at identical pixel location in every fifth unit.

Further, even in areas where dots are formed on substantially all pixels, with pixels having no dot formed thereon occurring sparsely, substantially the same thing can occur. For example, in an area in which dots are formed at high density, there are instances in which pixels with no dot formed thereon occur cyclically. Naturally, since dot bleed has an effect, in an area in which dots are formed at high density, it tends to be more difficult for a cyclical pattern to stand out than it would in an area in which dots are formed sparsely, and thus even if history of as many units as for an area in which dots are formed sparsely is not taken into consideration, adverse effects on image quality tend not to show up.

In this way, the cycle over which dots are formed in a regular pattern may in some instances differ depending on the density at which dots are formed, in other words, depending on the tone values of image data used to determine dot on/off state. In areas in which dots are formed sparsely, in order to detect a long cycle pattern, it is necessary to detect history of distant units, whereas in areas in which dots are formed at a certain level of density, there is no need to detect history of units that are so distant. Accordingly, when establishing history detection data, first, there is established the extent of distance of units for which history will be detected, i.e. the number of units to be detected.

Figure 14:
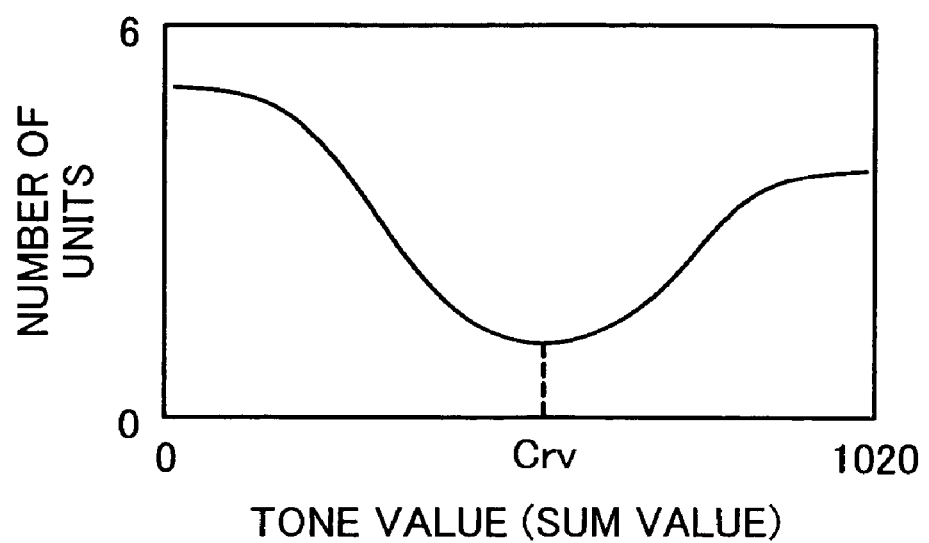
FIG. 14 is a schematic illustration showing the condition of establishing a number of units for history detection, associated with the sum of tone values of pixels making up a unit.

FIG. 14 is an illustration showing conceptually the condition of establishing a number of units for history detection, depending on tone values of image data. As shown in the drawing, numbers of units for history detection, associated in advance with tone values of image data, are stored in the printer driver. In FIG. 14, there is shown a case in which the number of units is associated with the sum total of tone values of pixels making up a unit targeted for processing, but this is not limiting, it being acceptable also to store it associated with, for example, the average value of tone values within a unit, or associated with tone values of pixels making up a unit.

Tone value Crv shown in FIG. 14 indicates a threshold value which serves as a benchmark as to whether, based on detected history, to make it easy for a dot form, or make it hard for a dot to form. Specifically, as mentioned previously, in areas in which dots are formed sparsely, there is a risk that adverse effects on image quality will appear by dots forming cyclically, and thus in order to avoid this kind of cyclical pattern, it is preferable to make it so that dots are not formed cyclically. On the other hand, in areas where dots are formed at high density, there is a risk that adverse effects on image quality will appear due to cyclic occurrence of pixels having no dot formed thereon, and thus in order to avoid this kind of cyclical pattern, it is preferable to make it so that dots are formed on pixels having no dot formed thereon. That is, in the event that a cyclical pattern has occurred, formation of dots will be suppressed in low-tone areas, whereas formation of dots will be promoted in high-tone areas. The tone value Crv shown in FIG. 14 is a threshold value for determining whether dot formation should be suppressed or promoted in this way; where the sum of tone values is smaller than threshold value Crv the determination is made to suppress formation of dots, or if the sum is greater than threshold value Crv, to promote formation of dots.

Figure 15A:
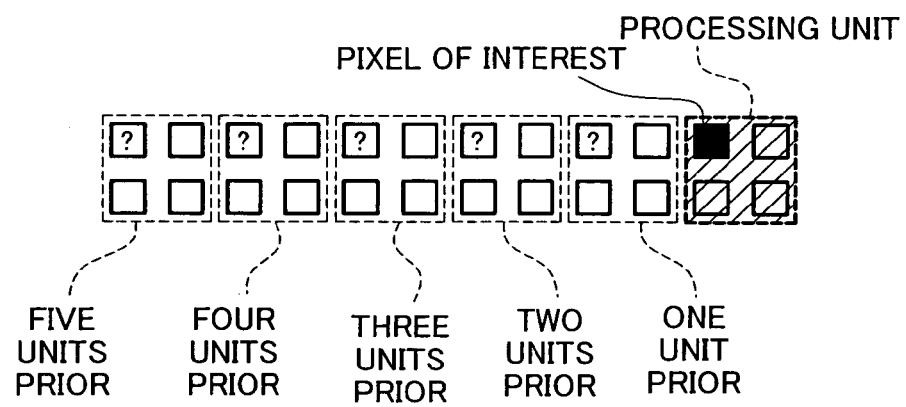
FIGS. 15A to 15C are schematic illustrations showing conceptually the structure of history detection data established for the purpose of detecting history in the history detection/threshold value establishing process of Embodiment 1.

Once a number of units for detecting history has been established on the basis of the correspondence relationship shown in FIG. 14, history detection data is established, depending on the location of the pixel whose dot on/off state is being determined (pixel of interest). As noted, depending on the sum of values of the tone values within a unit, dot formation may be either suppressed or promoted; the discussion hereinbelow relates to a case where the sum value is smaller than threshold value Crv (a case where dot formation is suppressed). As one example, consider the case of determining dot on/off state for pixel Pa in a processing unit. In FIG. 15A, the large square denoted by heavy broken lines with diagonal hatching represents the processing unit, and the black square inside the processing unit represents the interested pixel.

Here, the description supposes that since tone values of the image data are small so that it is necessary to detect history up to the unit five units prior to the processing unit, and that it is to be detected whether a dot has been formed on pixel Pa in these five units. In FIG. 15A, the "?" symbol shown on pixel Pa in each unit represents in model form that dot formation status at these pixel locations is to be detected.

Figure 15B:
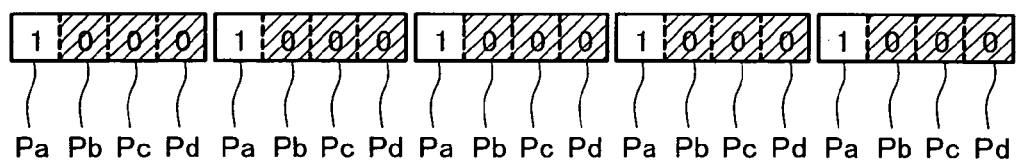

FIG. 15B is an illustration showing conceptually history detection data established for the purpose of detecting dot formation status at these pixel locations. Like the history data described earlier, history detection data also has 20-bit length, and is interpreted as being divided into five groups, with four bits constituting one group. The fact that history detection data is composed of five groups corresponds to the fact that, as described using FIG. 13, history data stores data equivalent to five units. The fact that one group is made up of four bits is because, in the embodiment, four pixels are grouped into one unit for processing. The correspondence relationship between groups of history detection data and units, and the correspondence relationship between bits and pixel locations, are similar to those in the case of the history data shown in FIG. 13, and description will be omitted here. Here, history detection data is described as being data of the same length as the history data shown in FIG. 13, but is not limited thereto.

As shown in FIG. 15A, here, since there is hypothetically presented a case in which, for all five units, dot formation status at pixel Pa is detected, the history detection data may consist of data in which a value of "1" is established only in the bit corresponding to pixel Pa in each unit, with a value of "0" established in other bits.

Figure 15C:
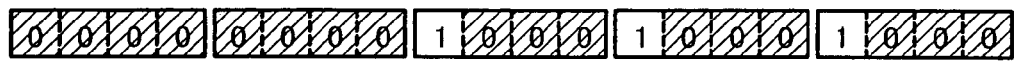

Also, where image data tone values are not so small, and accordingly it is acceptable to detect history equivalent to three units, history detection data may consist of the data shown in FIG. 15C. Specifically, for the unit three units prior to the processing unit, data in which a value of "1" is established in the bit corresponding to pixel Pa, with a value of "0" established in other bits, is acceptable.

Figure 16A:
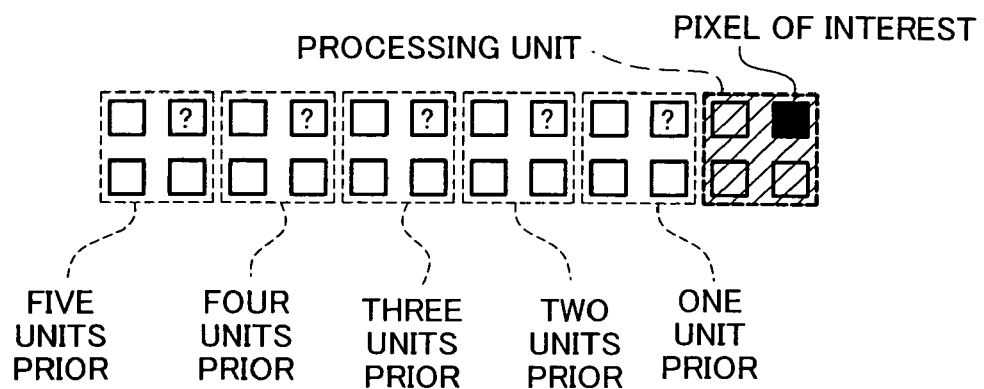
FIGS. 16A to 16C are schematic illustrations showing conceptually the structure of different history detection data.
Figure 16B:
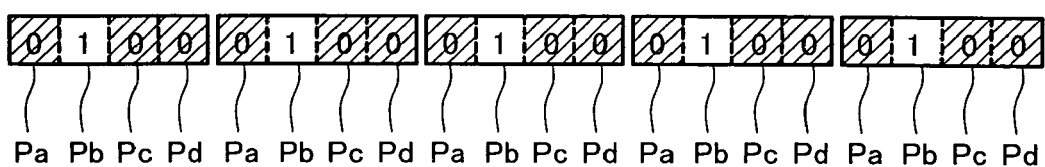
Figure 16C:
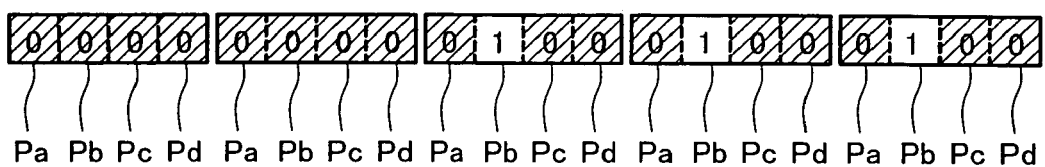

In the same manner, where the interested pixel is established at pixel Pb, it is acceptable to detect whether a dot has been formed on pixel Pb in each unit, within a range up to an established number of units from the processing unit. FIG. 16A is an illustration showing pixel locations for detecting dot formation status in each unit, where the interested pixel has been established at pixel Pb. In the drawing, pixels indicated by a "?" represent pixels whose dot formation status needs to be detected. FIG. 16B is an illustration showing conceptually history detection data established for the purpose of detecting dot formation status on such pixels. As shown in the drawing, history detection data in this case may be data established with a value of "1" for bits corresponding to pixel Pb in each unit, and a value of "0" for other bits. Where it is sufficient to detect history equivalent to three units, the history detection data may be data like that shown in FIG. 16C.

In Step S502 in FIG. 12, as described above, a process to establish history detection data depending on the location of the interested pixel is carried out.

Once history detection data has been established in this way, the established history detection data is made to act upon the history data read in Step S500, in order to detect formation status of dots targeted for detection (hereinbelow, formation status of dots for which history detection data has been established and which are targeted for detection shall sometimes be referred to as "target history") (Step S504).

Figure 17A:
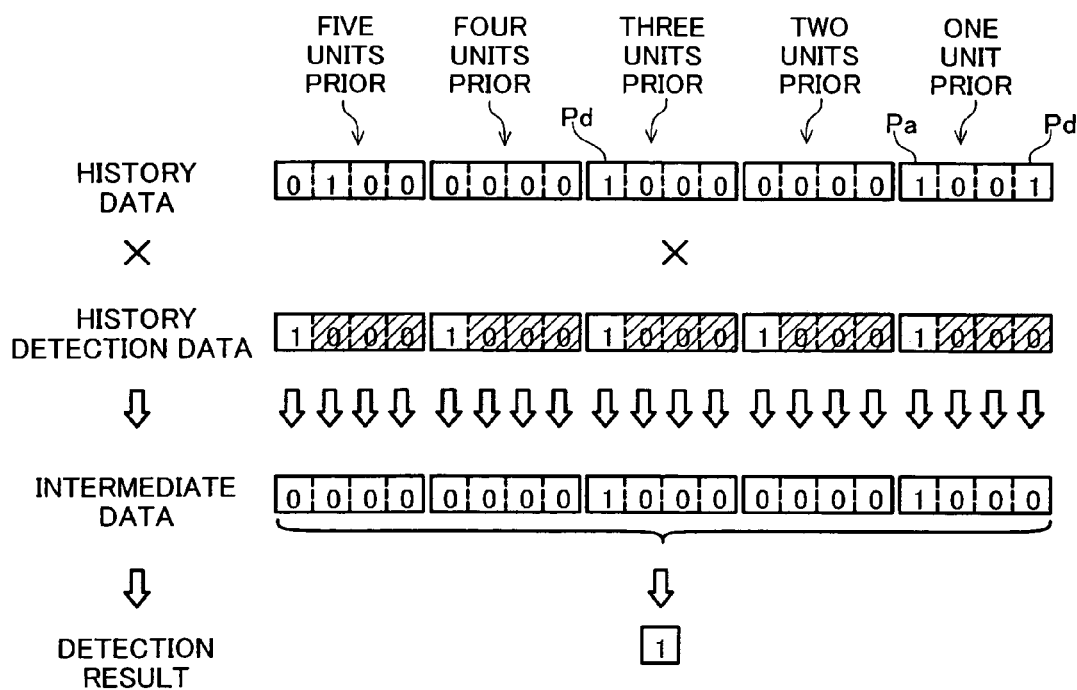
FIGS. 17A and 17B are schematic illustrations showing conceptually the condition of causing history detection data to act on history data to detect target history in the history detection/threshold value establishing process of Embodiment 1.

FIG. 17A is an illustration showing conceptually the condition of causing history detection data to act upon history data, in order to detect target history. At the top in FIG. 17A is shown history data, and below the history data is shown history detection data. During detection of target history, first, between the history data and history detection data, the logical product of equivalent bits is calculated. Next, by taking the logical sum of bits of intermediate data obtained in this way, target history can be detected. In this Specification, "causing history detection data to act upon history data" refers to calculation of intermediate data by unit of taking the logical product of equivalent bits, between the history data and history detection data. In FIG. 17A, intermediate data calculated by causing history detection data to act on history data is shown below the history detection data. As mentioned previously, for history detection data, a value of "1" is established only at the pixel location to be detected in each unit, with values of "0" being established at pixel locations for which detection in unnecessary, and thus when the logical product of bits in history data and history detection data is calculated, a value of "1" of the bit corresponding to a pixel location being detected will be established on in the event that a dot has been formed at that pixel location.

The process will be described more specifically, focusing on the "unit one prior" shown in FIG. 17A. As shown in the history data, in the "unit one prior" to the processing unit dots are formed on pixel Pa and pixel Pd. Here, since the pixel location at which dot formation status is to be detected is pixel Pa only, as shown in FIG. 17A, the intermediate data will have a value of "1" only for the bit corresponding to pixel Pa, with values of "0" for other bits. In this way, a value of "1" for any bit of intermediate data unit that in that unit, a dot is formed at the pixel location that is being detected. In this way, by analyzing values of each bit of intermediate data, it possible to detect on a per-unit basis whether a dot has been formed at the pixel location being detected.

In Step S504 of FIG. 12, in the above manner, a process for taking the logical sum of each bit of intermediate data and calculating detection results is carried out. On the basis of detection results derived in this manner, it is determined whether target history has been detected (Step S506). In the event that the value of the detection results is "0", it is determined that target history has not been detected. That is, the fact that the value of detection results (i.e. the logical sum of bits of intermediate data) is "0" unit that no dot is formed at the pixel location being detected, in any of the units targeted for detection. Accordingly, if the value of detection results is "0", it can be determined that target history has not been detected. Conversely, if the value of detection results is "1", this unit that in any unit among units targeted for detection, a dot is formed at the pixel location being detected, and it can be determined that target history has been detected.

In the intermediate data shown in FIG. 17A, since a value of "1" has been established in bits in the "unit one prior" and "unit three prior", when the logical sum of the bits in this intermediate data is taken and detection results are calculated, a value of "1" will be obtained. Accordingly, in this event target history will be detected.

Figure 17B:
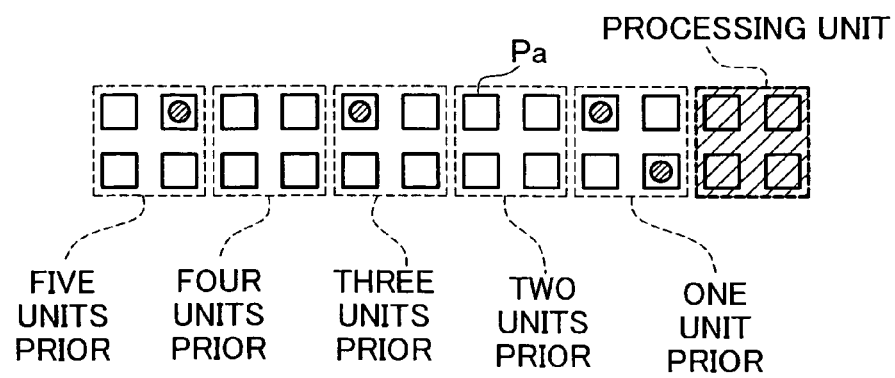

For reference, dot formation status represented by the history data shown at top in FIG. 17A is shown in FIG. 17B. As shown in FIG. 17A, the detection result calculated from the intermediate data has a value of "1", the result indicating the fact that a dot is formed on pixel Pa. As shown in FIG. 17B, clearly, a dot is formed at the location of pixel Pa in the "unit one prior" and "unit three prior" to the processing unit. From this, it may be seen that, by using a method of causing history detection data to act on history data, it is possible to accurately detect dot formation status.

In the preceding description, there was described the case where dots are formed sparsely, i.e. the case where the sum of tone values in the unit is smaller than the threshold value Crv of FIG. 14. The case where the sum of tone values is greater than the threshold value Crv can be considered in substantially similar fashion. That is, in a high-tone value area, while there is a significant difference in that sparse formation of a regular pattern by pixels having no dot formed thereon is avoided, in other respects, the cases are substantially similar. Accordingly, in high-tone value areas, it would be acceptable to reverse the history data, i.e. to establish a "0" for any bit having a "1" established and to establish a "1" for any bit having a "0" established, and to subject the resultant data to the action of history detection data as shown in FIG. 17. By then taking the logical sum of the intermediate data, cyclical occurrence of pixels having no dot formed thereon could be detected.

In the history detection/threshold value establishing process of FIG. 12, a process to establish an appropriate value for threshold value th on the basis of detected target history is carried out. Specifically, in the event that target history was not detected in Step S506, a normal value Vn is established as the threshold value th (Step S508).

Conversely, in the case that target history was detected, a determination is made as to whether the sum of the tone values in the unit is greater than the threshold value Crv shown in FIG. 14 (Step S510), and in the event that the sum value is smaller than threshold value Crv (Step S510: no), an increased value Vm set to a value greater than normal value Vn is established as the threshold value th (Step S512).

Conversely, in the event that the sum value is greater than threshold value Crv (Step S510: yes), an increased value Vs set to a value greater than normal value Vn is established as the threshold value th (Step S514). The threshold value th set here is referred to for the purpose of determining whether or not a dot will be formed on the interested pixel in the intra-unit multivalue quantization process. Once the threshold value th is set, the history detection/threshold value establishing process of FIG. 12 concludes, and the routine returns to the intra-unit multivalue quantization process of Embodiment 1 shown in FIG. 11.

After returning from the history detection/threshold value establishing process, the relative magnitude of threshold value th and the correction data Cx calculated in Step S402 is determined (Step S406). This threshold value th has been set to an appropriate value by unit of detecting target history in the history detection/threshold value establishing process. If correction data Cx is larger (Step S406: yes), it is determined to form a dot on the interested pixel, or if not (Step S406: no), it is determined not to form a dot (Step S410). As described using FIG. 12, in an area of low image data tone value, if target history is detected the value of threshold value th is modified to a predetermined increased value (Vm) greater than the value normally used (normal value Vn), and thus ultimately, in the event that target history is detected, it will be difficult for a dot to be formed on the interested pixel. In an area of high image data tone value, if target history is detected the value of threshold value th is modified to a predetermined decreased value (Vs) smaller than the value normally used (normal value Vn). As a result, when target history is detected, it will be easy for a dot to be formed on the interested pixel. Dot on/off state determination results derived in this way are stored in a variable indicating determination result for each pixel.

Once dot on/off state has been determined for the interested pixel in the above manner, tone error produced in association with the determination is calculated (Step S412). The method for calculating tone error is similar to the intra-unit multivalue quantization process shown in FIG. 9, and description of it will be dispensed with here. Next, determination is made as to whether the process has been completed for all pixels within the processing unit (Step S414). In the event that unprocessed pixels remain (Step S414: no), after performing a process to diffuse the error into neighboring pixels in the unit (Step S416), the routine returns to Step S400, moves the interested pixel, and repeats the subsequent series of processes. The process for diffusing error in to pixels in the processing unit in Step S416 can be carried out similarly to the intra-unit multivalue quantization process described using FIG. 9 and FIG. 10.

On the other hand, in the event that in Step S414 it is determined that the process has been completed for all pixels within the processing unit (Step S414: no), a process in which determination results for pixels in the processing unit are written to a history detection buffer is carried out (Step S418). This process will be described with reference to FIG. 18 and FIG. 19.

Figure 18:
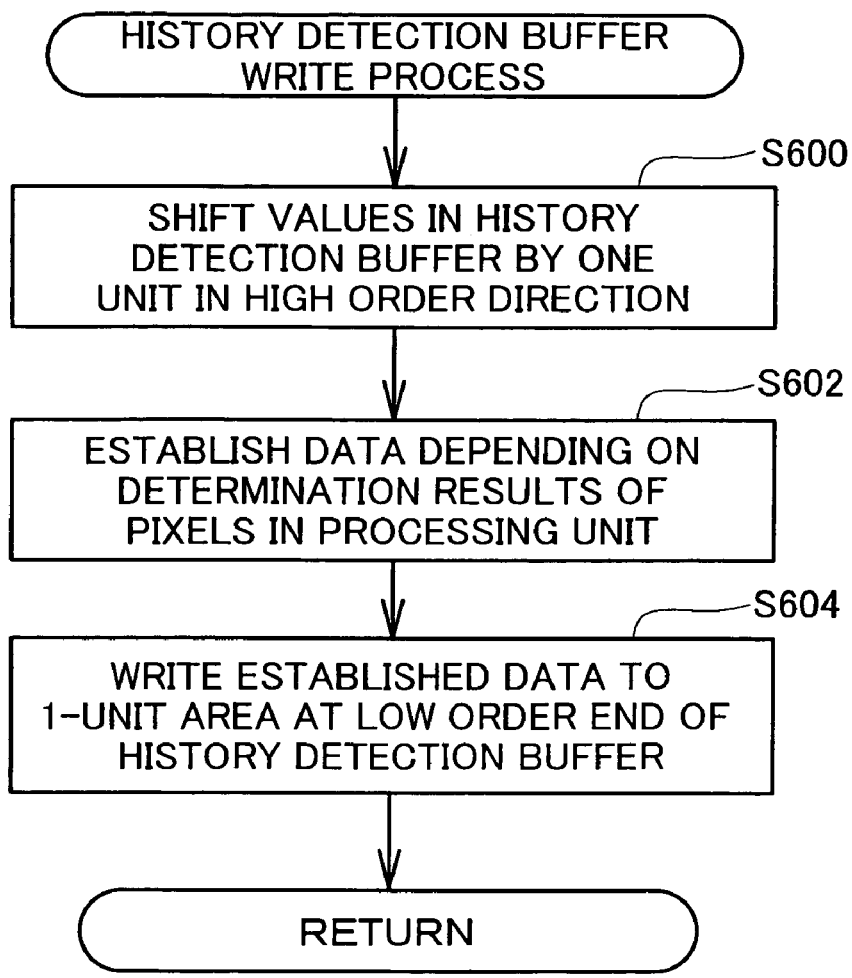
FIG. 18 is a flowchart showing the flow of the process in Embodiment 1 for writing determination results for pixels in a unit to a history detection buffer that stores history data.
Figure 19:
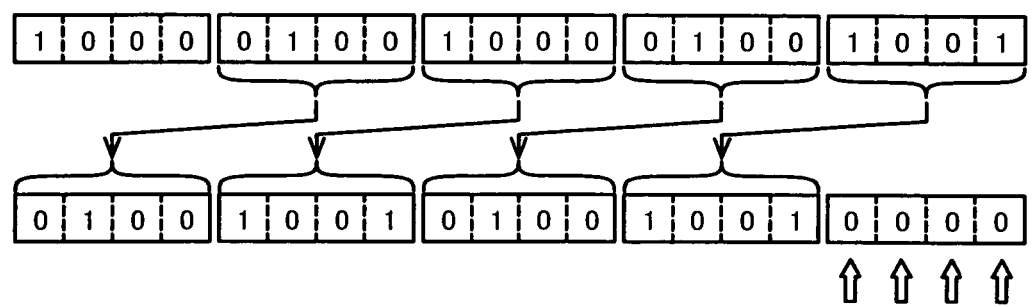
FIG. 19 is a schematic illustration showing conceptually the condition of determination results for pixels in a unit being written to a history detection buffer that stores history data.

FIG. 18 is a flowchart showing the flow of the process for writing to the history detection buffer the determination results for pixels in a processing unit. When the process for writing to the history detection buffer is initiated, first, a process to shift the data stored in the buffer by one unit in the high order direction is carried out (Step S600). FIG. 19 illustrates the process in model form. The rows of small squares shown in the drawing represent in model form the history detection buffer; the history detection buffer shown at top in the drawing shows the condition of data prior to shifting, and the history detection buffer at bottom in the drawing shows the condition of data after shifting. In Step S600 in FIG. 18, data of the history detection buffer is shifted by one unit in the high order direction as shown in FIG. 19. At this time, data of the unit at the highest order end of the history detection buffer is discarded. As a precautionary measure, to bits in the lowest order unit after shifting has taken place, a value of "0" is written to each bit. In FIG. 19, while the history detection buffer is able to store data equivalent to five units, it could of course store a greater number of units.

Once data has been shifted by the equivalent of one unit in the high order direction in this way (Step S600 of FIG. 18), next, a process to establish data of 4-bit length depending on the determination result for pixels in the processing unit is carried out (Step S602). The bits of the data are associated with the pixels that make up the processing unit. Specifically, the highest order bit is associated with pixel Pa of the processing unit, the second highest order bit is associated with pixel Pb, the third highest order bit is associated with pixel Pc, and the lowest order bit is associated with pixel Pd. In Step S602, a value of "1" is written to any bit corresponding to a pixel on which a dot is formed in the processing unit, and a value of "0" is written to any bit corresponding to a pixel on which no dot is formed. For example, in a given processing unit, if a dot is formed only on pixel Pb, with no dots formed on any other pixels, in the process of Step S602, "0100 (2)" will be established as data of 4-bit length corresponding to the processing unit. (2) denotes a binary expression.

In the next Step S604, a process to write the data established in this way to an area of the lowest order unit of the history detection buffer is carried out. In FIG. 19, the white arrows pointing to the lowest order unit represent in model form the condition of established data being written to these bits.

In this way, once the process for writing to the history detection buffer the determination results for pixels of the processing unit has been completed, the intra-unit multivalue quantization process of Embodiment 1 shown in FIG. 11 concludes, and the routine returns to the tone number conversion process of FIG. 5.

In the manner described above, in the intra-unit multivalue quantization process of Embodiment 1, by increasing the threshold value th in the event that target history is detected, it becomes difficult for a dot to form on the interested pixel. Thus, even where the tone number conversion process is carried out on a unit-by-unit basis, occurrence of an area in which dots are formed at the same pixel locations over a cycle of several units, with this area becoming visible and degrading image quality, can be avoided. Additionally, even if a dot has not been formed on the interested pixel due to increasing the setting for the threshold value th, tone error produced thereby is diffused into neighboring undetermined pixels, and dots form more easily on these neighboring pixels. Thus, even where detecting dot formation status in previously processed units has made it difficult for a dot to form on a pixel on which a dot should properly be formed, there will be no degradation in image quality resulting therefrom.

In the description hereinabove, in the event that target history is detected, the setting of the threshold value th used in determining dot on/off state is modified to a large value, making it difficult for a dot to form on the interested pixel. Of course, it would also be possible, in the event that target history is detected, to determine not to form a dot on the interested pixel. By so doing, formation of dots at the same pixel location in cycles of several units can be avoided easily.

In the description hereinabove, history detection data is made to act on history data to generate intermediate data, and the logical sum of the bits of the intermediate data is taken to calculate the detection result. In contrast, it would also be acceptable to take the logical product of the bits of the intermediate data, and to designate this value as the detection result. In this case, the detection result would assume a value of "1" only in the event that dots were formed at all pixel locations whose dot formation status is being detected. Accordingly, it becomes possible, for example, to reliably detect only dots that have formed a specific readily visible pattern, under a condition of dots being formed at a certain density.

D-4: Variation 1:

Following is a description of a variation of the history detection/threshold establishing process of Embodiment 1 described above. In the history detection/threshold establishing process of Embodiment 1 described above, there was described always reading out history data equivalent to five stored units; however, the history data read out could be variable depending on the number of units going back.

Figure 20:
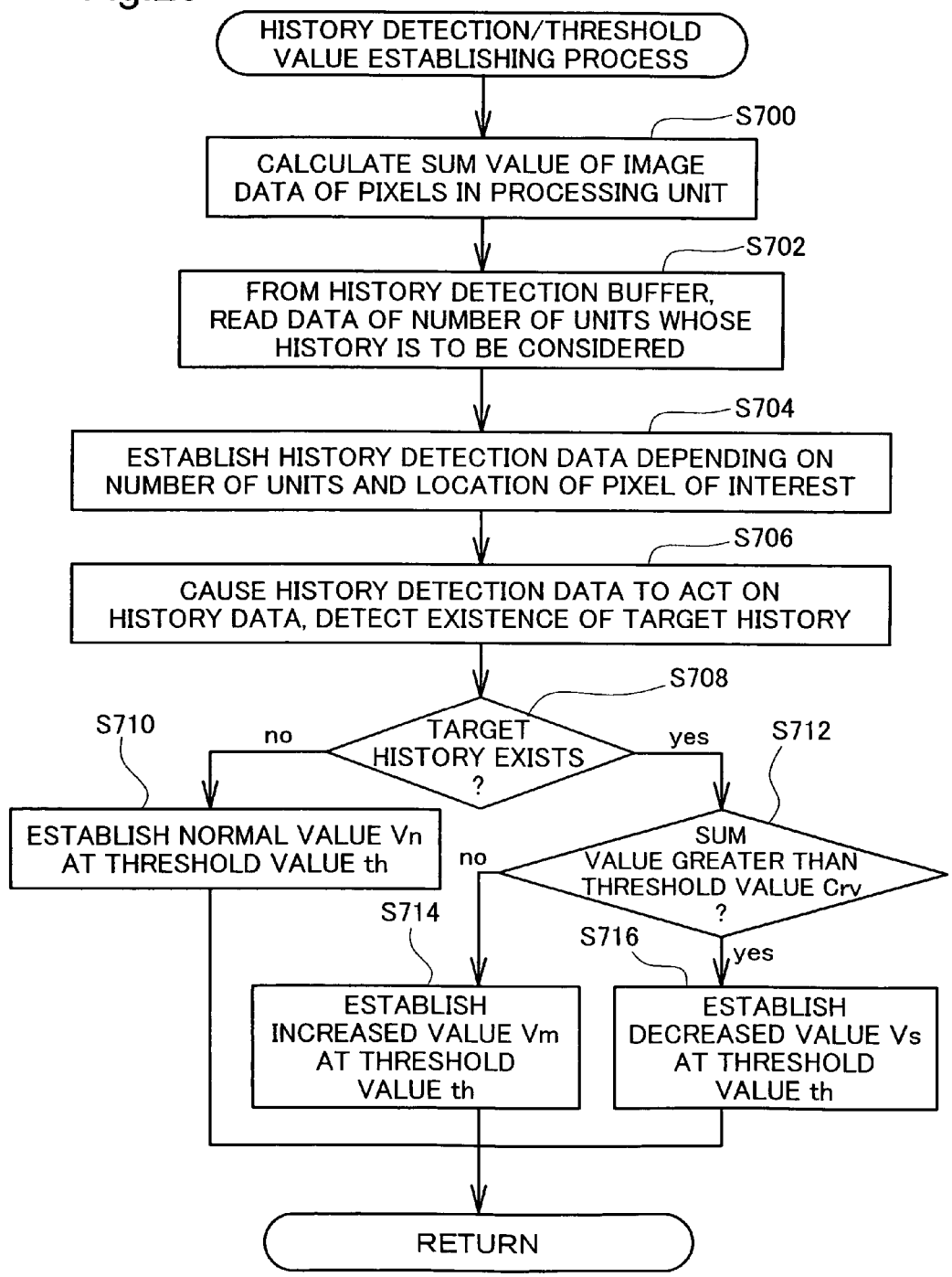
FIG. 20 is a flowchart showing the flow of the process in a variation of Embodiment 1 for detecting dot formation status and establishing the value of the threshold value.

FIG. 20 is a flowchart showing the flow of the process in a variation of Embodiment 1 for detecting dot formation status and establishing the value of the threshold value. The process differs significantly from the process of Embodiment 1 in that data length of the read out history data is variable, depending on the number of units whose history is detected. The following description according to the flowchart centers on the point of difference.

When the history detection/threshold value establishing process is initiated, first, the sum of image data for pixels making up the processing unit is calculated (Step S700). Image data of pixels making up the processing unit has previously been read in Step S202 of the tone number conversion process shown in FIG. 5, so the sum of image data for pixels can be calculated easily.

Next, according to the correspondence relationship with sum values shown in FIG. 14, the number of units whose history will be detected is established, and history data of data length corresponding to the number of established unit is read from the history detection buffer described earlier (Step S702).

Once history data has been read out from the history detection buffer in this way, history detection data is then established (Step S704). The process is substantially similar to the history detection/threshold value establishing process of Embodiment 1 described using FIG. 12, but differs in that bit length of the history detection data varies with the processing unit. Specifically, in the embodiment described above, for a unit whose history is not detected in the history data, values of "0" are established at all pixels, whereas in this variation, history data is read out only for units whose history is detected, and in conjunction therewith data length of the history detection data assumes a different value depending on the processing unit.

Next, the history detection data is made to act on the history data, and the presence or absence of target history (dot formation status being detected) is detected. Then, in the event that target history is detected in the area in which the sum of tone values in the unit is smaller than the threshold value Crv shown in FIG. 14, the value of the threshold value th is modified to a large value (Vm), or in the event that target history is detected in the area in which the sum is greater than the threshold value Crv is modified to a small value (Vs). If target history is not detected, the value of threshold value th is established at the normal value Vn (Step S706 to Step S716). Once the above process is concluded, the routine exits history detection/threshold value establishing process of the variation and returns to the intra-unit multivalue quantization process shown in FIG. 11.

According to the history detection/threshold value establishing process described above, only required data can be read from among history data stored in memory, making it possible to speed up the process.

E. Embodiment 2

In the history detection/threshold value establishing process carried out in the intra-unit multivalue quantization process of Embodiment 1 described above, history data representing dot formation status of already processed units being stored in a single history detection buffer was described. Since a unit contains a plurality of pixels, in Embodiment 1, data representing dot on/off state for each pixel is stored a mixed state in the history detection buffer. In contrast to this, it would be possible to instead provide buffers in a number equal to the number of pixels making up a unit, and once dot on/off state of each pixel has been determined, to store determination results in different buffers associated with different pixel locations in the unit. Following is a description of Embodiment 2 employing dedicated buffers for each pixel location in this manner.

Figure 21:
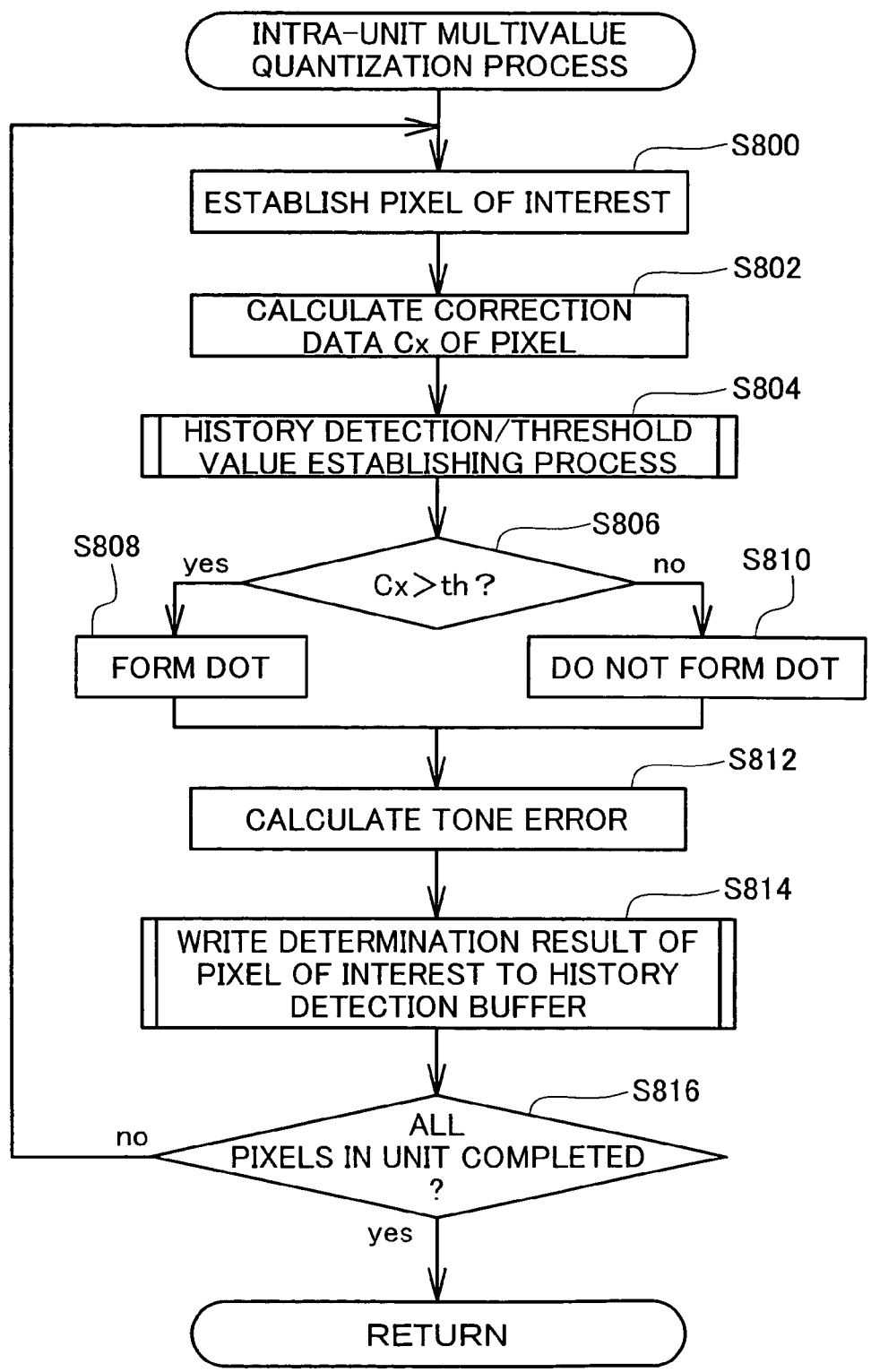
FIG. 21 is a flowchart showing the flow of the process in Embodiment 2 for multivalue quantization within a unit by unit of determining dot on/off state for pixels within the unit.

E-1. Intra-Unit Multivalue Quantization Process of Embodiment 2:

FIG. 21 is a flowchart showing the flow of the intra-unit multivalue quantization process of Embodiment 2. The process differs significantly from the intra-unit multivalue quantization process of Embodiment 1 in that a history detection buffer is provided for each pixel location. Deriving from this difference, there is a further difference from Embodiment 1 in that each time a dot on/off state determination is made of a pixel of interest, the determination result is written to a history detection buffer. Following is a description of the intra-unit multivalue quantization process of Embodiment 2, centering on the differences from Embodiment 1.

When the process is initiated, first, a pixel of interest for determination of dot on/off state is selected from among the plurality of pixels making up the processing unit (Step S800), and the image data and diffusion error of the interested pixel are added to calculate correction data Cx (Step S802). As the image data and diffusion error for pixels making up the processing unit, data written previously in the tone number conversion process shown in FIG. 5 is used.

Once correction data Cx for the interested pixel has been calculated in this way, the history detection/threshold value establishing process of Embodiment 2 is carried out (Step S804). As noted, in Embodiment 2, dedicated history detection buffers provided depending on the pixel locations in the unit are used. Accordingly, before proceeding to a description of the specifics of the process, the history detection buffers used in the history detection/threshold value establishing process of Embodiment 2 will be described.

Figure 22:
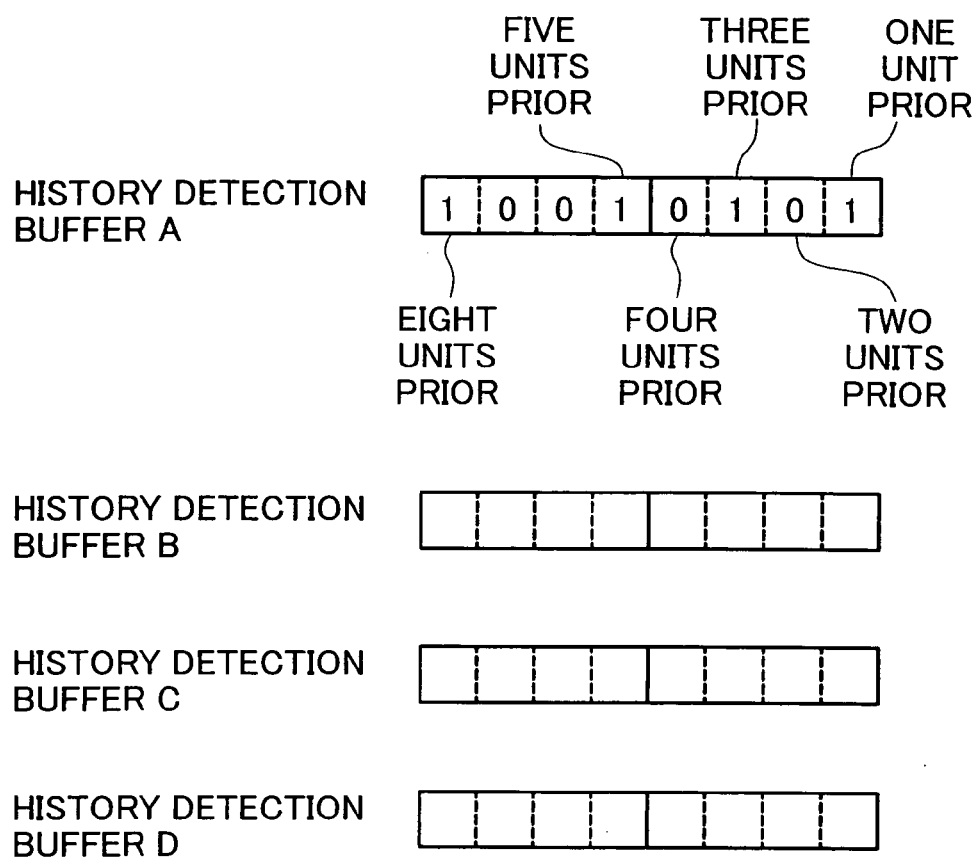
FIG. 22 is a schematic illustration showing conceptually history detection buffers in Embodiment 2 provided in association with pixel locations in a unit.

FIG. 22 is an illustration showing in model form history detection buffers provided in association with pixel locations in a unit. "History detection buffer A" shown in the drawing is the buffer associated with pixel Pa in the unit. Dot formation determination results for pixel Pa are stored in this buffer. "History detection buffer B" is associated with pixel Pb in the unit, and is the buffer that stores determination results for pixel Pb. Similarly, "history detection buffer C" stores determination results for pixel Pc, and "history detection buffer D" stores determination results for pixel Pd. In this way in Embodiment 2 there are provided dedicated buffers associated with pixel locations in units, with history data being stored in the respective buffers.

Next, the structure of stored history data will be described, taking the example of "history detection buffer A." The bits in history detection buffer are associated, in order from the low order end (right end in FIG. 22), one-to-one with units prior to the processing unit. That is, the lowest order bit (bit at the right end in the drawing) is associated with the "unit one unit prior", the second lowest order bit with the "unit two units prior", the third lowest order bit with the "unit three units prior", and so on so that each bit is associated in order with a unit. A value of "1" established for these bits indicates that a dot has been formed on pixel Pa of the corresponding unit; conversely, where a value of "0" is established, this indicates that a dot has not been formed on pixel Pa of the corresponding unit.

As will be apparent from the preceding description, the history data shown by way of example in FIG. 22 as being stored in history detection buffer A indicates that for the units one unit prior, three units prior, five units prior, and eight units prior from the processing unit, a dot is formed on pixel Pa, and for the other units no dot is formed on pixel Pa. In FIG. 22, the history detection data buffers have 8-bit data length, but data having a larger number of bits would also be acceptable.

Following is a description of the history detection/threshold value establishing process of Embodiment 2 carried out using history detection data. The history detection/threshold value establishing process of Embodiment 2 differs from the process of Embodiment 1 described previously in that a history detection buffer is provided for each pixel location, but in other respects the process is substantially similar. Following is a description following the flow of the flowchart of FIG. 12 described for the history detection/threshold value establishing process of Embodiment 1. The process is executed after a pixel of interest has been established in the intra-unit multivalue quantization process of FIG. 21 (Step S800), the process being executed on the interested pixel in Step S804.

When the history detection/threshold value establishing process is initiated, first, a process to read out history data from the history detection buffers is carried out (corresponds to Step S500 of FIG. 12). As described using FIG. 22, in Embodiment 2 history detection buffers are provided depending on pixel locations, and in this process, history data in the required data quantity is read out from the buffer corresponding to the same pixel location as the interested pixel. For example, where the interested pixel is at pixel Pa, where dot formation status is detected for five units going back, data equivalent to five bits will be read out from the low order end of "history detection buffer A." As a result, in the example shown in FIG. 22, "10101 (2)" will be read out as history data. Here, (2) denotes a binary expression. In the event that the interested pixel is established at pixel Pb, pixel Pc, or pixel Pd, history data would be read out from the history detection buffer B, history detection buffer C, or history detection buffer D in which it is stored.

Figure 23:
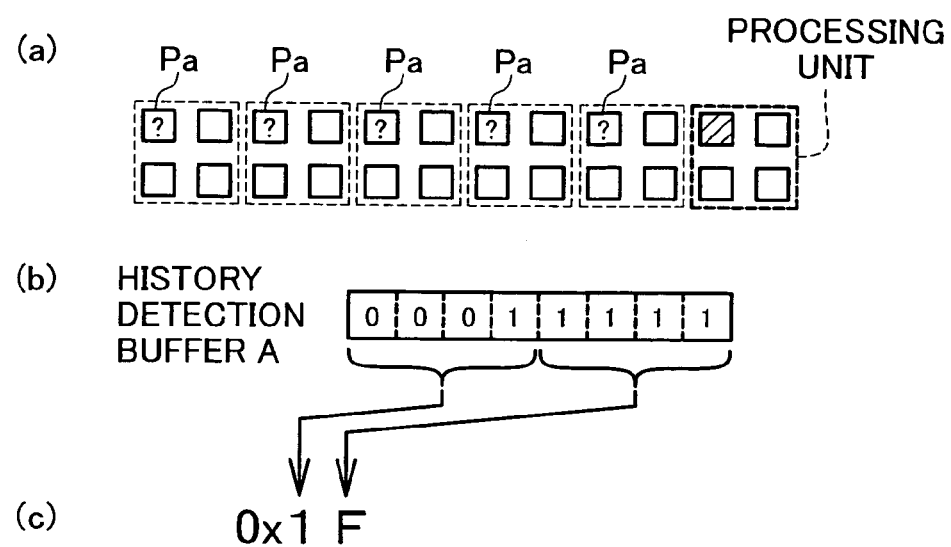
FIG. 23 is a schematic illustration showing conceptually the method in Embodiment 2 for establishing history detection data depending on pixel location at which dot formation status is being detected.

In this way, once history data is read, next, a process to establish history detection data is initiated (corresponds to Step S502 of FIG. 12). This process will be described with reference to FIG. 23. Let it be assumed, for example, that dot formation status is detected going back to the unit five units prior to the processing unit. FIG. 23(*a*) is an illustration showing conceptually the distribution of pixel locations whose dot formation status is to be detected. The small squares shown in the drawing indicate in model terms pixels. The large square enclosed by heavy broken lines indicates in model terms the processing unit, and the large squares enclosed by thin broken lines indicate in model terms previously processed units. The pixel with diagonal hatching in the processing unit indicates the interested pixel; pixels denoted with a "?" in the previously processed units in the drawing indicate pixels whose dot formation status is to be detected.

FIG. 23(*b*) shows history detection data used for the purpose of detecting dot formation status for such pixels. Here, since detection goes back to the unit five units prior to the processing unit, the history detection data has values of "1" established for bits up to five bits from the lowest order bit, and values of "0" established for bits on the high order end from bit 6. In this way, history detection data can be established by unit of establishing values of "1" for bits corresponding to units that are to be detected while establishing values of "0" for other bits. FIG. 23(*c*) shows in hexadecimal representation history detection data established in this way.

Once history detection data has been established in this way, the established history detection data is made to act upon the history data read previously, in order to detect target history (formation status of dots to be detected) (corresponds to Step S504 of FIG. 12). Detection of target history is carried out in the same way as in Embodiment 1. Specifically, the logical product of equivalent bits in history data and history detection data is taken in order to calculate intermediate data, and the logical sum of the bits of the intermediate data is taken to calculate a detection result. If the resultant detection result has a value of "1" it is determined that target history was detected, and increased value Vp is established at threshold value th. If the detection result has a value of "0" it is determined that target history was not detected, and normal value Vn is established at threshold value th. Once threshold value th has been established at an appropriate value in this way, the history detection/threshold value establishing process of Embodiment 2 concludes, and the routine returns to the intra-unit multivalue quantization process shown in FIG. 21. Here, while the logical sum of the bits of intermediate data is taken to calculate the detection result, the logical product of the bits of intermediate data could be taken to calculate the detection result instead.

Once threshold value th has been established in this way, and the routine has returned to the intra-unit multivalue quantization process shown in FIG. 21, next, the relative magnitude of the correction data Cx for the interested pixel and the threshold value th is determined (Step S806 of FIG. 21). In the event that the correction data Cx is larger, it is determined to form a dot on the interested pixel (Step S808), and if not, it is determined not to form a dot (Step S810). Next, tone error produced by the determination of dot on/off state is calculated (Step S812), after which a process for writing the decision result for the interested pixel to a history detection buffer is initiated (Step S814). This process will be described using FIG. 24.

Figure 24:
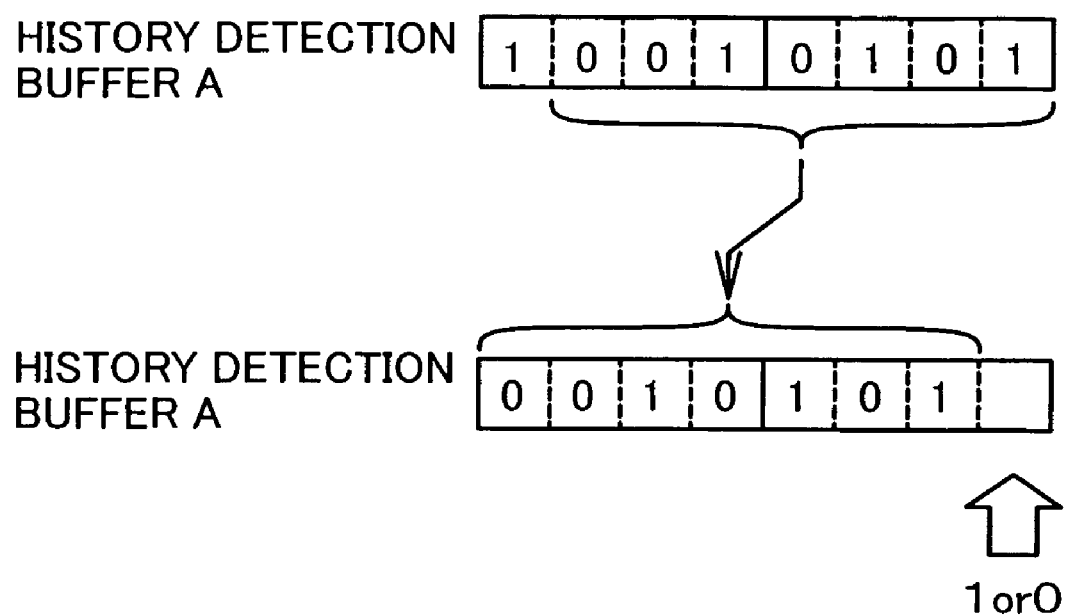
FIG. 24 is a schematic illustration showing conceptually the method in Embodiment 2 for writing dot on/off state determination results to the history detection buffer.

FIG. 24 is an illustration showing conceptually the condition of writing a decision result for a pixel of interest to a history detection buffer in the intra-unit multivalue quantization process of Embodiment 2. Assuming that the interested pixel is currently established at pixel Pa, the dot on/off state determination result is written to history detection buffer A. When writing the determination result, first, history data stored in history detection buffer A is shifted by one bit in towards the high order end (the left end in the drawing). The upper level of FIG. 24 shows history data stored in history detection buffer A data prior to shifting, and the lower level shows history data stored the buffer after shifting. In association with shifting of history data, data stored in the highest order bit is discarded. Next, a process for writing the value corresponding to the determination result for the interested pixel to the lowest order bit is carried out. In the event it has been determined to form a dot on the interested pixel, a value of "1" is written to the lowest order bit, and the event it has been determined to not form a dot on the interested pixel, a value of "0" is written to the lowest order bit. In the description hereinabove, the case of the interested pixel being set to pixel Pa has been described, but in cases where the interested pixel is set to another pixel location as well, in the same manner a value depending on the determination result will be written to the history detection buffer corresponding to the pixel location of the interested pixel. In Step S814 of FIG. 21, this process for writing the determination result for the interested pixel to the detection buffer corresponding the interested pixel is carried out.

Once the process of writing the determination result for the interested pixel in this manner has concluded (Step S814 in FIG. 21), a determination is made as to whether the process has been completed for all pixels in the processing unit (Step S816), and if any unprocessed pixels remain, the routine goes back to Step S800 and repeats the series of processes described above. Once the process has been completed for all pixels, the routine exits the intra-unit multivalue quantization process and returns to the tone number conversion process shown in FIG. 5.

In the intra-unit multivalue quantization process of Embodiment 2 described above, bits in history detection buffers are associated one-to-one with previously processed units. Accordingly, even where the number of units for which dot formation status is examined going back, it is sufficient simply to read data of the same bit length as the number of units. For example, in the event that dot formation status is detected going back by the equivalent of eight units from the processing unit, since one unit is made up of four pixels, in Embodiment 1 described previously it would be necessary to read 32 bits of history data, whereas in Embodiment 2 it would be sufficient to read 8 bits of data. Thus, in Embodiment 2, processing can be carried out rapidly, even if there is a large of number of units going back.

E-2: Variation of Embodiment 2

In Embodiment 2 described above, there was described a case in which pixel location at which dot formation status is detected is the same pixel as the interested pixel. However, just as, in Embodiment 1, it was possible to freely set the pixel location at which dot formation status will be detected, in Embodiment 2 as well, it is possible to establish the pixel for which dot formation status will be detected at any pixel location on a unit-by-unit basis. This variation of Embodiment 2 will be described below.

FIG. 25 is an illustration showing the method for detecting dot formation status at any pixel location. FIG. 25A is an illustration showing an exemplary distribution of pixel locations for detection. The small squares shown in the drawing indicate in model terms pixels, and the large squares enclosed by broken lines indicate in model terms units. Pixel locations whose dot formation status is to be detected are indicated by a "?" on the pixel. While pixel locations and number of pixels for detection may be set arbitrarily, in the description hereinbelow dot formation status is detected at the pixel locations shown in FIG. 25A.

Figure 25A:
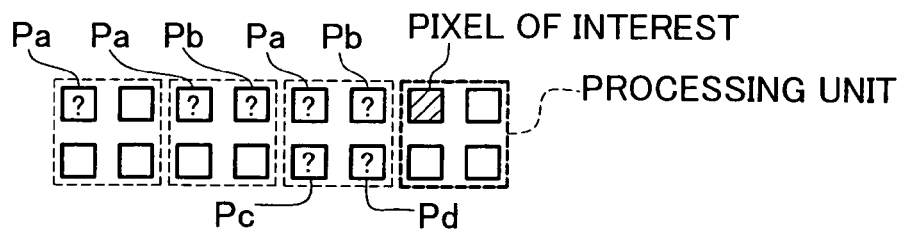
FIGS. 25A to 25E are schematic illustrations showing conceptually the method in Embodiment 2 for causing history detection data to act on history data to detect dot formation status at any pixel location.
Figure 25B:
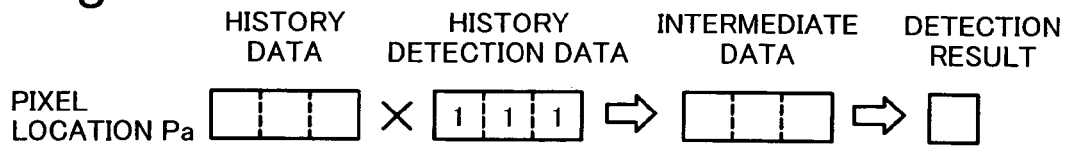
Figure 25C:
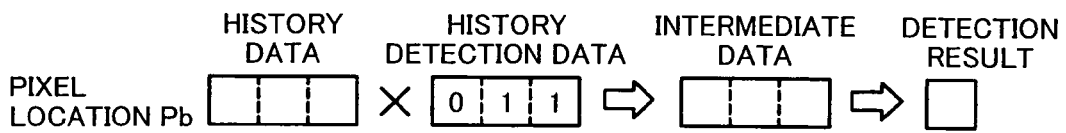

FIG. 25B is an illustration showing the method for detecting dot formation status at any pixel location in Embodiment 2. As noted, in Embodiment 2, since dot on/off state determination results are stored on a per-pixel location basis in each unit, even where dot formation status is to be detected at any pixel location, detection is carried out by a method focusing on pixel location in each unit. That is, in the example shown in FIG. 25A, for the pixel location of pixel Pa, dot formation status will be detected for three units, i.e. the ones "one unit prior", "two units prior", and "three units prior." For the pixel location of pixel Pb, dot formation status will be detected for two units, i.e. the ones "one unit prior" and "two units prior." For the pixel locations of pixel Pc or pixel Pd, dot formation status will be detected only for the unit "one unit prior" to the processing unit. In this way, after detecting a unit location for detection of dot formation status for each pixel location, by then determining on a per-pixel location basis whether dots are formed in the detected unit, it becomes possible to detect dot formation status at any pixel location. Following is a detailed description of the case shown in FIG. 25A.

First, the case of detecting dot formation status of pixel Pa will be described. In FIG. 25B is shown in model terms the condition of detecting dot formation status at the pixel location of pixel Pa in this manner. First, history data equivalent to three units (data of three bits starting from the lowest order) is read out from the buffer in which dot formation determination results for pixel Pa are stored (history detection buffer A). Of course, in the event that detection goes back over a greater number of units, the length of the data read out in response could be longer.

Next, history detection data is made to act on this history data. History detection data is established depending on the unit whose dot formation status at the pixel location of pixel Pa is to be detected. As shown in FIG. 25A, for the pixel location of pixel Pa, dot formation status will be detected for three units, i.e. the ones "one unit prior", "two units prior", and "three units prior", so the history detection data corresponding therewith will establish a value of "1" at three bits starting from the lowest order bit. History detection data established in this way ("111 (2)" in binary expression) will be made to act on the read out history data to calculate intermediate data. As noted, "making history detection data act on history data" refers to taking the logical product among corresponding bits of the two sets of data. Once intermediate data has been derived in this way, by taking the logical sum of the bits of the intermediate data, detection results for pixel Pa can be derived.

Detection results for pixel Pa derived in this way have the following significance. A detection result with a value of "0" unit that no dot is formed on pixel Pa in any of the units being detected; conversely, a detection result with a value of "1" unit that a dot is formed on pixel Pa in any of the units being detected. Of course, instead of taking the logical sum of the bits of intermediate data, the logical product could be taken. Where the logical product of the bits of intermediate data is taken, a detection result with a value of "1" will mean that a dot is formed on pixel Pa in all of the units being detected.

By unit of the same method, detection results for pixel Pb can be derived. The condition of detecting dot formation status for pixel Pb is shown in model form in FIG. 25C. To describe briefly with reference to FIG. 25B, first, history data equivalent to three units is read out from the buffer in which dot on/off state for pixel Pb has been recorded (history detection buffer B). Next, history detection data is made to act on this data to calculate intermediate data. Since for pixel Pb, dot formation status will be detected for units "one unit prior" and "two units prior" to the processing unit, the corresponding history detection data uses data having a value of "1" established in two bits starting from the lower order bit ("011 (2)" in binary expression). In this way, by taking the logical sum of bits of the intermediate data, detection results for pixel Pb can be derived.

Figure 25D:
Figure 25E:

Detection results for pixels can be calculated in the same manner for pixel Pc and pixel Pd as well. For these pixels, since the unit whose dot formation status will be detected is only that "one unit prior" to the processing unit, for these pixels, data having a value of "1" established in the lower order bit only ("001 (2)" in binary expression) may be used as the history detection data. The condition of calculating detection results for pixel Pc is shown in FIG. 25D, and the condition of calculating detection results for pixel Pd is shown in FIG. 25E.

Once detection results for pixels have been derived in this way, by calculating the logical sum of these detection results, final detection results can be derived. Specifically, if a dot is formed on any of the pixels indicated by a "?" symbol in FIG. 25A, a value of "1" will be obtained as the detection result, whereas conversely if no dot is formed on any of the pixels a value of "0" will be obtained as the detection result. Of course, final detection results could also be derived by taking the logical product of detection results for pixels. In this case, where dots have been formed on all pixels indicated by a "?" symbol in FIG. 25A, a final detection result value of "1" will be obtained.

Using the methods described hereinabove, it is possible to establish freely a pixel location for detection of dot formation status, from among units processed previously. Accordingly, even where dot on/off state determinations are made on unit-by-unit basis, by detecting dot formation status at a predetermined pixel location and determining dot on/off state on the basis of the detection results, it becomes possible to effectively avoid dots from being formed in a predetermined pattern over several units.

F. Embodiment 3

Next, Embodiment 3 of the invention will be described. The image processing apparatus of Embodiment 3 comprises a device arrangement like that of the Embodiments described previously, differing only in terms of the process executed by computer 100. In Embodiment 3, the computer 100 functioning as the image processing apparatus executes by way of the intra-unit multivalue quantization process a process that is similar to the process of Embodiment 1 (see FIG. 11), but by way of the history detection/threshold value establishing process (Step S404) therein executes the process shown in FIG. 26.

Figure 26:
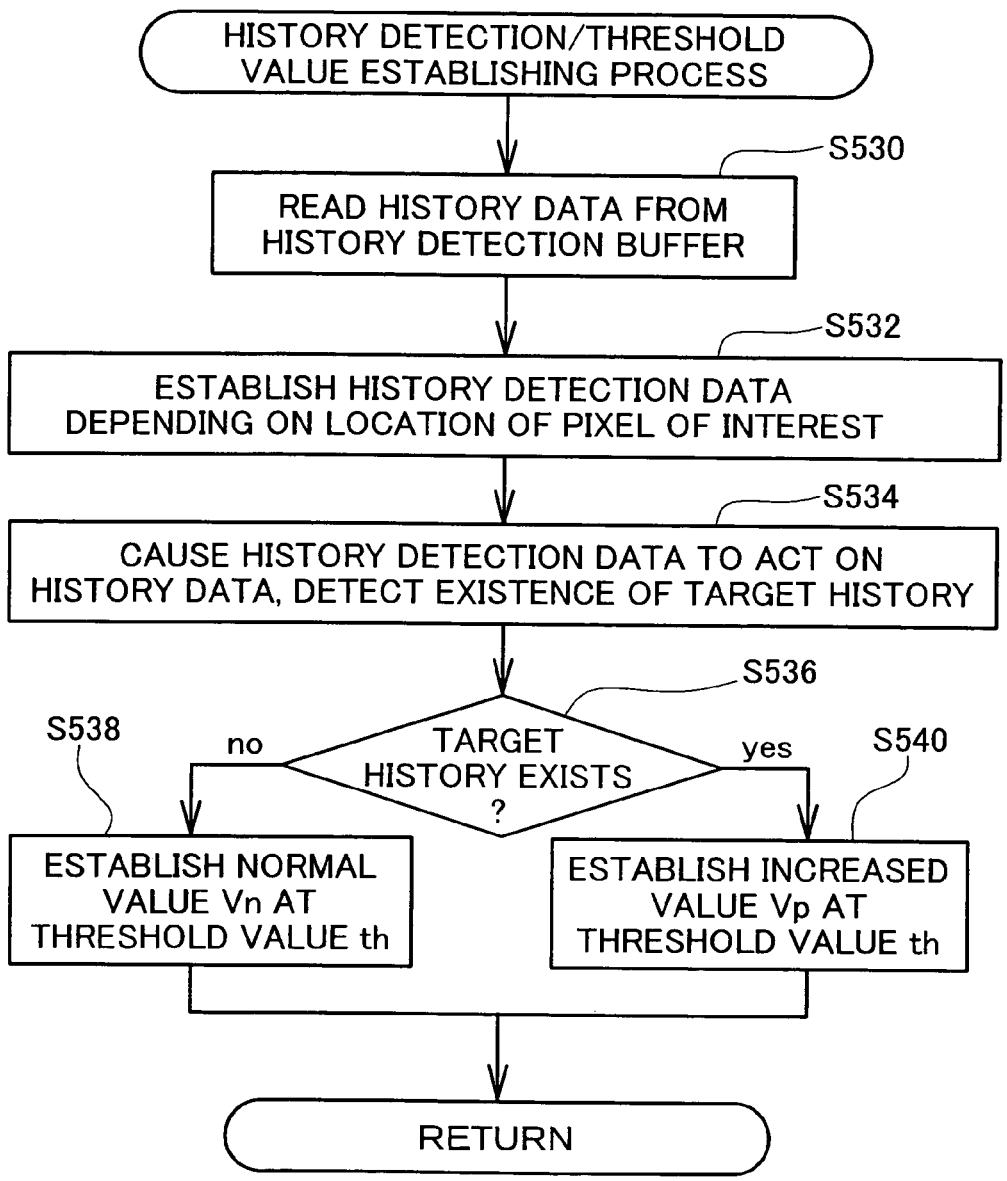
FIG. 26 is a flowchart showing the flow of the process in Embodiment 3 for detecting dot formation status and establishing the value of the threshold value.

When the history detection/threshold value establishing process shown in FIG. 26 is initiated, first, a process to read out history data is carried out (Step S530). History data is data recording pixel positions at which it was determined to form dots in previously processed units, and is stored in a dedicated buffer (history detection buffer) secured in a specific area in RAM 106.

Figure 27A:
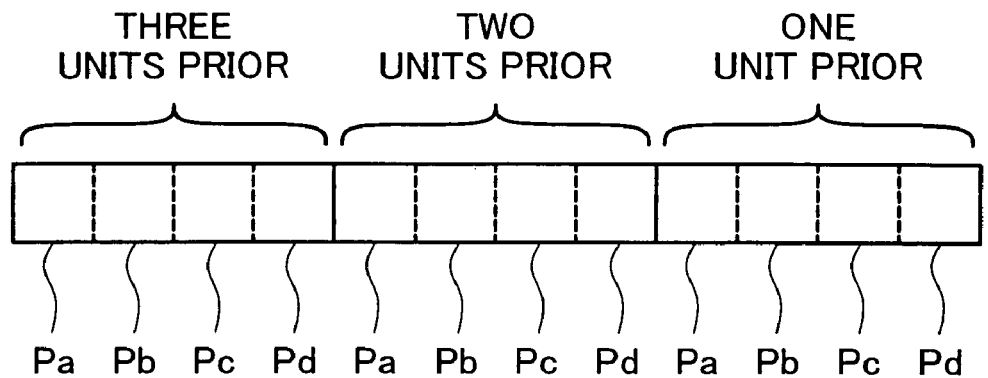
FIGS. 27A to 27C are schematic illustrations showing conceptually the structure of history data read out in the history detection/threshold value establishing process of Embodiment 3.

FIG. 27A is an illustration showing conceptually the structure of history data. The history data shown in FIG. 27A has 12-bit length, as compared to the 16-bit length of Embodiment 1. As in Embodiment 1, each bit corresponds to a pixel location. As mentioned previously, here, since one unit is composed of four pixels, 12-bit history data will store pixels for three units. Here, while there is described history data in which three units of data are stored, as in Embodiment 1, it is possible to store a greater number of units of data, such as four units. Following is a specific description making reference to FIG. 27A.

As shown in the drawing, history data can be interpreted as being divided into three blocks, with four consecutive bits constituting one block. These three blocks, in order from the low order end (the right side in the drawing), are associated respectively with the unit processed just prior to the unit currently being processed (unit one unit prior), the unit processed just prior to that (unit two units prior), and the unit processed just prior to that (unit three units prior). The four bits making up each block, in order from the low order end, are associated respectively with the pixel in the lower right corner (pixel Pd) of the corresponding unit, the pixel in the lower left corner (pixel Pc), the pixel in the upper right corner (pixel Pb), and the pixel in the upper left corner (pixel Pa). A "1" recorded in a bit in history data unit that a dot is formed on the pixel corresponding to that bit; conversely, where a "0" is stored in a bit, this unit that no dot is formed on the pixel corresponding to that bit.

In FIG. 27A, 4 bits are interpreted as one block is because here, it corresponds to the fact that one unit is composed of four pixels (see FIG. 6A). Accordingly, where one unit is composed of a number N of pixels, history data will be interpreted with N bits as one block. Here, history data is described as being 12-bit data, but where one unit is composed of N pixels, and reference is made to dot formation status up to the unit processed M units prior to the processing unit, it would be acceptable for history data to have data length of N×M bits.

Figure 27B:
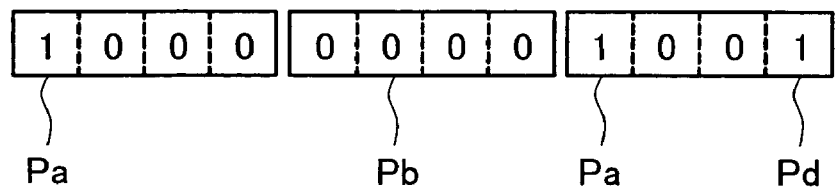
Figure 27C:
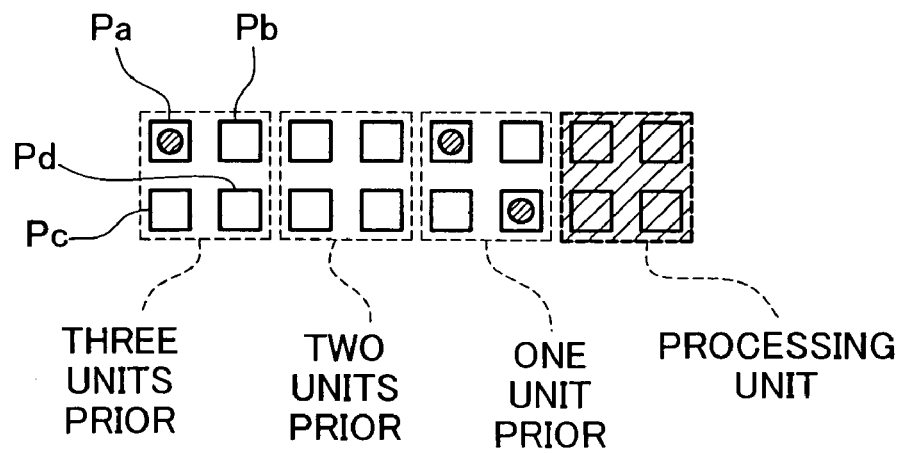

As one example, assume history data like that shown in FIG. 27B. Focusing on a group consisting of four bits at the lower order end of the history data, a value of "1" is established in the highest order (left end) bit and lowest order (right end) bit in this group, with a value of "0" established for the other bits. This unit that in the unit processed just prior to the unit being processed (unit "one unit prior"), dots have been formed on two pixels, namely, pixel Pa and pixel Pd, with no dots formed at other pixel locations. Similarly, in the group in the center of the history data, since a value of "0" is stored in each bit, this unit that in the unit processed two units prior to the unit being processed, no dot is formed on any pixel. For the group at the high order end of the history data, since a value of "1" is stored in the highest order bit in the group, this unit that in the unit processed three units prior to the unit being processed a dot has been formed at the pixel location of pixel Pa. By interpreting history data in this way, the dot formation status shown in FIG. 27C can be ascertained from the hypothetical history data in FIG. 27B.

In Step S530 of FIG. 26, a process to read out this history data from a history detection buffer secured in a specific area in RAM 106 is carried out. In this way, once history data is read, next, a process to establish history detection data is initiated (Step S532). This process will be described with reference to FIG. 28A to FIG. 28D.

Figure 28A:
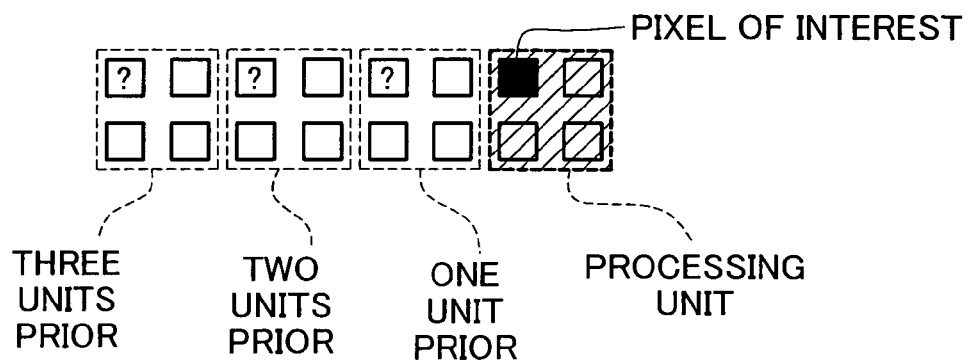
FIGS. 28A to 28D are schematic illustrations showing conceptually the structure of history detection data established for the purpose of detecting history in the history detection/threshold value establishing process of Embodiment 3.

FIG. 28A to FIG. 28D are illustrations showing conceptually the condition of establishing history detection data. As one example, consider the case where dot on/off state is to be determined for pixel Pa in the processing unit. In FIG. 28A, the large square indicated by broken lines with diagonal hatching represents the processing unit, and the black square within the processing unit represents the interested pixel. As noted, in the intra-unit multivalue quantization process, since determination of dot on/off state for each pixel is carried out on a unit-by-unit basis, there are instances in which dots are readily formed at the same pixel location.

For example, assume that an area being processed in an image is an area of relatively low-tone image data (bright image area) such that dots are formed at a rate of 1 pixel per 36 pixels. In such an area, in square areas composed of a total of 36 pixels in a 6×6 pixel array, dots are formed at rates of substantially one each. Where dot on/off state is determined for such an image data area, on a unit-by-unit basis designating four pixels (2×2 pixels) as one unit, it may occur that an identical process is repeated over a cycle of substantially three units (6 pixel equivalent), with dots being formed at identical pixel location in every third unit. In the event that dots are formed in such a regular pattern, the printing pass that forms these dots will be biased to a particular pass, so that color irregularity occurs and degradation of image quality can arise.

Therefore, in the example shown in FIG. 28 it is detected, over a range up to the unit three prior to the processing unit, whether a dot has been formed on pixel Pa in these units. In FIG. 28A, the "?" shown on pixel Pa in each unit represents in model, form that dot formation status at these pixel locations is to be detected.

Figure 28B:
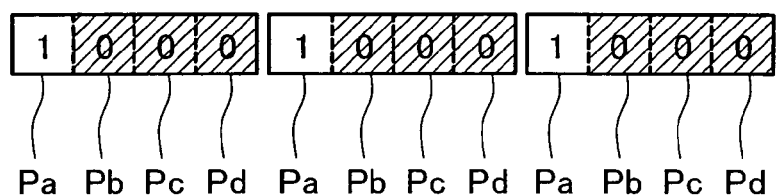

FIG. 28B is an illustration showing conceptually history detection data established for the purpose of detecting dot formation status at these pixel locations. Like the history data described earlier, history detection data also has 12-bit length, and is interpreted as being divided into three groups, with four bits constituting one group. The fact that history detection data is composed of three groups corresponds to the fact that dot formation status is detected in three units. The fact that one group is made up of four bits corresponds to the fact that, in this embodiment, four pixels are grouped into one unit for processing. The correspondence relationship between groups of history detection data and units, and the correspondence relationship between bits and pixel locations, are similar to those in the case of the history data shown in FIG. 27A to FIG. 27C, and thus description will be omitted here. Here, history detection data is described as being data of the same length as the history data shown in FIG. 27A, but is not limited thereto.

As shown in FIG. 28A, here, since there is assumed a case in which, dot formation status at pixel Pa is detected in each unit, the history detection data may consist of data in which a value of "1" is established only in the bit corresponding to pixel Pa in each unit, with a value of "0" established in other bits.

Figure 28C:
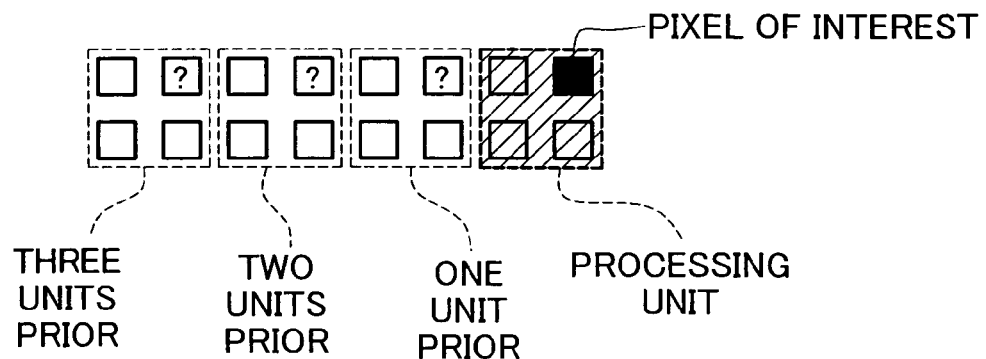
Figure 28D:
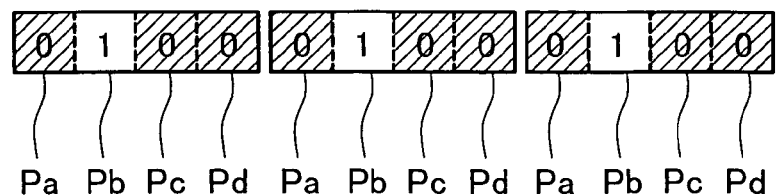

Similarly, where the interested pixel has been established at pixel Pb, it is acceptable to detect whether a dot has been formed on pixel Pb in each unit, within a range up to three units prior from the processing unit. FIG. 28C is an illustration showing pixel locations for detecting dot formation status in each unit, where the interested pixel has been established at pixel Pb. In the drawing, pixels indicated by a "?" represent pixels whose dot formation status needs to be detected. FIG. 28D is an illustration showing conceptually history detection data established for the purpose of detecting dot formation status on such pixels. As shown in the drawing, history detection data in this case may be data established with a value of "1" for bits corresponding to pixel Pb in each unit, and a value of "0" for other bits.

In Step S532 in FIG. 26, as described above, a process to establish history detection data depending on the location of the interested pixel is carried out.

Once history detection data has been established in this way, the established history detection data is made to act upon the history data read in Step S530, in order to detect formation status of dots targeted for detection (hereinbelow, formation status of dots for which history detection data has been established and which are targeted for detection shall sometimes be referred to as "target history") (Step S534).

Figure 29A:
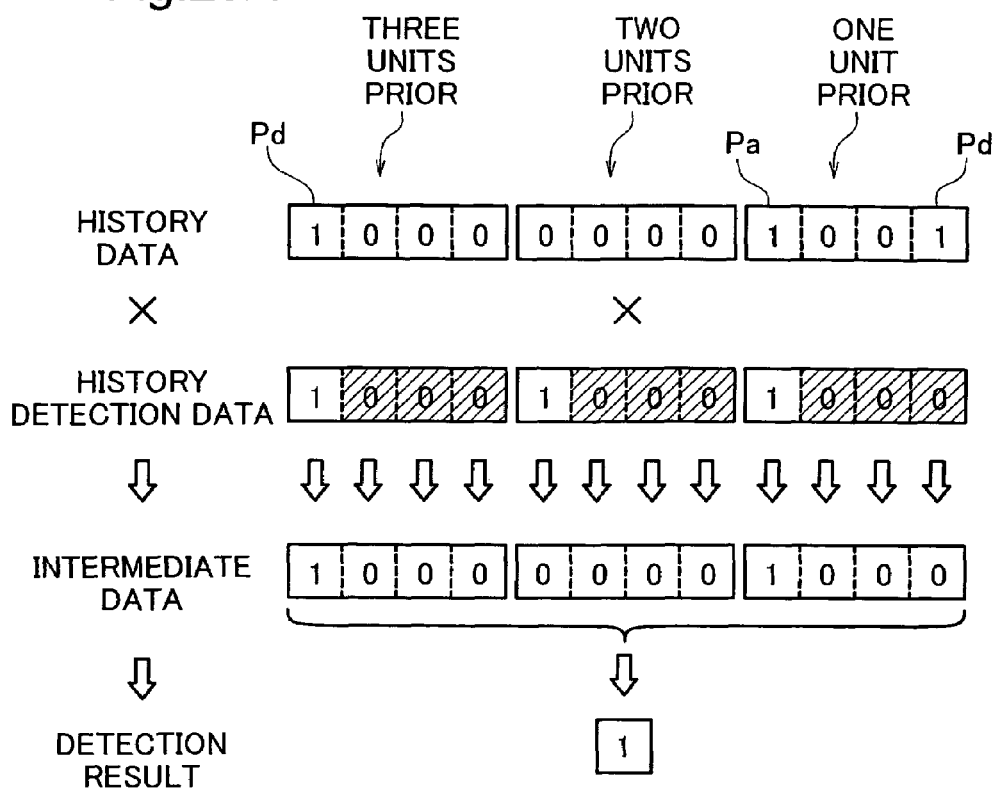
FIGS. 29A and 29B are schematic illustrations showing conceptually the condition of causing history detection data to act on history data to detect target history in the history detection/threshold value establishing process of Embodiment 3.

FIG. 29A is an illustration showing conceptually the condition of causing history detection data to act upon history data, in order to detect target history. At the top in FIG. 29A is shown history data, and below the history data is shown history detection data. During detection of target history, first, between the history data and history detection data, the logical product of equivalent bits is calculated. In this Specification, "causing history detection data to act upon history data" refers to calculation of intermediate data by unit of taking the logical product of equivalent bits, between the history data and history detection data. Next, by taking the logical sum, or arithmetic sum, of bits of intermediate data obtained in this way, target history can be detected. In FIG. 29A, intermediate data calculated by causing history detection data to act on history data is shown below the history detection data. As mentioned previously, in history detection data, a value of "1" is established only at the pixel location to be detected in each unit, with values of "0" being established at pixel locations for which detection in unnecessary, and thus when the logical product of bits in history data and history detection data is calculated, a value of "1" of the bit corresponding to a pixel location being detected will be established on in the event that a dot has been formed at that pixel location.

The above process will be described more specifically, focusing on the "unit one prior" shown in FIG. 29A. As shown in the history data, in the "unit one prior" to the processing unit dots are formed on pixel Pa and pixel Pd. Here, since the pixel location at which dot formation status is to be detected is pixel Pa only, as indicated in the history detection data, the intermediate data will have a value of "1" only for the bit corresponding to pixel Pa, with values of "0" for other bits, as shown in FIG. 29. In this way, a value of "1" for any bit of intermediate data unit that in that unit, a dot is formed at the pixel location that is being detected. Next, the logical sum of units is taken, and if the value thereof of "1", a dot is considered to have been formed at any of the pixel locations to be detected. By taking the arithmetic sum of units, it becomes possible to detect how many dots have been formed at the pixel locations being detected.

In Step S534 in FIG. 26, a process to take the logical sum (or arithmetic sum) of bits of the intermediate data and calculate detection results is carried out. On the basis of detection results derived in this way, it is determined whether target history has been detected. In the event that the value of the detection result is "0", it is determined that target history has not been detected. That is, the fact that the value of the detection result (i.e. the logical sum of bits of intermediate data) is "0" unit that no dot is formed at the pixel location being detected, in any of the units targeted for detection. Accordingly, if the value of the detection result is "0", it can be determined that target history has not been detected. Conversely, if the value of the detection result is "1", this unit that in any unit among units targeted for detection, a dot is formed at the pixel location being detected, and it can be determined that target history has been detected. Where the arithmetic sum of bits of the intermediate data is taken, if the resultant value is equal to or greater than a predetermined value it will be determined that target history has been detected, whereas if the resultant value is less than a predetermined value it will be determined that target history has not been detected.

In the intermediate data shown in FIG. 29A, since a value of "1" has been established in bits in the "unit one prior" and "unit three prior", when the logical sum of the bits in this intermediate data is taken and the detection result is calculated, a value of "1" will be obtained. Accordingly, in this event target history will be detected.

Figure 29B:
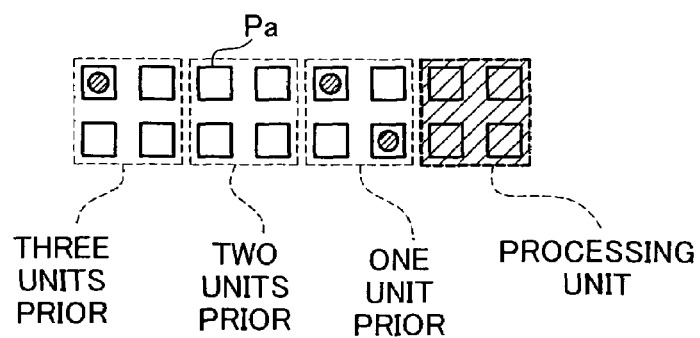

For reference, dot formation status represented by the history data shown at top in FIG. 29A is shown in FIG. 29B. As shown in FIG. 29A, the detection result calculated from the intermediate data has a value of "1", which result indicates the fact that a dot is formed on pixel Pa. As shown in FIG. 29B, clearly, a dot is formed at the location of pixel Pa in the "unit one prior" and "unit three prior" to the processing unit. From this, it may be seen that, by using a method of causing history detection data to act on history data, it is possible to accurately detect dot formation status.

In the history detection/threshold value establishing process of FIG. 26, a process to establish an appropriate value for threshold value th is carried out on the basis of target history detected in this manner. Specifically, in the event that target history was not detected in Step S536, a normal value Vn is established as the threshold value th (Step S538). Conversely, in the case that target history was detected, an increased value Vp set to a value greater than normal value Vn is established as the threshold value th (Step S540). The threshold value th set here is referred to for the purpose of determining whether or not a dot will be formed on a pixel of interest in the intra-unit multivalue quantization process. Once threshold value th is set in this way, the history detection/threshold value establishing process of FIG. 26 concludes.

The process after returning from the history detection/threshold value establishing process is the same as in Embodiment 1 (see FIG. 11, Step S406 and subsequent). Specifically, a process to determine relative magnitude of correction data Cx and threshold value th (Step S406) is executed.

In the above manner, once the process of writing determination results for each pixel in the processing unit to the history detection buffer has been completed, the intra-unit multivalue quantization process (see FIG. 11) of Embodiment 1 concludes and the routine returns to the tone number conversion process (see FIG. 5).

As described above, in the intra-unit multivalue quantization process of Embodiment 1, the existence of target history is detected during the history detection/threshold value establishing process, and in the event that target history is detected the value of threshold value th is increased, in order to make it difficult for a dot to be formed on the interested pixel. Thus, even where the tone number conversion process is carried out on a unit-by-unit basis, occurrence of an area in which dots are formed at the same pixel location over a cycle of several units, with this area becoming visible and degrading image quality, can be avoided. Additionally, by making it difficult for a dot to be formed on the interested pixel, an automatic effect is that is becomes easier for dots to be formed on other pixels within the unit. As a result, it is possible to avoid dots from being formed with bias to a particular pixel location within a unit. That is, the proportion of dots formed at pixel locations in a unit with respect to all pixels may be held to within a predetermined range, and it becomes possible to avoid formation of dots biased to a particular printing pass and degradation of image quality. A fuller description of this will be made later.

Even if the determination regarding dot formation on a pixel of interest has been controlled by unit of modifying the setting of threshold value th, tone error produced thereby is diffused into neighboring undermined pixels, and is eliminated by unit of determining dot on/off state for these neighboring pixels. Thus, even if, for example, detection of target history has resulted in a dot not being formed on a pixel on which it would be expected to be formed, there will be no degradation in image quality resulting therefrom.

In the preceding description, in the event that target history is detected, the setting of the threshold value th used to determine dot on/off state is modified to a large value, making it difficult for a dot to be formed on the interested pixel. Of course, it would instead be possible to determine not to form a dot in the event that target history is detected. By so doing, it is simple to avoid dots from being formed at the same pixel location over a cycle of several units.

In the description hereinabove, history detection data is made to act on history data to generate intermediate data, and the logical sum or arithmetic sum of the bits of the intermediate data is taken to calculate the detection result. In contrast, it would also be acceptable to take the logical product of the bits of the intermediate data, and to designate this value as the detection result. In this case, the detection result would assume a value of "1" only in the event that dots were formed at all pixel locations whose dot formation status is being detected. Accordingly, it becomes possible, for example, to reliably detect only dots that have formed a specific readily visible pattern, under a condition of dots being formed at a certain density.

The description next turns to the reason that, in the event of dots being formed with bias to the particular pixel location in a unit, image quality may be degraded even if no regular pattern is visible. As noted, the color printer 200 of this embodiment prints images by unit of forming dots on a printing medium while main scanning the ink eject head. In such a printer, due principally to image quality requirements, even in the event that dots are to bed formed on consecutive pixels in the main scanning direction. normal practice is to form these dots not in a single main scan, but rather to form the over several main scans, while forming dots on pixels at intervals with spaces between them.

FIG. 30 is an illustration showing the condition of forming a row of consecutive dots in the main scanning direction (hereinafter, such a dot row will sometimes be termed a "raster") over two main scan passes. The small squares shown at the top in the drawing represent pixels. The numerals inside the pixels are sequential numbers assigned to identify respective pixels. Where one raster is formed by two main scans, in a given scan dots are formed on odd numbered pixels, and in the next scan dots are formed on even numbered pixels. Here, the main scan in which dots are formed on odd numbered pixels is termed "pass A", and the main scan in which dots are formed on even numbered pixels is termed "pass B." In the example shown in FIG. 30, dots formed during pass A are represented by circles, and dots formed during pass B are represented by triangles. By repeating pass A and pass B in this way one raster is formed. In this way, where one raster is formed over several passes, if dots are biased to a particular pixel location in units, image quality may become degraded even if no specific pattern is visible.

Figure 31:
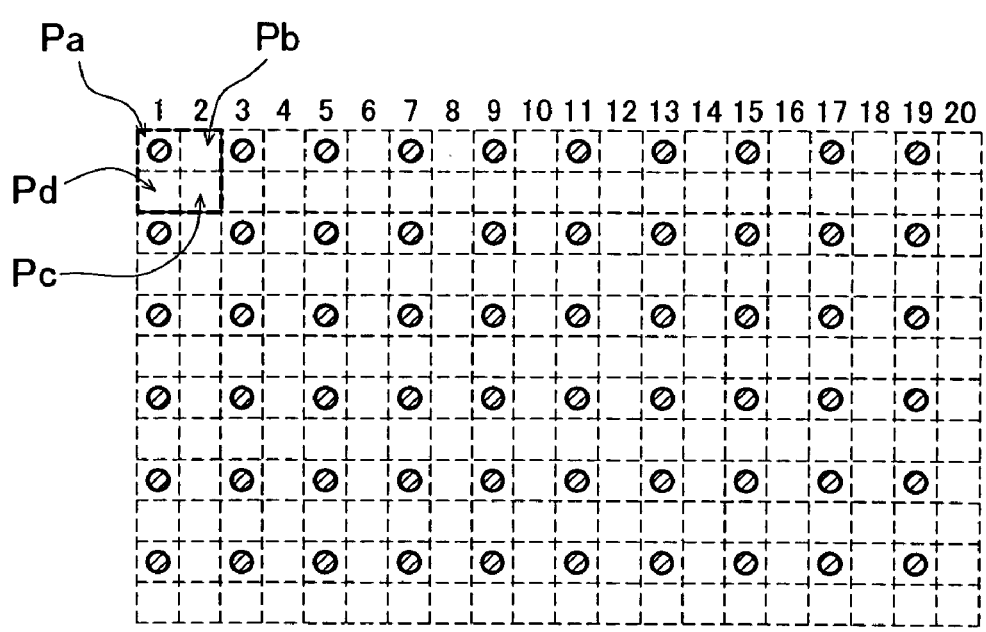
FIG. 31 is a schematic illustration showing an exemplary instance in which while dots are formed with a regular cyclical pattern, the pattern is not necessarily visible and degrade image quality.

For example, let it be assumed that, as shown in FIG. 6 of Embodiment 1, units are composed of a total of four pixels in a 2×2 arrangement, and dots are formed with bias to the pixel location of Pa. FIG. 31 shows conceptually the condition of dots being formed at pixel location Pa in this way. In FIG. 31, while dots are formed in a regular cyclic pattern, it is not always the case that the pattern will be visible and degrade image quality. However, since all dots are formed on odd numbered pixels, they will be formed with bias to pass A shown in FIG. 30. When dots are formed with bias to a particular pass in this way, image quality may be degraded. The reason is that in ink dots formed on a printing medium, bleed and drying out of the ink proceed over time, so there will be slight differences in the condition of coloration where dots are formed through all passes, as versus where they are formed with bias to a particular pass, with these differences becoming visible as color irregularities. Particularly with color printing using many colors of ink, such color irregularities occur easily. For example, taking the example of a case where C dots and M dots are formed, when M dots are formed after having formed C dots, as versus the case where these dots are formed simultaneously, there will be differences in the way that the inks run together, or in the manner of bleed of the dots formed last. As a result, even where dots are formed at the same given density, the color reproduced on the print medium will differ, and such differences in coloration may be visible as color irregularities.

In Embodiment 1 described above, where the interested pixel is at pixel location Pa, dot on/off state is detected for the same pixel location Pa. In the event that a predetermined number or more of dots have been formed at pixel location Pa, that is, where target history has been detected, it is more difficult for a dot to form on the interested pixel. By so doing, in this unit, dots form more easily on pixels other than pixel location Pa. As a result, formation of dots with bias to a particular pixel location can be avoided, and thus it is possible to avoid the occurrence of color irregularities due to dot formation with bias to a particular pass.

Alternatively, it would be acceptable, when the interested pixel is at pixel location Pa, to detect dot on/off state of another pixel (for example Pb), and in the event that a predetermined number or more of dots have been formed at pixel location Pb, to make it easier for a dot to form on the interested pixel. If a dot is formed on the interested pixel at pixel location Pa in this way, it becomes more difficult for a dot to be formed on the pixel of pixel location Pb, so it becomes possible to avoid dot formation with bias to a particular pixel location.

D-4: Variations:

Various variations exist for the history detection/threshold value establishing process of Embodiment 1. Examples of these variations are described below.

(1) Variation 1:

In the history detection/threshold value establishing process of Embodiment 3 hereinabove, there was described detection of dot formation status going back by three units on a constant basis; however, as in Variation 1 of Embodiment 1, the number of units going back can be variable. This first variation will be described hereinbelow.

(2) Variation 2:

In the embodiments hereinabove, description centered on the case where the pixel location for detecting dot on/off in already processed units is the same pixel location as that of the interested pixel in the processing unit. Of course, the pixel location for detecting dot on/off state in already processed units may be established freely as needed, by unit of appropriately establishing the the history detection data. This second variation will be described hereinbelow.

Figure 32:
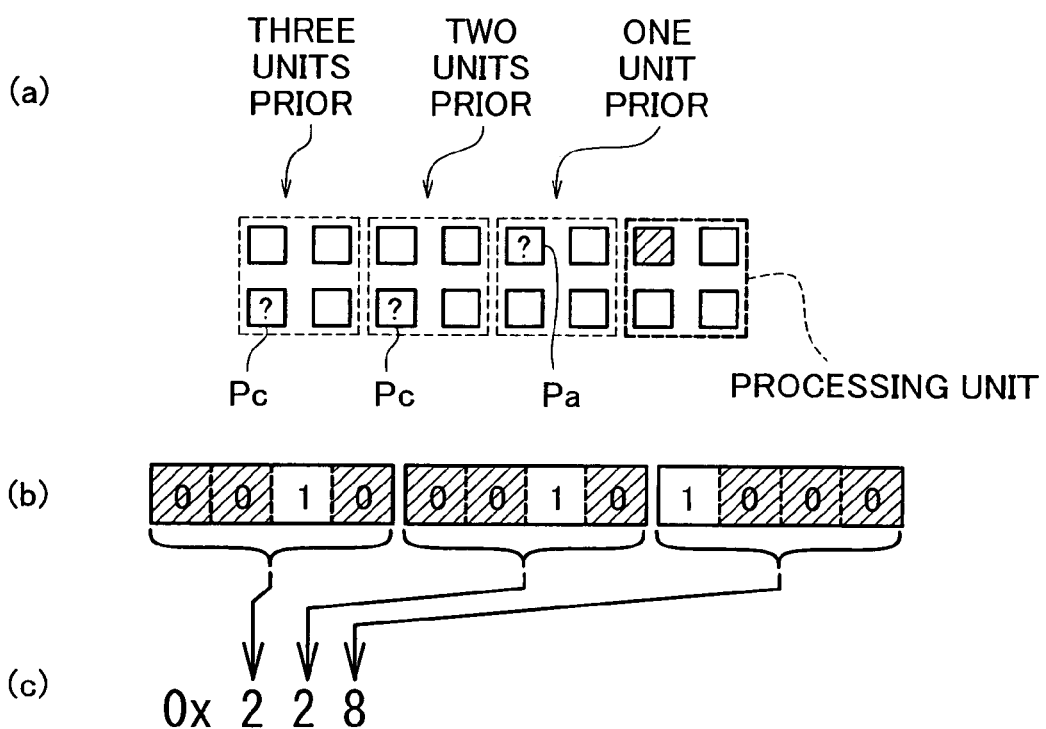
FIG. 32 is a schematic illustration showing conceptually the condition of history detection data being established in Variation 2 of Embodiment 3.

FIG. 32 is an illustration showing the condition of establishing history detection data in this second variation. For example, when determining dot on/off state for pixel Pa of a processing unit, as shown in FIG. 32(a), for the unit "one unit prior" to the processing unit, dot formation status of pixel Pa is detected, and for the units "two units prior" and "three units prior", dot formation status of pixel Pc is detected. In the drawing, pixels indicated by "?" symbols represent in model form detection of dot formation status for the pixels in question. Where pixel locations for detecting dot formation status are established in this way, it is possible to avoid dots from being formed cyclically in a pattern of "lower left pixel", "lower left pixel", "lower left pixel", "lower left pixel" over a four-unit cycle.

FIG. 32(b) shows history detection data established for the purpose of detecting pixel locations denoted by "?" symbols. As noted, history detection data is composed to three groups each composed of four adjacent bits; as shown in FIG. 32(b), groups correspond respectively to the three units shown in FIG. 32(a). The four bits making up each group correspond, in order from the high order end (left end in the drawing), to pixel Pa, pixel Pb, pixel Pc, and pixel Pd, respectively. History detection data can be derived by establishing a value of "1" in bits corresponding to pixel locations to be detected, and by establishing a value of "0" in other bits. FIG. 32(c) shows in hexadecimal representation history detection data obtained in this way. As noted, since history detection data represents one unit with four bits, where four bits taken together are represented in hexadecimal representation, history detection data can be denoted easily. The history detection data shown in FIG. 32(b) can be represented as "0x228" by unit of hexadecimal representation. "0x" unit hexadecimal representation.

Figure 33:
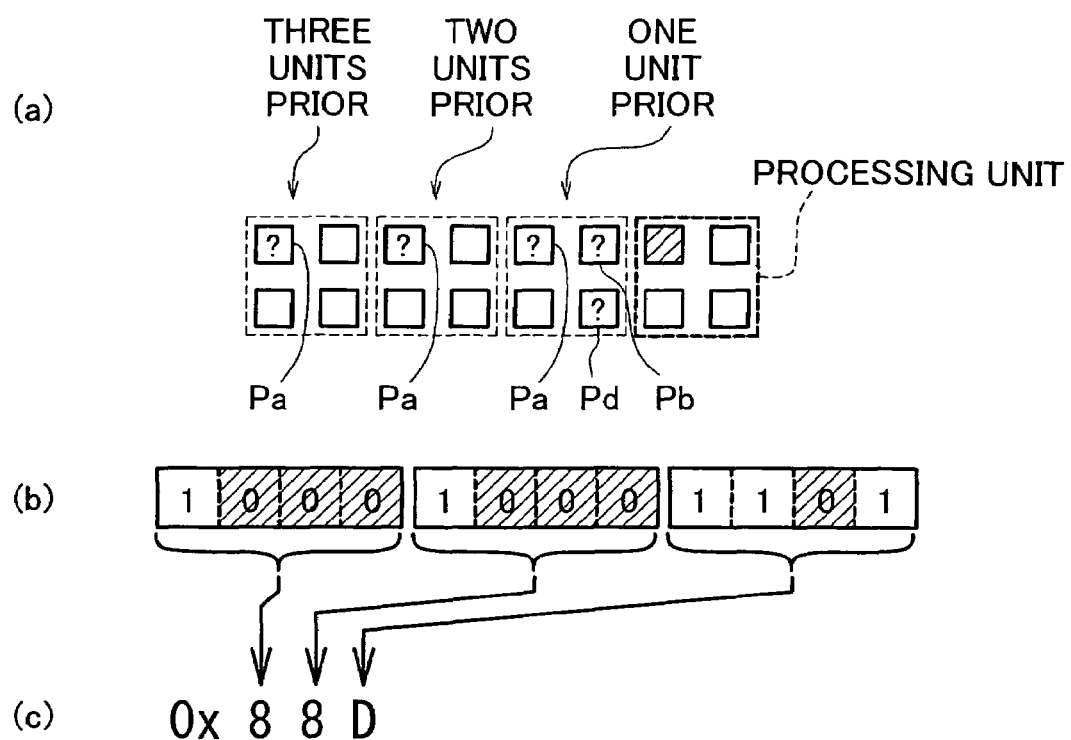
FIG. 33 is a schematic illustration showing conceptually the condition of different history detection data being established in Variation 2 of Embodiment 3.

In the embodiment described above, pixels for detecting dot formation status are assumed to be one pixel per unit, but it would of course be acceptable to detect history detection data for several pixel locations per unit. FIG. 33 is an illustration showing the condition of detecting history detection data for several pixel locations. Here, as shown in FIG. 33(a), for the unit "one unit prior" to the processing unit, dot formation status is detected at three pixel locations. FIG. 33(b) shows history detection data established for the purpose of detecting dot formation status at such pixel locations. As shown in the drawing, for the unit "one unit prior", dot formation status is detected for the two pixel locations of pixel Pb and pixel Pd, in addition to pixel Pa. In correspondence therewith, a value of "1" is established in the three bits corresponding respectively to pixel Pa, pixel Pb and pixel Pd, among the four bits at the low order end of the history detection data. Specifically, in hexadecimal representation, a "D" is established. For the units "two units prior" and "three units prior", since dot formation status of pixel Pa is detected in the same manner as in the case of FIG. 32, for these units in hexadecimal representation an "8" is established, and ultimately data of "0x88D" as shown in FIG. 33 is established as history detection data.

As described above, by appropriately establishing history detection data, it is possible to freely establish pixel locations at which dot formation status will be detected in previously processed units. Accordingly, even in instances where dots easily form a particular pattern over several units, the occurrence of such a pattern can be avoided. Of course, as a result of making it difficult for dots to be formed with bias to a particular pixel location, dots are formed at substantially uniform rates at all pixel locations. Also, as shown in FIG. 32, if dot formation status is detected for proximate pixel locations of the processing unit, formation of dots in proximity to the interested pixel can be avoided.

Thus, it becomes possible to improve dot dispersion and to improve image quality to a greater extent.

(3) Variation 3:

It is also possible to establish, using random numbers, pixel locations at which dot formation status will be detected. For example, first, a number of units for which dot formation status will be detected going back is established using a random number, and next a pixel location at which dot formation status will be detected is established using a random number. By so doing, regularity is eliminated in establishment of pixel location at which dot formation status will be detected, making it possible to reliably avoid occurrence of a cyclical pattern over several units.

G. Embodiment 4

Figure 6B:
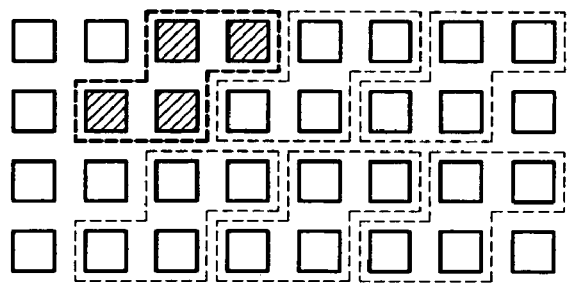
Figure 6C:
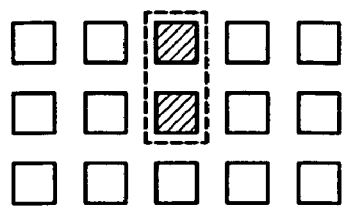
Figure 6D:
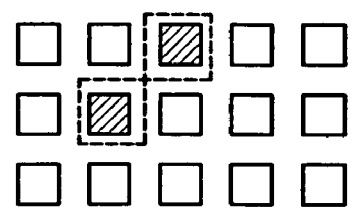

Next, a printing system will be described by way of Embodiment 4. Embodiment 4 is a embodiment relating to a printing system and printing method. This printing system comprises the same hardware arrangement as Embodiments 1 to 3, and the image data conversion process (see FIG. 4), per-unit tone number conversion process (see FIG. 5), and intra-unit multivalue quantization process (see FIG. 9) are substantially the same as well. However, in Embodiment 4, in relation to the raster arrangement in printer 200, the way in which units are taken is such that there are included no units in which a plurality of pixels are not consecutive in the raster direction, as shown in FIG. 6C and FIG. 6D. The process is carried out with two or more pixels consecutive in the raster direction, as shown in FIG. 6A and FIG. 6B.

In the color printer 200 of this embodiment, since a single raster is formed by unit of several main scans, if dots should be formed with bias to a particular pixel location in units, even if not to the extent that a cyclical pattern becomes visible, color irregularities or the like may occur and image quality become degraded. That is, while main scans are carried out multiple times, since formation of dots is concentrated in particular main scans, the effect of improved image quality due to a raster being formed over several times is not achieved, and color irregularities, banding or other image quality problems may occur in some instances.

In order to avoid the occurrence of such problems, in Embodiment 4, when carrying out the intra-unit multivalue quantization process and converting image data to dot data on a unit-by-unit basis, pixel locations at which dots have been formed in previously processed units are detected, and dot on/off state is determined while reflecting the detection results. In this way, by determining dot on/off state in the processing unit while taking into consideration the history of pixel locations at which dots were formed in previously processed units, degradation of image quality that can occur due to conversion of image data on a unit-by-unit basis can be avoided. In this embodiment, a unit, at least in the main scanning direction, is a group of consecutive pixels in a number equivalent to an integral multiple of the number of passes of color printer 200. As will be described later, by making units large in this way, the occurrence of cyclical patterns can be avoided, whereby it is possible to simultaneously avoid the occurrence to the problems of color irregularities and banding.

As mentioned above, in the intra-unit multivalue quantization process of the embodiment, unit size is established such that, at least in the main scanning direction, it is an integral multiple of the number of passes of color printer 200. Specifically, as shown in FIGS. 6A and 6B, at least in the main scanning direction multiple pixels are grouped in sets of two pixels. This corresponds to the fact that the color printer 200 of this embodiment forms one raster over two main scans (i.e. in two passes).

Figure 34A:
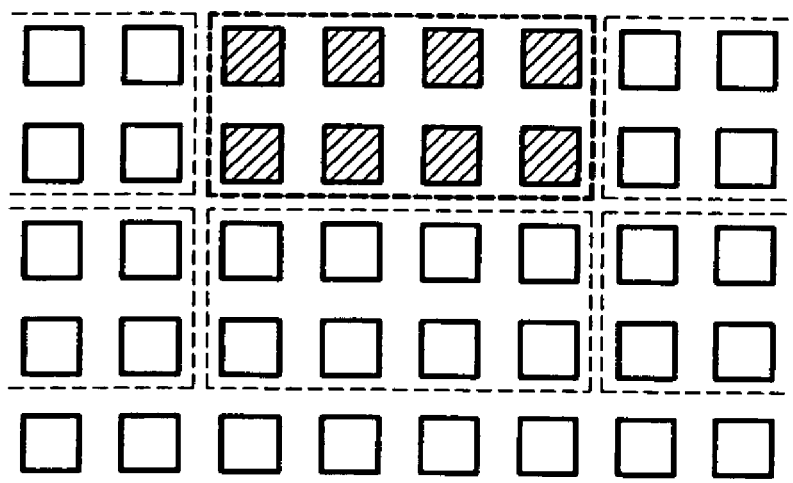
FIGS. 34A and 34B are schematic illustrations showing an exemplary condition of four consecutive pixels each in the main scanning direction for a total of eight pixels being taken as a unit.
Figure 34B:
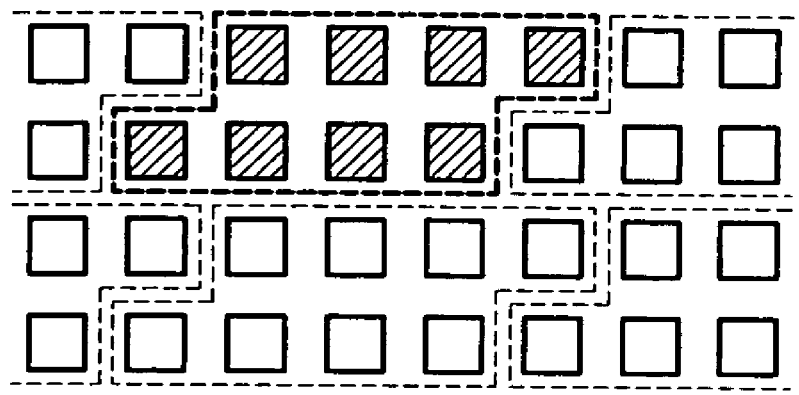

The condition of color printer 200 forming one raster in two passes was described previously using FIG. 30. In this embodiment, corresponding to color printer 200 forming a raster in two passes, two pixels each in the main scanning direction and sub-scanning direction for a total of four pixels, are taken as a unit. Pixels taken as a group may be any ones, as long as pixel number at least in the main scanning direction is a multiple of a pass number of 2. For example, as shown in FIG. 34A and FIG. 34B, it is possible to take as a unit sets of four consecutive pixels in the main scanning direction, for a total of eight pixels.

Here, there is described a case in which the pass number of color printer 200 is "2", but the matters described here could also be applied similarly in the case of some other pass number. Specifically, in the case of a printer with a pass number of 3 that forms one raster in the course of three passes, it would be acceptable to take as units groups of pixels numbering some multiple of 3 (i.e. 3, 6, 9 . . . ) in the main scanning direction; or if the printer has a pass number of 4, to take as units groups of pixels numbering a multiple of 4 in the main scanning direction.

In this embodiment, the intra-unit multivalue quantization process shown by FIG. 11 of Embodiment 1 is executed. That is, pixel locations at which dots were formed in previously processed units are detected, and the tone number conversion process is carried out while reflecting the detection results. Accordingly, these processes are similar to those described in Embodiment 3 and shown in FIGS. 27A to 27C, FIGS. 28A to 28D, and FIGS. 29A and 29B. Accordingly, description of these shall be omitted here.

In Embodiment 4, as a result, in the event that target history is detected, the setting for threshold value th used to determine dot on/off state is modified to a large value (see FIG. 26), making it difficult for a dot to be formed on the interested pixel. Of course, it would also be possible to determine not to form a dot on the interested pixel in the event that target history is detected. By so doing, it is simple to avoid dots from forming at the same pixel location over a cycle of several units.

In the description hereinabove, history detection data is caused to act upon history data to calculate intermediate data, the logical sum or arithmetic sum of the bits of the intermediate data is taken, and detection results are calculated. In contrast, it would also be acceptable to take the logical product of the bits of the intermediate data and designate this value as the detection result. In this case, the detection result would assume a value of "1" only in the event that dots were formed on all pixel locations whose dot formation status is to be detected. Accordingly, for example, under conditions in which dots are formed at a certain level of density, it becomes possible to reliably detect only dots that formed a readily visible specific pattern.

As mentioned above, in the intra-unit multivalue quantization process of Embodiment 4, the existence of target history is detected during the history detection/threshold value establishing process, and in the event that target history is detected the value of threshold value th is increased, thereby making it difficult for a dot to be formed on the interested pixel. Thus, even where the tone number conversion process is carried out on a unit-by-unit basis, occurrence of an area in which dots are formed at the same pixel location over a cycle of several units, with this area becoming visible and degrading image quality, can be avoided.

Unit size is established so as to be an integral multiple of the pass number at least in the main scanning direction. Thus, if formation of dots at the same pixel location over several units is avoided, it becomes possible to simultaneously avoid formation of dots with bias to a particular pass and degradation of image quality. The reason for this is described below.

Figure 35A:
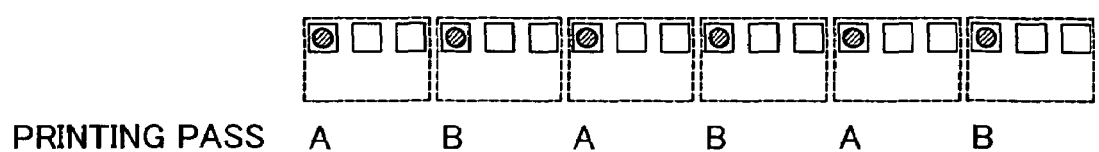
FIGS. 35A and 35B are explanatory illustrations showing the reason that in the case that unit size, in the main scanning direction is not an integral multiple of the number of passes, if is it attempted to avoid dots from occurring in a regular pattern over several units, the pass in which dots are formed will become biased to a particular pass.
Figure 35B:
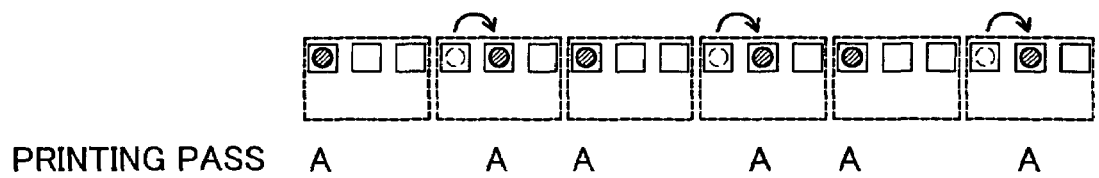

FIGS. 35A and 35B are illustrations showing the reason that, in the event that unit size is not an integral multiple of the number of passes in the main scanning direction, if it is attempted to avoid dots forming a regular pattern over several units, the pass in which dots are formed may become biased to a particular pass. The small squares shown in the drawing represent pixels, and the large rectangles indicated by broken lines represent units. For convenience in illustration, the description here shall focus on a single raster; in FIGS. 35A and 35B, only the raster of interest is represented. Assuming a raster to be formed by two passes, there is shown a case in which units, at least in the main scanning direction, are formed by taking sets of three pixels each. The value of three pixels shows in exemplary fashion a value that is not an integral multiple of a pass number of 2; the description here could be applied similarly to other values that are not multiples of 2, such as five pixels, seven pixels, and so on.

Let it be assumed now that there exists in an image to be printed an area in which dots are formed at a rate of one per nine pixels. Where sets of three pixels each in the main scanning direction are taken as units, and dot on/off state is determined on a unit-by-unit basis, unless the special control shown in FIG. 26 is performed, in such an area, it will be easy for there to occur a regular pattern in which dots are formed at 3-pixel intervals. FIG. 35A shows a condition in which dots are formed at 3-pixel intervals, in the event that the control of the embodiment is not performed. In the drawing, a circle with diagonal hatching shown in a square representing a pixel indicates a dot formed on the pixel. In this embodiment, in order to avoid formation of dots in such a regular pattern and degradation of image quality, as shown in FIG. 26, dot on/off state determination results of previously processed units are detected, and in the event that dots are formed in a regular pattern, it is made difficult for a dot to form on that pixel.

FIG. 35B represents a condition in which formation of dots in a regular pattern is avoided. For example, for the second unit from left in the drawing, if a dot is formed at the pixel location in the upper left corner of the unit, dots will have been formed consecutively at the same pixel location as in the lead unit. There is shown a condition in which it is made difficult for a dot to be formed for the pixel in the upper left corner of the second unit, as a result of which the pixel location at which the dot is formed is shifted to an adjacent pixel. Similarly, for the fourth unit from left, there is shown a condition in which the pixel location at which the dot is formed is shifted to an adjacent pixel.

As shown in FIG. 35B, by shifting dot formation location in this way, formation of a regular pattern by dots can be avoided. However, due to shifting of dots in this way, it can occur that the pass in which dots are formed becomes biased to a particular pass. Here, assuming that one raster is formed in two passes, i.e. pass A and pass B, let it be assumed that dots are formed on odd numbered pixels in pass A, and dots are formed on even numbered pixels in pass B. As shown in FIG. 35A, prior to shifting of dot formation location, dots are formed at substantially the same rate in pass A and pass B. In contrast to this, after shifting of dot formation location, as shown in FIG. 35B, all dots are formed in pass A. In this way, if the pass in which dots are formed becomes biased to a particular pass, the effect of improving image quality by unit of forming a raster in multiple passes cannot be achieved, and color irregularities or banding may occur resulting in degraded image quality. Particularly with printing of color images using many colors of ink, such as with color printer 200, such color irregularities tend to occur easily. This is due to the fact that, where ink dots of multiple colors are formed, depending on the order in which ink dots of the different colors are formed, there occur slight differences in the way that the inks run together or in the manner of bleed of the dots formed last, so that if ink of a given color is formed with bias to a particular pass, in that area coloration may differ due to dots being formed in a particular order different from the surrounding area, with this becoming noticeable as color irregularity.

Figure 36A:
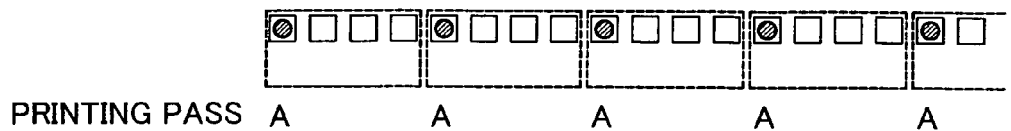
FIGS. 36A and 36B are explanatory illustrations showing the condition of avoiding the pass in which dots are formed from becoming biased to a particular pass, by making unit size in the main scanning direction an integral multiple of the number of passes.
Figure 36B:
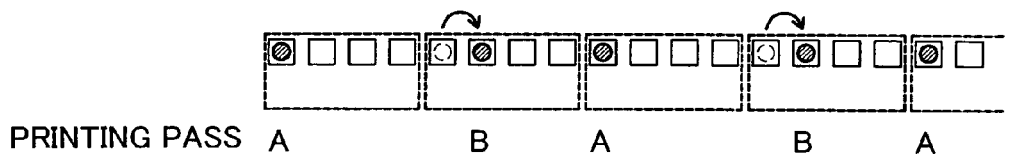

In this embodiment, in consideration of this point, unit size is established so as to be a multiple of pass number at least in the main scanning direction. FIGS. 36A and 36B are illustrations showing a condition in which formation of dots with bias to a particular pass is avoided by unit of making unit size in the main scanning direction a multiple of pass number. Here, since color printer 200 forms a raster in two passes, unit size in the main scanning direction is established at four pixels. Of course, unit size in the main scanning direction is not limited to four pixels, and can be of any size provided that is it a multiple of the pass number of 2, such as two pixels or six pixels.

Where a unit is composed of a plurality of pixels in sets of four pixels in the main scanning direction, and dot on/off state is determined on a unit-by-unit basis, unless the special control described earlier using FIG. 26 is performed, it can occur that dots are formed in a regular pattern over several units. FIG. 36A shows, as one example, a condition in which dots are formed at 4-pixel intervals. In this embodiment, in order to avoid occurrence of such a regular pattern, dot on/off state determination results of previously processed units are detected. In the event that dots are formed in a regular pattern, it is made difficult for a dot to form on that pixel.

FIG. 36B represents a condition in which formation of dots in a regular pattern is avoided. In the second unit and fourth unit from the left in the drawing, the pixel location at which the dot is formed is shifted from the pixel location in the upper left corner of the unit to the adjacent pixel location. By so doing, formation of dot at the same pixel location consecutively starting from the lead unit can be avoided. Also, with regard to printing pass as well, in FIG. 36B in which dot location has been shifted, dots are formed at substantially the same rate in pass A and pass B. In contrast, in FIG. 36A in which dot location has not been shifted, dots are formed with bias to pass A. As will be apparent from a comparison of FIG. 36A with FIG. 36B, by shifting the pixel location at which dots are formed, the printing pass changes from pass A to pass B, and as a result the printing pass which had been biased to pass A is now dispersed. That is, where unit size, at least in the main scanning direction, is established as an integral multiple of pass number, dots formed at the same pixel location in units will be formed in the same pass. Thus, if dot location is shifted in order to avoid the occurrence of a regular pattern over several units, this fact will immediately lead to printing pass becoming dispersed. Thus, if formation of dots at the same pixel location over several units is avoided, it becomes possible to simultaneously avoid dot formation with bias to a particular pass and degraded image quality.

By using the method described hereinabove, it is possible to freely establish, from among previously processed units, the pixel location at which dot formation status will be detected. Accordingly, even in the event that dot on/off state is determined on a unit-by-unit basis, by detecting dot formation status at a predetermined pixel location and determining dot on/off state on the basis of the detection result, it is possible to effectively avoid dots from forming in a regular pattern over several units. Additionally, since unit size is established at an integral multiple of pass number at least in the main scanning direction, by avoiding occurrence of a pattern, it becomes possible to simultaneously avoid dot formation with bias to a particular pass.

The variations described as variations of Embodiments 1, 2 and 3 are applicable to Embodiment 4 as well.

While the invention has been described hereinabove with reference to embodiments, it is not limited to all of the embodiments above, but may be embodied in various ways without departing from the spirit thereof.

For example, whereas in the embodiments hereinabove, a so-called error diffusion method is used as the method for determination of dot on/off state for pixels making up a unit, it is not limited thereto, it being possible to employ some other known method such as the dither method.

In the embodiments hereinabove, there is described a case in which, in the event of detecting that dots have been formed at a predetermined pixel location in previously processed units, it is made difficult for a dot to be formed on the interested pixel. By contrast, where no dot has been formed at the predetermined pixel location, it would be acceptable to instead make it easy for a dot to be formed on the interested pixel. By so doing, for example, in areas in which dots are formed with high density, degradation of image quality could be effectively avoided in cases where pixels having no dots formed thereon occur cyclically over several units.

A software program (application program) for executing the functions mentioned above could be supplied via a communications network to the main memory of the computer system or to an external memory device for execution. Of course, a software program stored in a CD-ROM or floppy disk could be read out and executed.

In the embodiments hereinabove, execution by a computer of an image data conversion process including a tone number conversion process was described, but some or all of the data conversion process could instead be executed on the printer side, or using a dedicated image processing apparatus.

Additionally, the image display device is not necessarily limited to a printing device that forms ink dots on a printing medium to print an image; it could also consist, for example, of liquid crystal display device for representing images of continuously varying tone by unit of dispersing luminescent spots with appropriate density on a liquid crystal display screen.

Having described a preferred embodiment of the invention with reference to the accompanying drawings, it is to be understood that the invention is not limited to the embodiments and that various changes and modifications could be effected therein by one skilled in the art without departing from the spirit or scope of the invention as defined in the appended claims.

I claim:

1. An image processing apparatus that converts image data represented by tone values for pixels constituting an image into dot data representing dot on/off state for each of pixels, the image processing apparatus comprising:
   a dot data converting module that, forming units by grouping adjacent pixels in a predetermined number, converts the image data included in each of units into the dot data; and
   a dot data storage module that stores the dot data in a condition enabling identification of the dot on/off state for at least one of pixels within the converted units,
   wherein the dot data converting module comprises:
   a converted unit selecting module that calculates a sum of tone values for pixels grouped into the unit, and according to a correspondence relationship with the sum of tone values, selects a predetermined number of units from among the converted units;
   a pixel specifying module that, within a unit to be converted to the dot data, serially specifies a interested pixel for determination of dot on/off state;
   a dot data input module that inputs dot data of a pixel that is located in the predetermined number of units selected by the converted units selecting module and exists in a location having a predetermined relationship with the location of the interested pixel in the unit; and
   a dot formation determining module that, on the basis of tone value of image data for the interested pixel and the inputted dot data, determines the dot on/off state for the interested pixel, according to a characteristic that more readily determines a dot-on state the greater the tone value of the interested pixel; and
   wherein the converted unit selecting module executes the selection according to the correspondence relationship that, with respect to the sum of tone values smaller than a first predetermined value, a unit further away from the unit including the interested pixel is included in the predetermined number of units, than for the sum of tone values greater than the first predetermined value and smaller than a second predetermined value.

2. An image processing apparatus according to claim 1,
   wherein the converted unit selecting module executes the selection according to the correspondence relationship that, with respect to the sum of tone values, for the sum of tone values smaller than the first predetermined value, a unit closer is included in the predetermined number of units, than the most distant unit associated with a sum of tone value greater than the first predetermined value and smaller than the second predetermined value.

3. An image processing apparatus according to claim 1,
   wherein the converted unit selecting module executes the selection according to the correspondence relationship that, with respect to the sum of tone values, in addition to the sum of tone values smaller than the first predetermined value, for the sum of tone values greater than the second predetermined value, a unit more distant is included in the predetermined number of units, than for the sum of tone values greater than the first predetermined value and smaller than the second predetermined value, and
   for the sum of tone values smaller than the first predetermined value, a unit even further away from the interested pixel is included in the predetermined number of units, than for the sum of tone values greater than the second predetermined value.

4. An image processing apparatus according to claim 1,
   wherein the dot formation determining module comprises dot formation inhibit module that, in the event that the sum of tone values is smaller than the first predetermined value and a dot was detected on the pixel at the predetermined location, inhibits the dot formation for the interested pixel.

5. An image processing apparatus according to claim 4,
   wherein the dot formation inhibit module determines to not form a dot on the interested pixel, in the event that the sum value is smaller than the first predetermined value and a dot was detected on the pixel at the predetermined location.

6. An image processing apparatus according to claim 1,
   wherein the dot formation determining module comprises:
   a dot formation promoting module that, in the event that the sum value is greater than the second predetermined value, and a dot is not detected on the pixel at the predetermined location, promotes dot formation for the interested pixel.

7. An image processing apparatus according to claim 6,
   wherein the dot formation promoting module determines to form a dot on the interested pixel, in the event that the sum value is greater than the second predetermined value and a dot is not detected on the pixel at the predetermined location.

8. A printing device that receives image data represented by tone values for pixels constituting an image, and on the basis of the image data forms dots on a printing medium, the printing device comprising:
   a dot data converting module that, forming units by grouping adjacent pixels in a predetermined number, converts the image data included in each of the units into the dot data; and
   a dot data storage module that stores the dot data in a condition enabling identification of the dot on/off state for at least one of pixels within the converted units,
   wherein the dot data converting module comprises:
   a converted unit selecting module that calculates a sum of tone values for pixels grouped into the unit, and according to a correspondence relationship with the sum of tone values, selects a predetermined number of units from among the converted units;
   a pixel specifying module that, within a unit to be converted to the dot data, serially specifies a interested pixel for determination of dot on/off state;
   a dot data input module that inputs dot data of a pixel that is located in the predetermined number of units selected by the converted units selecting module and exists in a location having a predetermined relationship with the location of the interested pixel in the unit; and a dot formation determining module that, on the basis of tone value of image data for the interested pixel and the inputted dot data, determines the dot on/off state for the interested pixel, according to a characteristic that more readily determines a dot-on state the greater the tone value of the interested pixel; and the converted unit selecting module executes the selection according to the correspondence relationship that, with respect to the sum of tone values smaller than a first predetermined value, a unit further away from the unit including the interested pixel is included in the predetermined number of units, than for the sum of tone values greater than the first predetermined value and smaller than a second predetermined value.

9. An image processing method for converting image data represented by tone values for pixels constituting an image into dot data representing dot on/off state for the pixels, the method comprising:

a first step that, forming units by grouping adjacent pixels in a predetermined number, converts the image data included in each of the units into the dot data; and a second step that stores the dot data in a condition enabling identification of the dot on/off state for at least one of pixels within the converted units, wherein the first step comprises:

(1-a) a subordinate step that calculates a sum of tone values for pixels grouped into the unit, and according to a correspondence relationship with the sum of tone values, selects a predetermined number of units from among the converted units;

(1-b) a subordinate step that, within a unit to be converted to the dot data, serially specifies a interested pixel for determination of dot on/off state;

(1-c) a subordinate step that inputs dot data of a pixel that is located in the selected predetermined number of units and exists in a location having a predetermined relationship with the location of the interested pixel in the unit; and (1-d) a subordinate step that, on the basis of tone value of image data for the interested pixel and the inputted dot data, determines the dot on/off state for the interested pixel, according to a characteristic that more readily determines a dot-on state the greater the tone value of the interested pixel; and the subordinate step (1-a) executes the selection according to the correspondence relationship that, with respect to the sum of tone values smaller than a first predetermined value, a unit further away from the unit including the interested pixel is included in the predetermined number of units, than for the sum of tone values greater than the first predetermined value and smaller than a second predetermined value.

10. A program product comprising a computer readable medium and program code using a computer in order to realize a method for converting image data represented by tone values for pixels constituting an image into dot data representing dot on/off state for the pixels, wherein the program code comprises:

a first program code that, forming units by grouping adjacent pixels in a predetermined number, converts the image data included in each of the units into the dot data; and a second program code that stores the dot data in a condition enabling identification of the dot on/off state for at least one of pixels within the converted units, wherein the first program code realizes:

a selecting function that calculates a sum of tone values for pixels grouped into the unit, and according to a correspondence relationship with the sum of tone values, selects a predetermined number of units from among the converted units;

a function that that, within a unit to be converted to the dot data, serially specifies a interested pixel for determination of dot on/off state;

a function that inputs dot data of a pixel that is located in the selected predetermined number of units and exists in a location having a predetermined relationship with the location of the interested pixel in the unit; and a function that, on the basis of tone value of image data for the interested pixel and the inputted dot data, determines the dot on/off state for the interested pixel, according to a characteristic that more readily determines a dot-on state the greater the tone value of the interested pixel; and wherein the selecting function executes the selection according to the correspondence relationship that, with respect to the sum of tone values smaller than a first predetermined value, a unit further away from the unit including the interested pixel is included in the predetermined number of units, than for the sum of tone values greater than the first predetermined value and smaller than a second predetermined value.

11. An image processing apparatus that converts image data represented by tone values for pixels constituting an image into dot data representing dot on/off state for each of the pixels, the image processing apparatus comprising:

a dot data converting module that, forming units by grouping adjacent pixels in a predetermined number, converts the image data included in each of the units into the dot data; and a dot data storage module that stores the dot data in a condition enabling identification of the dot on/off state for at least one of pixels within the converted units, wherein the dot data converting module comprises:

a pixel specifying module that, within a unit to be converted to the dot data, serially specifies a interested pixel for determination of dot on/off state;

a dot data input module that inputs the stored dot data of a pixel that exists within the converted unit in a location having a predetermined relationship with the location of the interested pixel in the unit; and a dot formation determining module that, on the basis of tone value of image data for the interested pixel and the inputted dot data, determines the dot on/off state for the interested pixel, according to a characteristic that controls the proportion of a number of dots formed at the predetermined location of the unit against a number of all dots into a predetermined range.

12. An image processing apparatus according to claim 11, wherein the dot data input module inputs dot data of each pixel that exists within the converted units at an equivalent location to the interested pixel location in the unit; and the dot formation determining module comprises a dot formation inhibit module that, in the event that the inputted dot data shows that a predetermined number or more of dots were formed on pixels at the equivalent location, inhibits dot formation for the interested pixel.

13. An image processing apparatus according to claim 11, wherein the dot data input module inputs dot data of each pixel that exists within the converted units at a non-equivalent location to the interested pixel location in the unit; and the dot formation determining module comprises a dot formation promoting module that, i in the event that the inputted dot data shows that a predetermined number or more of dots were formed on pixels at the non-equivalent location, promotes dot formation for the interested pixel.

14. An image processing apparatus according to claim 11, wherein the dot formation determining module determines dot on/off state using the error diffusion method, while modifying the threshold value of the error diffusion method to which reference is made during the determination, on the basis of the inputted dot data.

15. An image processing apparatus according to claim 11, wherein the dot data converting module forms units by grouping mutually adjacent four pixels and converts the image data into the dot data; and the dot formation determining module determines dot on/off state, in a condition wherein the proportion of dots formed on pixels within the converted units at an equivalent location to the interested pixel location in the unit is held to 10%-40%.

16. A printing device that receives image data represented by tone values for pixels constituting an image, and on the basis of the image data forms dots on a printing medium, the printing device comprising:

a dot data converting module that, forming units by grouping adjacent pixels in a predetermined number, converts the image data included in each of the units into the dot data; and a dot data storage module that stores the dot data in a condition enabling identification of the dot on/off state for at least one of pixels within a unit to be converted to the dot data, wherein the dot data converting module comprises:

a pixel specifying module that, within a unit to be converted to the dot data, serially specifies a interested pixel for determination of dot on/off state;

a dot data input module that inputs dot data of a pixel that exists within the converted unit in a location having a predetermined relationship with the location of the interested pixel in the unit; and a dot formation determining module that, on the basis of tone value of image data for the interested pixel and the inputted dot data, determines the dot on/off state for the interested pixel, according to a characteristic that controls the proportion of a number of dots formed at the predetermined location of the unit against a number of all dots into a predetermined range.

17. An image processing method for converting image data represented by tone values for pixels constituting an image into dot data representing dot on/off state for the pixels, the image processing method comprising:

a first step that, forming units by grouping adjacent pixels in a predetermined number, converts the image data included in each of the units into the dot data; and a second step that stores the dot data in a condition enabling identification of the dot on/off state for at least one of pixels within a unit to be converted to the dot data, wherein the first step further comprises:

a subordinate step that, within a unit to be converted to the dot data, serially specifies a interested pixel for determination of dot on/off state;

a subordinate step that inputs dot data of a pixel that exists within the converted unit in a location having a predetermined relationship with the location of the interested pixel in the unit; and a subordinate step that, on the basis of tone value of image data for the interested pixel and the inputted dot data, determines the dot on/off state for the interested pixel, according to a characteristic that controls the proportion of a number of dots formed at the predetermined location of the unit against a number of all dots into a predetermined range.

18. A program product comprising a computer readable medium and program code using a computer in order to realize a method for converting image data represented by tone values for pixels constituting an image, into dot data representing dot on/off state for the pixels, wherein the program code comprises:

a first program code that, forming units by grouping adjacent pixels in a predetermined number, converts the image data included in each of the units into the dot data; and a second program code that stores the dot data in a condition enabling identification of the dot on/off state for at least one of pixels within the converted units, the first program code realizes:

a function that, within a unit to be converted to the dot data, serially specifies a interested pixel for determination of dot on/off state;

a function that inputs the stored dot data of a pixel that exists within the converted unit in a location having a predetermined relationship with the location of the interested pixel in the unit; and a function that, on the basis of tone value of image data for the interested pixel and the inputted dot data, determines the dot on/off state for the interested pixel, according to a characteristic that controls the proportion of a number of dots formed at the predetermined location of the unit against a number of all dots into a predetermined range.

19. A printing device comprising a raster forming element for forming rasters composed of rows of dots, by forming dots on a printing medium while repeating reciprocating motion a predetermined number of times, to print an image by forming a plurality of rasters while moving the raster forming element relatively in a direction intersecting the rasters, the printing device comprising:

a module that prepares the units, at least in the raster direction, as sets of consecutive pixels in a number equivalent to an integral multiple of the number of times of reciprocating motion for the raster forming element to form an the raster;

an image data receiving module that receives image data representing tone values of pixels, for a plurality of pixels that constituting an image being printed;

a dot data converting module that forms units by grouping adjacent pixels in predetermined number and converts the image data included in each of the units into the dot data;

a dot data storage module that stores the dot data in a condition enabling identification of the dot on/off state for at least one of pixels within the converted units; and a raster forming element drive module that drives the raster forming element according to the dot data, wherein the dot data converting module comprises:

a pixel specifying module that, within a unit to be converted to the dot data, serially specifies a interested pixel for determination of dot on/off state;

a dot data input module that inputs the stored dot data of a pixel that exists within the converted unit in a location having a predetermined relationship with the location of the interested pixel in the unit; and a dot formation determining module that, on the basis of tone value of image data for the interested pixel and the inputted dot data, determines the dot on/off state for the interested pixel.

20. A printing control device outputting a control data to a printer that comprises a raster forming element for forming rasters composed of rows of dots, by forming dots on a printing medium while repeating reciprocating motion a predetermined number of times, wherein the printer prints an image by forming a plurality of rasters while moving the raster forming element relatively in a direction intersecting the rasters, the control data is used for driving the raster forming element to carry out control of the printer, the printing control device comprising:

a module that prepares the units, at least in the raster direction, as sets of consecutive pixels in a number equivalent to an integral multiple of the number of times of reciprocating motion for the raster forming element to form an the raster;

an image data receiving module that receives image data representing tone values of pixels, for a plurality of pixels that constitute an image being printed;

a dot data converting module that converts the image data included in each of the units into dot data representing dot on/off state for each of the pixels;

a dot data storage module that stores the dot data in a condition enabling identification of the dot on/off state for at least one of pixels within the converted units; and a raster forming element drive module that drives the raster forming element according to the dot data, wherein the dot data converting module comprises:

a pixel specifying module that, within a unit to be converted to the dot data, serially specifies a interested pixel for determination of dot on/off state;

a dot data input module that inputs the stored dot data of a pixel that exists within the converted unit in a location having a predetermined relationship with the location of the interested pixel in the unit; and a dot formation determining module that, on the basis of tone value of image data for the interested pixel and the inputted dot data, determines the dot on/off state for the interested pixel.

21. A printing method controlling a raster forming element of a printer for forming rasters composed of rows of dots, the raster forming element formes dots on a printing medium while repeating reciprocating motion a predetermined number of times, to print an image by forming a plurality of rasters while moving the raster forming element relatively in a direction intersecting the rasters, the printing method comprising:

defining units, at least in the raster direction, as sets of consecutive pixels in a number equivalent to an integral multiple of the number of times of reciprocating motion for the raster forming element to form the raster;

receiving image data representing tone values of pixels, for a plurality of pixels that constitute an image being printed;

converting the image data included in each of the units into dot data representing dot on/off state for each of the pixels;

storing the dot data in a condition enabling identification of pixel position in the units, for at least one of pixels included in the converted unit; and driving the raster forming element according to the dot data, wherein the conversion of the image data comprises:

serially specifying a interested pixel for determination of dot on/off state;

inputting the stored dot data of a pixel that exists within the converted unit in a location having a predetermined relationship with the location of the interested pixel in the unit; and determining, on the basis of tone value of image data for the interested pixel and the inputted dot data, determines the dot on/off state for the interested pixel.

22. A printer control method outputting a control data to a printer that comprises a raster forming element of a printer for forming rasters composed of rows of dots, the raster forming element formes dots on a printing medium while repeating reciprocating motion a predetermined number of times, to print an image by forming a plurality of rasters while moving the raster forming element relatively in a direction intersecting the rasters, the printing control method comprising:

defining units, at least in the raster direction, as sets of consecutive pixels in a number equivalent to an integral multiple of the number of times of reciprocating motion for the raster forming element to form the raster;

receiving image data representing tone values of pixels, for a plurality of pixels that constitute an image being printed;

converting the image data included in each of the units into dot data representing dot on/off state for each of the pixels;

storing the dot data in a condition enabling identification of pixel position in the units, for at least one of pixels included in the converted unit; and driving the raster forming element according to the dot data, wherein the conversion of the image data comprises:

serially specifying a interested pixel for determination of dot on/off state;

inputting the stored dot data of a pixel that exists within the converted unit in a location having a predetermined relationship with the location of the interested pixel in the unit; and determining, on the basis of tone value of image data for the interested pixel and the inputted dot data, determines the dot on/off state for the interested pixel.

23. A program product comprising a computer readable medium and program code using a computer in order to realizing a method for driving a raster forming element of a printer for forming rasters composed of rows of dots, the raster forming element formes dots on a printing medium while repeating reciprocating motion a predetermined number of times, to print an image by forming a plurality of rasters while moving the raster forming element relatively in a direction intersecting the rasters, wherein the units, at least in the raster direction, are defined as sets of consecutive pixels in a number equivalent to an integral multiple of the number of times of reciprocating motion for the raster forming element to form an the raster;

wherein the program code realizes:

a function (A) for receiving image data representing tone values of pixels, for a plurality of pixels that constitute an image being printed;

a function (B) for converting the image data included in each of the units into dot data representing dot on/off state for each of the pixels a function (C) for storing the dot data in a condition enabling identification of pixel position in the units, for at least one of pixels included in the converted unit;

a function (D) for driving the raster forming element according to the stored dot data, wherein the function (B) includes:

a function (B-1) for serially specifying a interested pixel for determination of dot on/off state;

a function (B-2) for inputting the stored dot data of a pixel that exists within the converted unit in a location having a predetermined relationship with the location of the interested pixel in the unit; and a function (B-3) for determining, on the basis of tone value of image data for the interested pixel and the inputted dot data, determines the dot on/off state for the interested pixel.

24. A program product comprising a computer readable medium and program code using a computer in order to realizing a method for outputting a control data to control a raster forming element of a printer for forming rasters composed of rows of dots, the raster forming element formes dots on a printing medium while repeating reciprocating motion a predetermined number of times, to print an image by forming a plurality of rasters while moving the raster forming element relatively in a direction intersecting the rasters, wherein the units, at least in the raster direction, are defined as sets of consecutive pixels in a number equivalent to an integral multiple of the number of times of reciprocating motion for the raster forming element to form an the raster;

wherein the program code realizes:

a function (a) for receiving image data representing tone values of pixels, for a plurality of pixels that constitute an image being printed;

a function (b) for converting the image data included in each of the units into dot data representing dot on/off state for each of the pixels a function (c) for storing the dot data in a condition enabling identification of pixel position in the units, for at least one of pixels included in the converted unit;

a function (d) for outputting the stored dot data as the control data to the raster forming element, wherein the function (b) includes:

a function (b-1) for serially specifying a interested pixel for determination of dot on/off state;

a function (b-2) for inputting the stored dot data of a pixel that exists within the converted unit in a location having a predetermined relationship with the location of the interested pixel in the unit; and a function (b-3) for determining, on the basis of tone value of image data for the interested pixel and the inputted dot data, determines the dot on/off state for the interested pixel.

* * * * *